(12) United States Patent
Fujimori et al.

(10) Patent No.: US 7,130,136 B2
(45) Date of Patent: Oct. 31, 2006

(54) OPTICAL MODULATOR HOLDER, OPTICAL DEVICE, AND PROJECTOR

(75) Inventors: Motoyuki Fujimori, Suwa (JP); Masami Murata, Shiojiri (JP); Akira Egawa, Matsumoto (JP); Satoshi Kinoshita, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 12 days.

(21) Appl. No.: 11/018,500

(22) Filed: Dec. 22, 2004

(65) Prior Publication Data

US 2005/0162760 A1 Jul. 28, 2005

(30) Foreign Application Priority Data

Dec. 26, 2003 (JP) .............................. 2003-433296
Mar. 11, 2004 (JP) .............................. 2004-068847
Oct. 28, 2004 (JP) .............................. 2004-314519

(51) Int. Cl.
*G02B 7/02* (2006.01)
(52) U.S. Cl. ....................... 359/820; 359/811; 359/819
(58) Field of Classification Search ................ 359/819, 359/820, 811; 349/5, 8
See application file for complete search history.

(56) References Cited

U.S. PATENT DOCUMENTS 5,177,994 A * 1/1993 Moriizumi et al. ......... 73/23.34
2003/0035290 A1* 2/2003 Bornhorst .................... 362/318

FOREIGN PATENT DOCUMENTS

JP   A 03-174134    7/1991
JP   A 2002-357803  12/2002

* cited by examiner

*Primary Examiner*—Timothy Thompson
*Assistant Examiner*—Jerry Fang
(74) *Attorney, Agent, or Firm*—Oliff & Berridge, PLC

(57) ABSTRACT

Cooling chambers (R1, R2) for accommodating therein a cooling fluid for cooling a liquid crystal panel (441) are formed inside a pair of frame members (4405, 4406) constituting an optical modulator holder (4402). There are provided, in the pair of frame members (4405, 4406), inlet ports (4405D, 4406D) for inletting a cooling fluid into the cooling chambers (R1, R2), outlet ports (4405E, 4406E) for discharging the cooling fluid inside the cooling chambers (R1, R2) to the outside, and a buffer section (Bf1) for temporally accumulating the cooling fluid flowing therein via the inlet ports (4405D, 4406D) and rectifying a flow direction of the cooling fluid to a direction parallel to an optical modulation face and/or to a direction perpendicular to the optical modulation face.

29 Claims, 45 Drawing Sheets

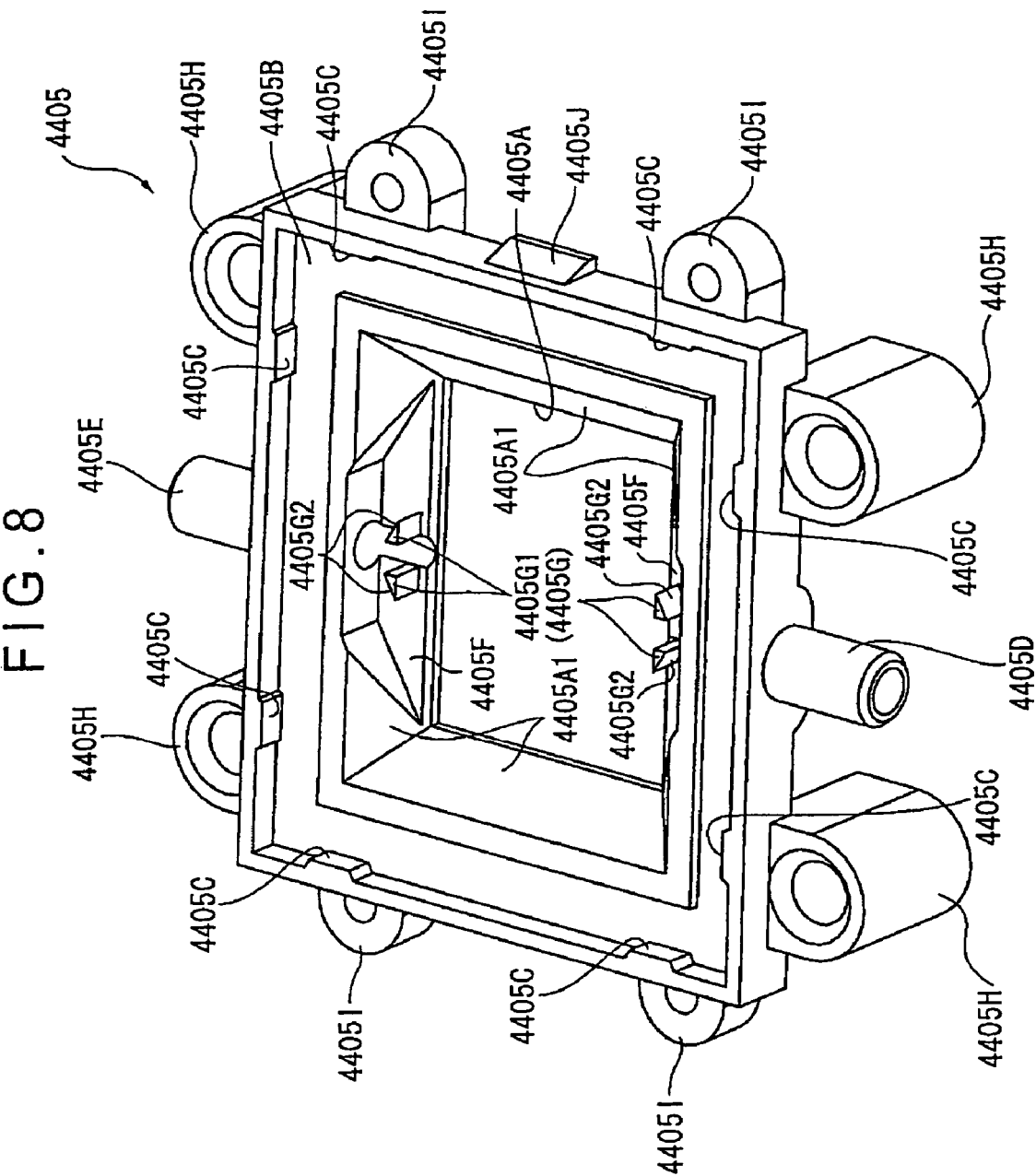

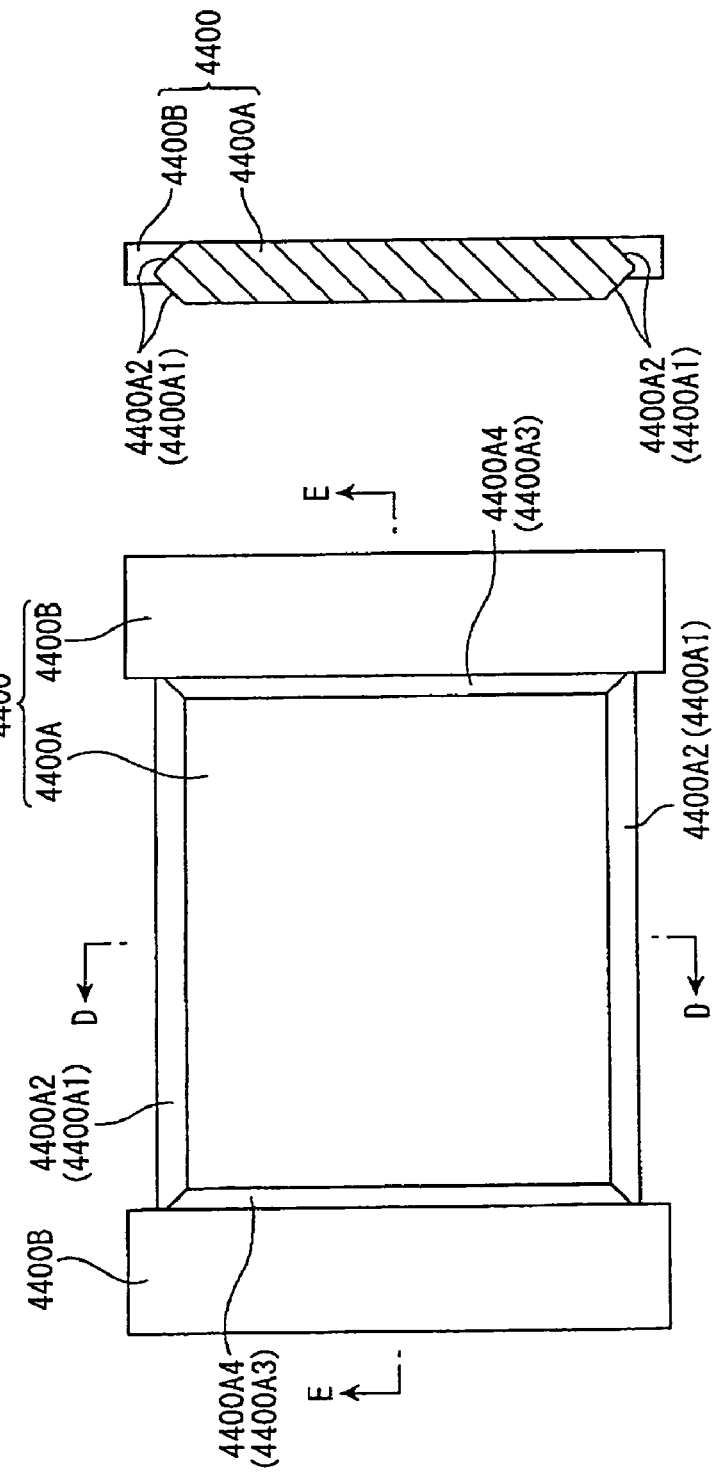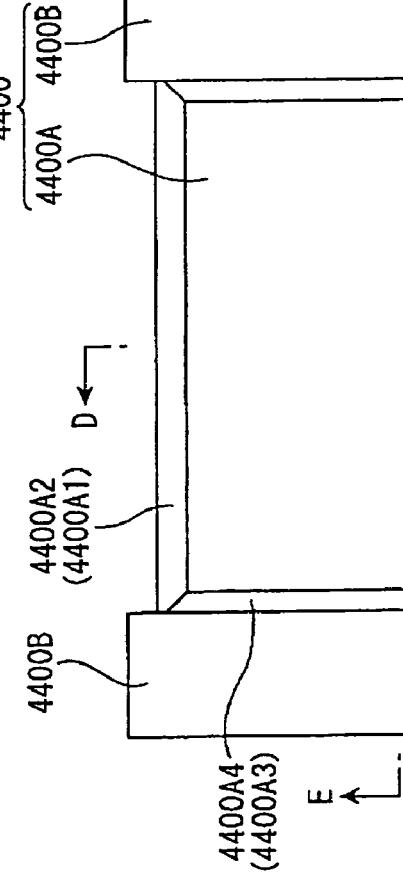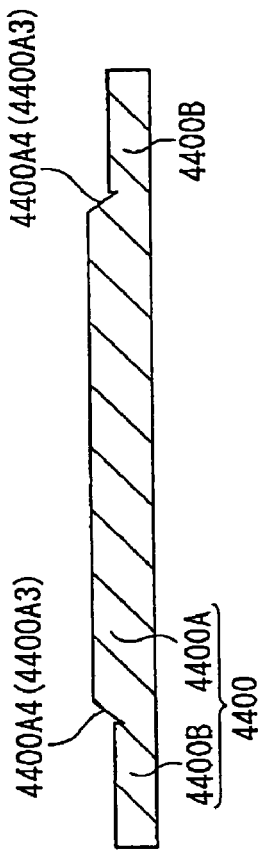

FIG.23A
FIG.23B
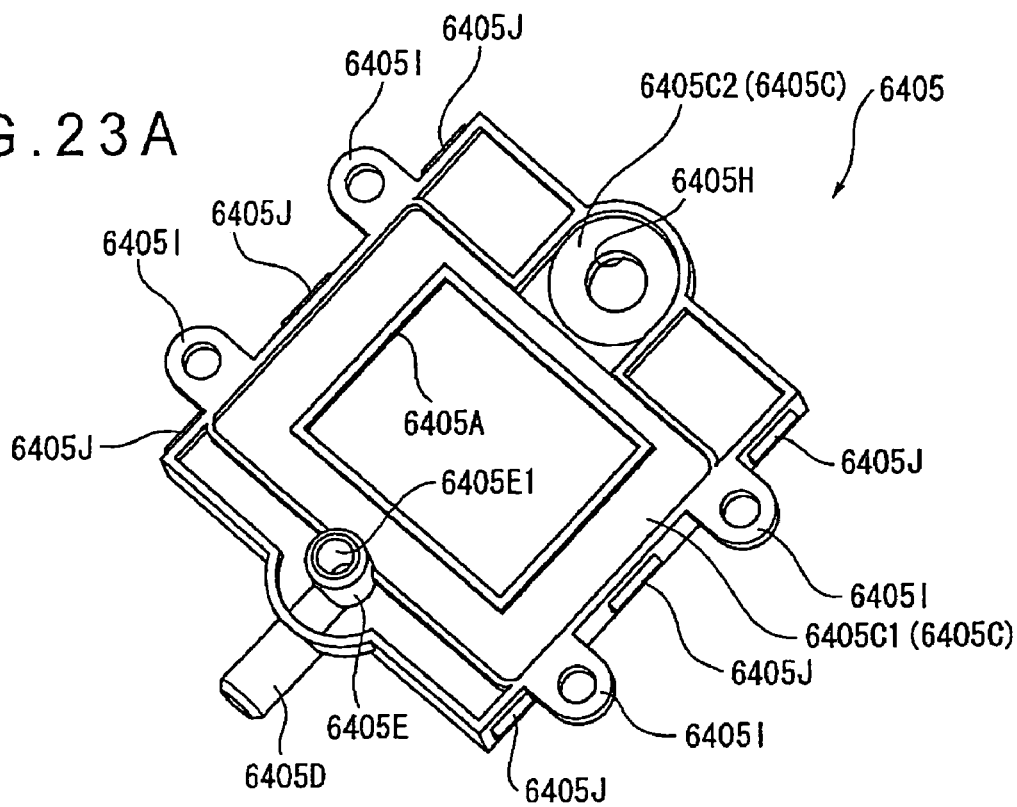
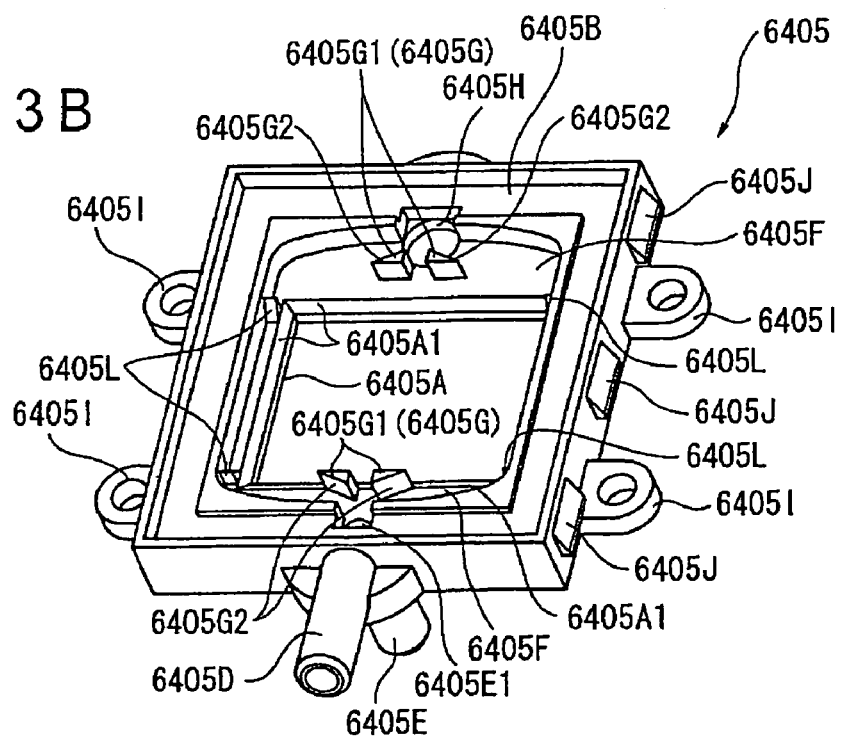

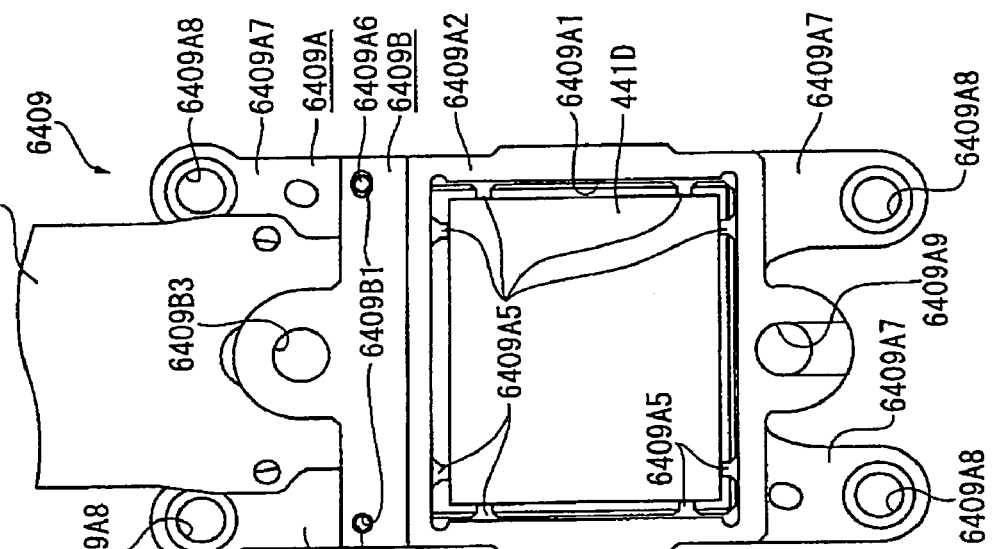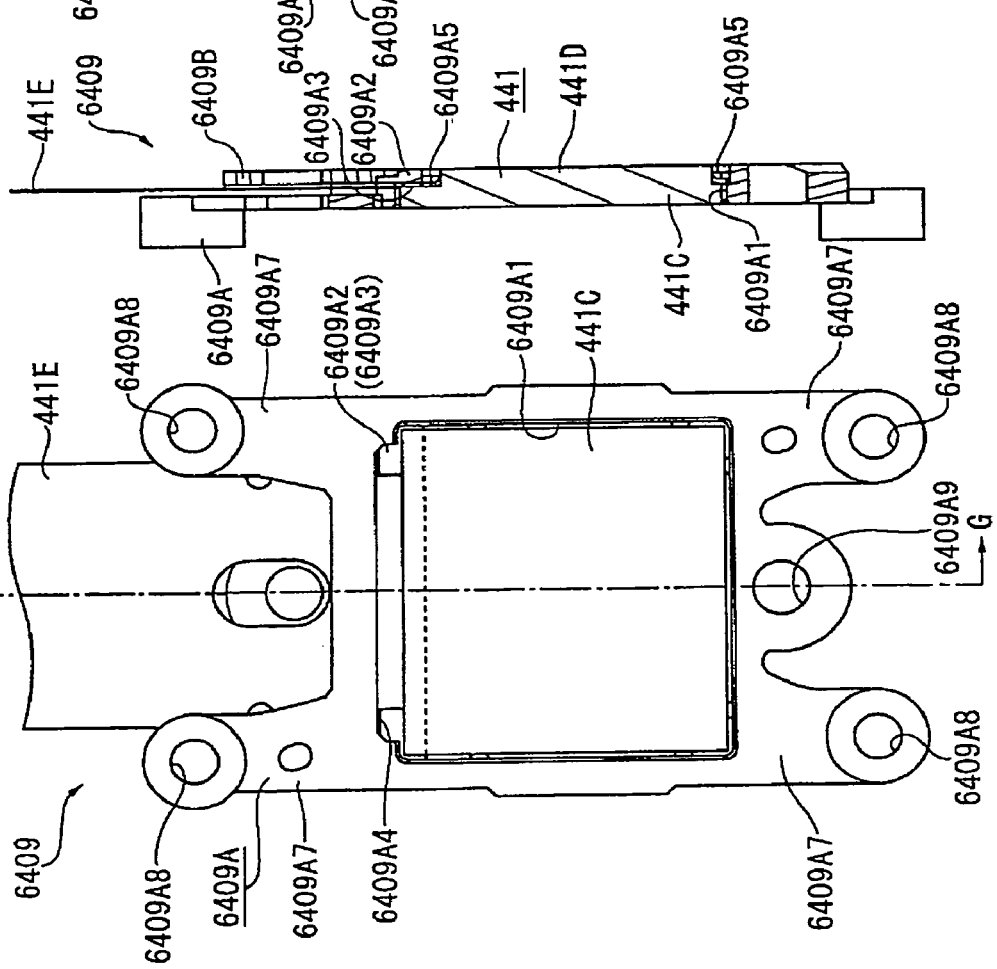

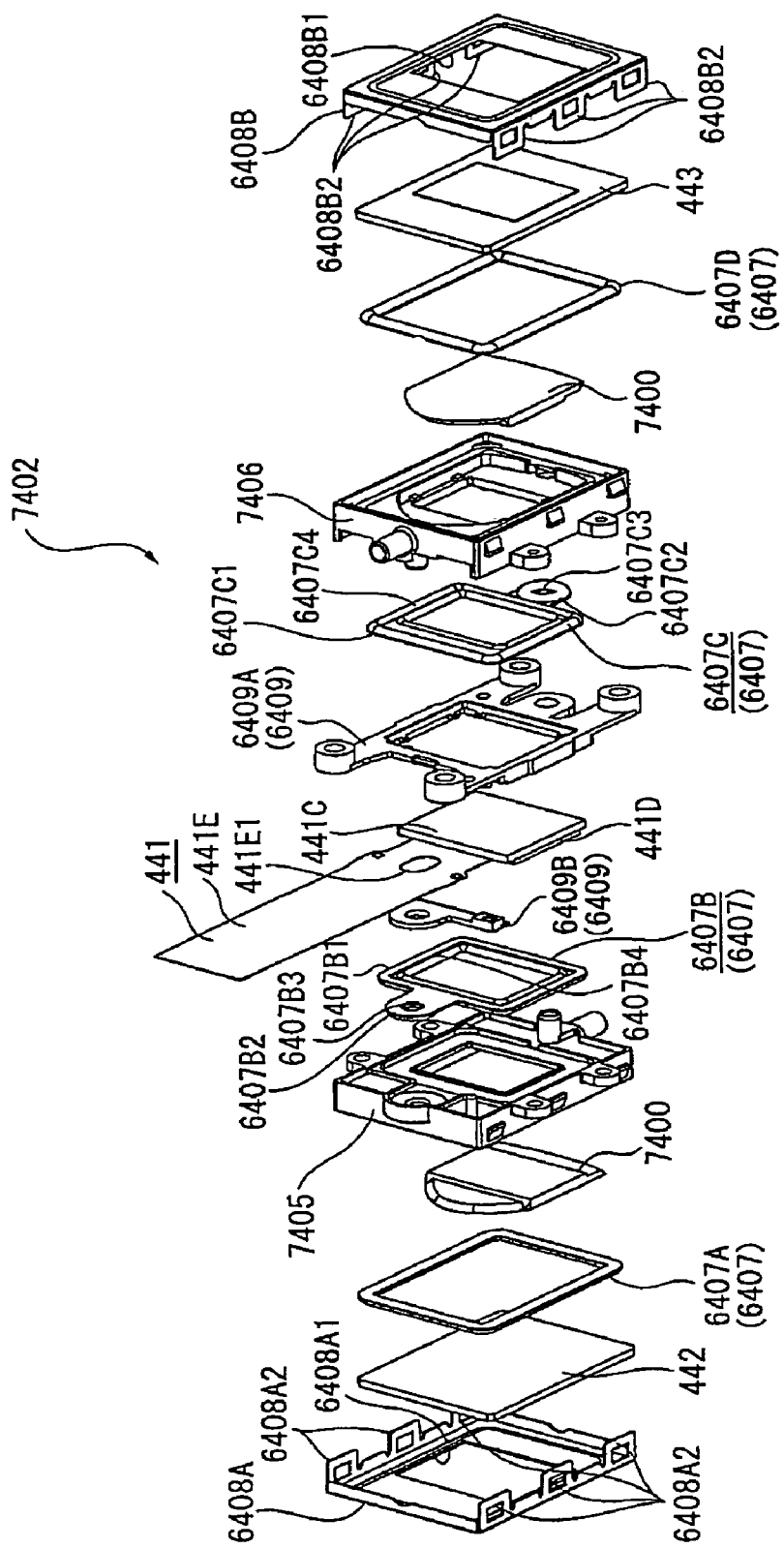

FIG.42A
FIG.42B
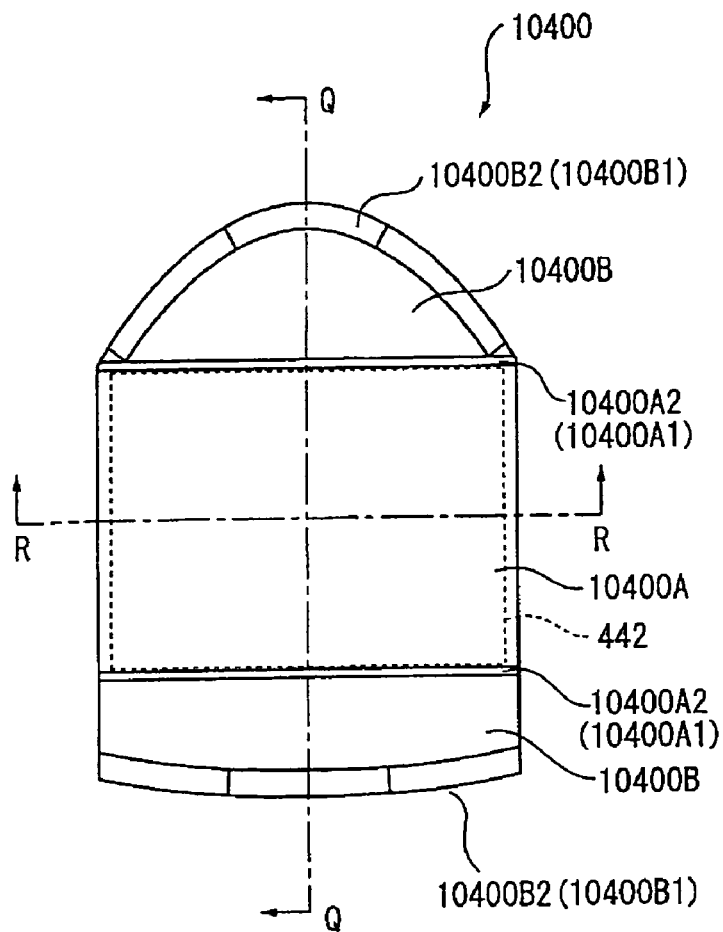
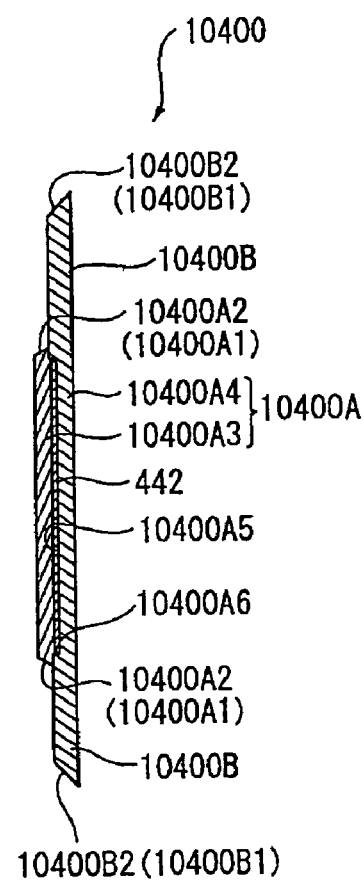
FIG.42C
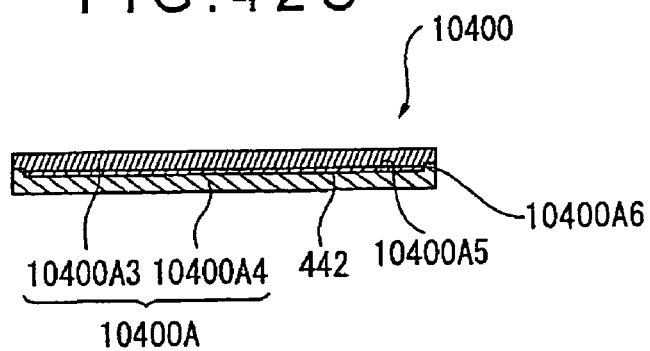

OPTICAL MODULATOR HOLDER, OPTICAL DEVICE, AND PROJECTOR

BACKGROUND OF THE INVENTION

1. Field of the Invention

The present invention relates to an optical modulator holder, an optical device, and to a projector.

2. Description of Related Art

There has been known a projector comprising a plurality of optical modulator devices each for forming an optical image by modulating a light beam irradiated from a light source according to image information, a color-combining optical device for combining light beams modulated by the optical modulator devices, and a projecting optical device for extending and projecting the light beam combined by the color-combining optical device.

Of the devices described above, as the optical modulator device, for instance, generally an optical modulator based on the active matrix driving system with an electrochemical optical material such as a liquid crystal sealed between a pair of substrates is employed. More specifically, the pair of substrate each constituting this optical modulator comprises a driving substrate provided in the light beam irradiation-side with a data line for loading a driving voltage to the liquid crystal, a scanning line, a switching element, a pixel electrode and the like formed thereon, and a counter substrate provided in the light beam incident-side with a common electrode, a black mask and the like formed thereon.

Further an incident-side polarization plate and an irradiation-side polarization plate allowing passage of light beam each having a specific polarization axis are provided in the light beam incident-side and the light beam irradiation-side of this optical modulator respectively.

When a light beam irradiated from a light source is irradiated onto an optical modulator, a temperature of the optical modulator will easily rise due to absorption of light by the liquid crystal layer as well as to absorption of light by a data line and a scanning line formed on the driving substrate, a black matrix formed on the counter substrate and the like. Further of the light beam irradiated from a light source and that having passed through the optical modulator, that having no specific polarization axis is easily absorbed by the incident-side polarization plate and the irradiation-side polarization plate, which often generates heat on the polarization plates.

As described above, for the projector having the optical element as described above, there has been proposed the configuration comprising a cooling device using a cooling fluid for moderate the rise of temperature in the optical element (Refer to, for instance, Japanese Patent Laid-Open Publication No. HEI 3-174134).

Namely, the cooling device described in the document comprises a housing having a substantially rectangular form with the opposing edge faces opened with a cooling chamber for filling a cooling fluid inside thereof. And of the opposing edge faces, an optical element is provided in one of the edge face sides with the incident-side polarization plate provided in the other edge face side, the opposing open edge faces are closed with the optical modulator and the incident-side polarization plate to form a cooling chamber. With the configuration as described above, heat generated by the light beam irradiated from the light source in the optical modulator as well as in the incident-side polarization plate is directly radiated to the cooling fluid.

In the cooling device described in the document, however, a capacity of the cooling fluid sealed in the cooling chamber is small, the heat exchange capacity with the optical elements such as the heated optical modulator, heated incident-side polarization plate and the like is rather low.

Further as a circulation speed of the cooling fluid sealed within the cooling chamber is low, the cooling fluid is easily warmed up by the heated optical elements, so that a temperature difference between the optical element and the cooling fluid becomes smaller by and by.

Therefore, there is the problem that it is difficult to efficiently cool an optical modulator with a cooling fluid in the cooling device described in the document.

SUMMARY OF THE INVENTION

A main object of the present invention is to provide an optical modulator holder, an optical device, and a projector each capable of efficiently cooling an optical modulator with a cooling fluid.

The optical modulator holder according to the present invention holds an optical modulator for forming an optical image by modulating a light beam irradiated from a light source according to image information, and has a cooling chamber with the cooling fluid sealed therein, and is characterized in that the optical modulator holder cools the optical modulator with the cooling fluid in the cooling chamber and comprises a pair of frame members each having an opening corresponding to an optical modulation face of the optical modulator respectively for holding the optical modulator holder therebetween and an light-transmissible substrate provided at least on either one of the sides of the openings opposite to the sides where the pair of frame members are opposed to each other; the cooling chamber is formed within at least one of the pair of frame members by closing the sides of the opening where the pair of frame members are opposed to each other and at least either one of the sides of the openings opposite to the sides where the pair of frame members are opposed to each other respectively with said optical modulator and said light-transmissible substrate; and also in that an inlet port for introducing therethrough the cooling fluid into the cooling chamber, an outlet port for discharging therethrough the cooling fluid inside the cooling chamber to the outside, and a buffer section for temporally accumulating the cooling fluid flowing in via the inlet port and adjusting a flow direction of the cooling fluid to a direction parallel to the optical modulation face and/or a direction perpendicular to the optical modulation face.

The optical modulator holder may comprise one light-transmissible substrate or two light-transmissible substrates. For instance, in the configuration in which the optical modulator holder comprises only one light-transmissible substrate, either one of the faces opposite to openings of a pair of frame members and either one of the faces in the contrary side from the faces opposite to openings of the pair of frame members are closed by the light-transmissible substrate and the optical modulator respectively, so that a cooling chamber is formed only in one of the frame members. In the configuration in which the optical modulator holder comprises two light-transmissible substrates, either one of the faces opposite to openings of a pair of frame members and either one of the faces in the contrary side from the faces opposite to openings of the pair of frame members are closed by two light-transmissible substrates and two optical modulator respectively, so that cooling chambers are formed in the pair of frame members respectively.

With the present invention, at least either one of a pair of frame members has an inlet port and an output port, so that a cooling fluid can be convected, for intance, by connecting the inlet port and the output port to each other with a fluid circulating member through which a cooling fluid can circulate, so that a circulation speed of the cooling fluid inside the cooling chamber can be raised. Further with the configuration as described above, a capacity of a cooling fluid exchanging heat with an optical modulator can be made larger as compared to that in the configuration based on the conventional technology in which a cooling fluid is sealed in a cooling chamber, and therefore a heat exchange capability between an optical modulator and a cooling fluid can be improved.

For the reasons as described above, the cooling fluid is warmed by the optical modulator, so that a temperature difference between the optical modulator and the cooling fluid is always kept large, and therefore the optical modulator can efficiently be cooled by the cooling fluid, thus objects of the prevent invention being achieved.

In the configuration in which a cooling fluid directly flows via an inlet port into a cooling chamber, a flow velocity of the cooling fluid will easily vary from position to position in the cooling chamber. When the flow velocity of the cooling fluid is different from position to position in the cooling chamber, a stripe-like image extending in a direction in which the cooling fluid flows is included in an optical image formed by the optical modulator, and the optical image can not be maintained in good conditions. Further when the flow velocity of the cooling fluid is different from position to position in the cooling chamber, the heat exchange capability between the optical modulator and the cooling fluid varies from position to position on an optical modulation face thereof, so that it is difficult to homogenize a surface temperature of the optical modulator.

With the present invention, the frame member with a cooling chamber formed therein has a buffer section formed at a position not causing planar interference to an optical modulation face of the optical modulator, so that a cooling fluid flowing in via the inlet port can temporally be stored and a flow of the cooling fluid can be changed to a direction parallel to the optical modulation face and/or a direction perpendicular to the optical modulation face. Because of the feature, a flow velocity at various positions inside the cooling chamber can be homogenized with the stripe-like image not included in an optical image formed by the optical modulator, so that the optical image formed by the optical modulator can be maintained in good conditions. Further, as the flow velocity of the cooling fluid at various positions within the cooling chamber can be homogenized, so that also the surface temperature of the optical modulator can be homogenized with local overheating suppressed, and therefore a clear optical image can be formed with the optical modulator.

Preferably the optical modulator holder according to the present invention has a cooling chamber dividing section constituted by a light-transmittable plate-shaped member having a shape corresponding to an optical modulation face of the optical modulator, the cooling chamber dividing section being placed inside the cooling chamber, and dividing the cooling chamber into a light beam incident side region and a light beam irradiation side region for rectifying the direction of the cooling fluid flowing in via the inlet port to a direction perpendicular to the optical modulation face, and the cooling chamber dividing section is provided within the cooling chamber and has a taper portion formed in a side edge section of the inlet port, the cross-sectional area becoming smaller when extends toward the inlet port side, and further the buffer section includes a recess positioned on a periphery of the opening in the frame member with the cooling chamber formed therein and recessing in a direction perpendicular to the optical modulation face, the light-transmissible plate-shaped member, and the cooling chamber dividing section.

With the present invention, as the optical modulator holder comprises the cooling chamber dividing section, a buffer section for temporally storing a cooling fluid flowing therein via an inlet port can be formed with a recess, a light-transmissible plate-shaped member, and a side edge section of the cooling chamber dividing section in the inlet port side. Because of this feature, configuration of the buffer section can be simplified.

Further, by providing the cooling chamber dividing section within the cooling chamber, it is possible to rectify a flow direction of a cooling fluid flowing therein via the inlet port to the light beam incident side or the light beam irradiation side of the cooling chamber dividing section after temporally storing the cooling fluid therein. Further, by providing the cooling chamber dividing section within the cooling chamber, it is possible to reduce the thickness of a cooling fluid layer contacting the optical modulator in the cooling chamber, so that a circulation speed of the cooling fluid contacting the optical modulator can be raised. Because of this feature, it is possible to maintain a temperature difference between the optical modulator and the cooling fluid and to further efficiently cool the optical modulator with the cooling fluid.

Further as a taper portion is formed in the side edge section of the cooling chamber dividing section in the inlet port side thereof, it is possible to smoothly rectify a direction of a cooling fluid flowing therein to the light beam incident side or the light beam irradiation side in the cooling chamber dividing section. Because of this feature, as compared to a cooling chamber dividing section not having a taper portion, a circulation speed of the cooling fluid contacting the optical modulator can be maintained in the better conditions, and also the optical modulator can efficiently be cooled by the cooling fluid.

In the optical modulator holder according to the present invention, the taper portion preferably has a slant surface on the counter face.

In the configuration in which a cooling fluid flows into the buffer section in a direction perpendicular to the optical modulation surface from the counter face toward the light-transmissible substrate, after the cooling fluid flows into the buffer section, a flow rate of the cooling fluid in the cooling chamber dividing section toward the light-transmissible substrate increases. Therefore a flow rate of the cooling fluid toward the optical modulator decreases, and as a result, a circulation speed of the cooling fluid contacting the optical modulator decreases, so that it is difficult to maintain a temperature difference between the optical modulator and the cooling fluid.

With the present invention, the taper portion of the cooling chamber dividing section has a slant surface at lest on the counter face, after the cooling fluid is temporally accumulated in the buffer section, a larger quantity of cooling fluid can be guided toward the optical modulator by the slant surface. Because of this feature, even in the configuration in which the cooling fluid flows into the buffer section in a direction perpendicular to the optical modulation surface from the counter face toward the light-transmissible substrate, a flow rate of the cooling fluid flowing toward the optical modulator can be kept at a prespecified level, and therefore it is possible to maintain a temperature difference between the optical modulator and the cooling fluid and also to efficiently cool the optical modulator with the cooling fluid.

In the optical modulator holder according to the present invention, the cooling chamber dividing section is preferably arranged within the cooling chamber so that the distance to the optical modulator is larger than that to the light-transmissible substrate.

In the configuration in which the cooling fluid flows into the buffer section in a direction perpendicular to the optical modulation surface from the counter face toward the light-transmissible substrate, as described above, a flow rate of cooling fluid flowing toward the optical modulator decreases, and as a result, the circulation speed of the cooling fluid contacting the optical modulator becomes lower, so that it is difficult to maintain a temperature difference between the optical modulator and the cooling fluid.

With the present invention, by arranging the cooling chamber dividing section within a cooling chamber so that the distance to the optical modulator is larger than that to the light-transmissible substrate, it is possible to adjust a flow of the cooling fluid, after the cooling fluid is temporally accumulated in the buffer section, so that a larger quantity of cooling fluid will flow toward the optical modulator. Because of this configuration, even in the configuration in which the cooling fluid cooling fluid flows into the buffer section in a direction perpendicular to the optical modulation surface from the counter face toward the light-transmissible substrate, it is possible to keep a flow rate of the cooling fluid flowing toward the optical modulator at a prespecified level, so that it is possible to maintain a temperature difference between the optical modulator and the cooling fluid and also to efficiently cool the optical modulator with the cooling fluid.

In the optical modulator holder according to the present invention, preferably the cooling chamber dividing section comprises, when provided within the cooling chamber, a dividing section body facing the optical modulator and an extending section having the taper portion and extending from the dividing section body toward the recess two-dimensionally interfering the latter, and the extending section has a convex-curved shape protruding toward the inlet port side on a section facing against the inlet port in the side edge section having the taper portion.

With the present invention, the extending section constituting the cooling chamber dividing section has a convex-curved shape protruding toward the inlet port side on a section facing against the inlet port in the side edge section having the taper portion. Because of this configuration, it is possible to guide a portion of the cooling fluid flowing therein via the inlet port, after temporally accumulating therein, in a direction becoming farther from a section facing against the inlet port in the edge section of the extending section because of the convex-curved shape of the side edge section of the extending section, so that it is possible to change a direction of the cooling fluid to a direction parallel to the optical modulation face of the optical modulator. Because of this configuration, it is possible to change a flow direction of the cooling fluid both to a direction parallel to the optical modulation face and a direction perpendicular to the optical modulation face of the optical modulator by the taper portion of the extending section as well as by the convex-curved shape. Therefore, a flow velocity of the cooling fluid at each position inside the cooling chamber can further be uniformed by the cooling chamber dividing section and an optical image formed by the optical modulator can be maintained in better conditions. Further, because the flow velocity of the cooling fluid at each position within the cooling chamber can be further uniformed, the surface temperature of the optical modulator can further be uniformed to suppress local overheating, so that a clearer optical image can be formed with the optical modulator.

The dividing section body preferably has the thickness larger as compared to that of the extending section and also has a shape expanding toward the counter face described above.

When the cooling chamber dividing section has the extending section, the extending section two-dimensionally interferes with the recess on the frame member, and when the cooling chamber dividing section is provided within the cooling chamber, the distance between the dividing section body and the optical modulator will be unnecessarily larger than that between the dividing section body and the light-transmissible substrate. Because of this feature, it is difficult to control a circulation speed of the cooling fluid flowing toward the optical modulator at a desired speed, and therefore it is difficult to maintain a temperature difference between the optical modulator and the cooling fluid.

With the present invention, the dividing section body has the thickness larger than that of the extending section and has a shape expanding toward the counter face, so that it is possible to set a distance between the dividing section body and the optical modulator and that between the dividing section body and the light-transmissible substrate to desired values respectively. Because of this feature, a circulation speed of the cooling fluid flowing toward the optical modulator can be controlled to a desired value, so that it is possible to effectively maintain a temperature difference between the optical modulator and the cooling fluid.

In the optical modulator holder according to the present invention, the extending section preferably has a shape with the thickness gradually becoming larger toward the dividing section body.

With the present invention, even when the dividing section body has a shape with the thickness gradually becoming larger toward the extending section and expanding to the counter face, as the extending section has a shape with the thickness gradually becoming larger toward the dividing section body, a step caused by a different in the thickness between the extending section and the dividing section body can be eliminated, so that a cooling fluid flowing toward the optical modulator does not-collide the step and can smoothly be convected. Because of this feature, a circulation speed of the cooling fluid flowing toward the optical modulator can easily be controlled to a desired speed and the temperature difference between the optical modulator and the cooling fluid can be maintained in the better conditions.

In the optical modulator holder according to the present invention, the extending section preferably has, when placed inside the cooling chamber, a shape in which a portion facing against the inlet port on an edge face of the counter face has a convex-curved surface protruding toward the counter face.

In the extending section according to the present invention, the portion of the extending section facing against the inlet port on an edge face of the counter face has a convex-curved face protruding toward the counter face. Because of this feature, it is possible to guide a portion of the cooling fluid in a direction away from the portion of the extending section facing against the inlet port in an edge face of the counter face opposite to the optical modulator, so that a flow direction of the cooling fluid can more smoothly be rectified to a direction parallel to an optical modulation face of the optical modulator. Therefore, with the taper portion of the extending section, convex-curved shape of the side edge portion of the extending section, and also the convex-curved shape of an edge face of the extending section on an edge face in the counter face side, a direction of the cooling fluid can smoothly be rectified both to a direction parallel to the optical modulation face and to a direction perpendicular to the optical modulation face. Because of this configuration, a flow velocity of the cooling fluid at each position within the cooling chamber can further be uniformed by the cooling chamber dividing section, so that an optical image formed by the optical modulator can be maintained in further better conditions. As the flow velocity of the cooling fluid at each position inside the cooling chamber can further be uniformed, also a surface temperature of the optical modulator can further be uniformed with the local overheating suppressed, and a clearer optical image can be formed with the optical modulator.

In the optical modulator holder according to the present invention, the cooling chamber dividing section is formed by laminating a plurality of plate-shaped members, and preferably at least one optical converter for converting optical modulator of an incident light beam is provided at a space between at least a pair of adjoining plate-shaped members.

As the optical converter, for instance, any of a polarizing plate, a phase contrast plate, a view angle correcting plate or the like may be used.

With the present invention, as at least one optical converter is provided at a space between at least a pair of adjoining plate-shaped members among the plurality of plate-shaped members in the cooling chamber dividing section, also the heat generated not only in the optical modulator but also in the optical converter by a light beam irradiated from a light source can be released via the plate-shaped members to a cooling fluid circulating in the light beam incident side as well as in the light beam irradiation side of the cooling chamber dividing section.

As not only an optical modulator but also a peripheral optical converter can be integrated with the optical modulator holder, so that the cooling capability of these optical elements can be improved and also the size reduction is possible.

In the optical modulator holder according to the present invention, preferably the cooling chamber dividing section has a recess in which at least one optical converter capable of converting optical characteristics of an incident light beam can be engaged, and the recess is covered with a water-repelling film so that at least one optical converter engaged in the recess is covered with the film.

As the optical converter, any of a polarizing plate, a phase contrast plate, a view angle correcting plate or the like may be used as described above.

With the present invention, as at least one optical converter is engaged in a recess formed in the cooling chamber dividing section and a water-repelling film covers the at least one optical converter, not only the heat generated in the optical modulator, but also the heat generated in the optical converter by the light beam irradiated from a light source can be release via the water-repelling film or the cooling chamber dividing section to the cooling fluid circulating in the light beam incident side and also in the light irradiation side of the cooling chamber dividing section.

Further as at least one optical converter is engaged in the recess formed in the cooling chamber dividing section and covered with the water-repelling film, heat is easily released to the cooling fluid via the water-repelling film, and the cooling capability for the at least one optical converter can be improved.

Further as at least one optical converter is engaged in the recess formed in the cooling chamber dividing section and covered with the water-repelling film, the property of the dividing section to be wet by the cooling fluid can be suppressed by making larger a contact angle between the cooling chamber dividing section and the cooling fluid. Because of this feature, air bubbles and dusts contained in the cooling fluid are hardly deposited on the water-repelling film, so that generation of an unnecessary image in an optical image formed by the optical modulator due to bubbles and dusts can be prevented, and an optical image formed by the optical modulator can be maintained in good conditions.

Further as not only an optical modulator but also a peripheral optical converter can be integrated with the optical modulator holder, so that the capability of cooling these optical elements can be improved and also the size reduction is possible.

In the optical modulator holder according to the present invention, preferably the buffer section comprises, in addition to the recess, light-transmissible substrate, and cooling chamber dividing section, a rectifying section provided in the recess for rectifying a flow direction of the cooling fluid flowing in via the inlet port so that the flow extends inside the cooling chamber keeping the flowing direction parallel to the optical modulation face and the cooling chamber and the rectifying section are arranged so that the facial interference will not occur.

With the present invention, the buffer section has the recess, light-transmissible substrate, cooling chamber dividing section and rectifying section, it is possible to rectify a flow direction of a cooling fluid flowing in via an inlet port, after once accumulating therein, to a direction parallel to the optical modulation face of the optical modulator with the rectifying section and also to rectify a flow direction of the cooling fluid to a direction perpendicular to the optical modulation face of the optical modulator inside the cooling chamber dividing section. Because of this feature, with both of the rectifying section and the cooling chamber dividing section, a flow velocity of the cooling fluid at each position inside the cooling chamber can further be uniformed, and an optical image formed by the optical modulator can be maintained in better conditions. As a flow velocity of the cooling fluid at each position in the cooling chamber can further be uniformed, also a surface temperature of the optical modulator can further be uniformed with local overheating suppressed, so that a clearer optical image can be formed with the optical modulator.

In the cooling chamber dividing section and the rectifying section of the optical modulator holder according to the present invention, a distance between the cooling chamber dividing section and the light-transmissible substrate is preferably larger than that between the rectifying section and the light-transmissible substrate.

With the present invention, the cooling chamber dividing section and the rectifying section are formed as described above, a cooling fluid flowing into the buffer section can temporally be blocked by the rectifying section positioned nearer to the inlet port as compared to the side edge section of the cooling chamber dividing section. Because of this configuration, a flow velocity of the cooling fluid at each position within the cooling chamber can more effectively be uniformed by the cooling chamber dividing section and the rectifying section.

In the optical modulator holder according to the present invention, a recess positioned on a periphery of the opening and recessing in a direction perpendicular to the optical modulation face is formed in the frame member with the cooling chamber formed therein, and the buffer section preferably has the recess, light-transmissible substrate, and the rectifying section provided between the recess and the light-transmissible substrate for rectifying a flow direction of the cooling fluid flowing therein via the inlet port so that the flow extends into the cooling chamber keeping the flow direction parallel to the optical modulation face.

With the present invention, as the optical modulator holder has the rectifying section, a buffer section for temporally accumulating therein a cooling fluid flowing therein via the inlet port can be formed by the recess, light-transmissible substrate and rectifying section. Because of this feature, configuration of the buffer section can be simplified.

Further it is possible to once accumulate a cooling fluid flowing therein via the inlet port and then rectify the flow direction to a direction parallel to the optical modulation face of the optical modulator with the rectifying section. Because of this feature, a flow velocity of the cooling fluid can effectively be uniformed on a surface parallel to the optical modulation face of the optical modulator with the rectifying section.

In the optical modulator holder according to the present invention, preferably the rectifying section comprises a plurality of columns each having a rectifying face capable of rectifying the cooling fluid flowing therein via the inlet port so that the cooling fluid extends in the cooling chamber keeping the flow direction parallel to the optical modulation face.

With the present invention, as the rectifying section comprising a plurality of columns each having a rectifying face, after the cooling fluid flowing in via the inlet port is temporally accumulated, a flow direction of the cooling fluid can easily be rectified to a direction parallel to the optical modulation face of the optical modulator with the simple configuration.

In the optical modulator holder according to the present invention, the rectifying section preferably has a plurality of grooves each extending in a direction perpendicular to the flow-in direction of the cooling fluid flowing therein via the inlet and provided on an edge face of the light-transmissible substrate side along the flow-in direction of the cooling fluid.

With the present invention, for instance by forming the rectifying section so that, the rectifying section is positioned near the light-transmissible substrate when placed inside the cooling chamber, it is possible to temporally block the cooling fluid flowing into the buffer section with the rectifying section. The cooling fluid once blocked flows through the plurality of grooves formed on an edge face of the rectifying section in the light-transmissible substrate side. Because of this configuration, the cooling fluid flowing at a uniformed flow velocity in the direction parallel to the optical modulation face of the optical modulator can effectively be flown from the buffer section to a region two-dimensionally interfering the optical modulation face.

In the optical modulator holder according to the present invention, preferably the rectifying section extends in a direction perpendicular to a flow-in direction of the cooling fluid flowing in via the inlet port and has a height dimension in the direction perpendicular to the optical modulation face becoming smaller toward at positions farther away from a portion facing against the inlet port.

With the present invention, as the rectifying section has the shape as described above, it is possible to once accumulate a cooling fluid flowing in via the inlet port and then guide the cooling fluid toward a portion away from that facing against the inlet port in the rectifying section, so that a flow direction of the cooling fluid can easily be rectified to a direction parallel to the optical modulation face of the optical modulator.

By forming the rectifying section as described above and also providing the rectifying face described above, it is possible to effectively rectify a flow direction of a cooling fluid in a direction parallel to the optical modulation face of the optical modulator and also to effectively uniform a flow velocity of the cooling fluid.

In the optical modulator holder according to the present invention, the rectifying section preferably can be loaded on and off from the recess.

In the present invention, the rectifying section can be loaded on and off from the recess, namely the rectifying section and the frame member are independent bodies respectively. Because of this configuration, as compared to the configuration in which the rectifying section and the frame member are integrated with each other, the rectifying section can be formed in various shapes. Because of this feature, a freedom in designing the optical modulator holder is improved.

In the optical modulator holder according to the present invention, the frame member in which the cooling chamber is formed therein is preferably a molded product formed by molding, and the rectifying section is monolithically formed in the recess.

With the present invention, as the rectifying section and the frame member are formed monolithically, as compared to the case in which the rectifying section and the frame member are independent bodies respectively, a work for setting the rectifying section can be omitted, so that the work for assembling the optical modulator holder can be performed easily.

In the optical modulator holder according to the present invention, the rectifying section preferably has a plurality of holes each enabling passage of the cooling fluid.

With the present invention, as a plurality of holes are formed in the rectifying section, when the cooling fluid flows through the plurality of holes, bubbles, dusts and the like contained in the cooling fluid can be captured by the plurality of holes. Because of this feature, it is possible to prevent an image formed due to a light beam incident to bubbles, dusts and the like contained in the cooling fluid from being included in an optical image formed with the optical modulator, so that an optical image formed with the optical modulator can be maintained in good conditions.

In the optical modulator holder according to the present invention, preferably the buffer section is formed both in the inlet port side and in the outlet port side.

With the present invention, as the buffer section is formed both in the inlet port side and in the outlet port side, even when a flow direction of the cooling fluid is inverted, namely when the inlet port functions as an outlet port and the outlet port as an inlet port, as the buffer section is formed in the outlet port side, it is possible to temporally accumulate a cooling fluid flowing in via the inlet port and then rectify the flow direction of the cooling fluid to a direction parallel to the optical modulation face and/or to a direction perpendicular to the optical modulation face. Because of this feature, for instance, even when a flow direction of the cooling fluid is inverted, a flowing velocity of the cooling fluid at each position within the cooling chamber can be uniformed, so that an optical image formed with the optical modulator can be maintained in good conditions with the surface temperature of the optical modulator uniformed, so that a clearer optical image can be formed.

The optical device according to the present invention comprises an optical modulator for modulating a light beam irradiated from a light source according to image information to form an optical image and comprises the optical modulator holder described above, a plurality of fluid circulating members each connected to an inlet port and an outlet port of the optical modulator holder for guiding the cooling fluid to outside of the cooling chamber and again into the cooling chamber, and a fluid pressuring and circulating section provided in a flow-pass for the cooling fluid in each of the plurality of fluid circulating members for pressurizing and circulating the cooling fluid via the plurality of fluid circulating member to forcefully circulate the cooling fluid.

With the present invention, the optical device comprises the optical modulator holder, the plurality of fluid circulating sections and fluid pressurizing and circulating section, so that the same actions and advantages as those provided by the optical modulator holder described above are provided.

Further as a cooling fluid is forcefully circulated by the fluid pressurizing and circulating section, so that a cooling fluid in the cooling chamber can always be convected without fail. Because of this feature, it is possible to secure a large temperature difference between the optical modulator and the cooling fluid, so that the efficiency in cooling the optical modulator can be improved.

Further as the buffer section is formed in the optical modulator holder, the cooling fluid pressurized and circulated by the fluid pressurizing and circulating section can temporally be accumulated in the buffer section. Because of this feature, a pressure of the cooling fluid pressurized and circulated by the fluid pressurizing and circulating section is not directly loaded to inside of the cooling chamber, namely the pressure is not loaded to the optical modulator nor to the light-transmissible substrate. Therefore, a pressure loaded to the optical modulator can be adjusted by the buffer section, and degradation of image quality due to a pressure loaded to the optical modulator can be prevented.

The optical device according to the present invention has at least one optical converter for converting optical characteristics of an incident light beam, and the optical converter comprises a light-transmissible substrate and an optical conversion film formed on the light-transmissible substrate for converting optical characteristics of an incident light beam, and the light-transmissible substrate constituting the optical modulator holder described above is preferably the light-transmissible substrate constituting the optical converter.

As the optical converter, any of a polarizing plate, phase differential plate, a viewing angle correcting plate and the like may be employed as described above.

With the present invention, the light-transmissible substrate constituting the optical modulator holder is the one also constituting the optical converter, not only heat generated by the optical modulator, but also heat generated in the optical conversion film by the light beam irradiated from the light source can be released to the cooling fluid circulating in the cooling chamber.

Further as not only the optical modulator but also a peripheral optical converter can be integrated with the optical modulator holder, the efficiency in cooling these optical elements can be improved and also the size reduction is possible.

The projector according to the present invention comprises the optical device described above, and a projecting optical device for projecting an optical image formed by the optical device in the enlarged state.

With the present invention, as the projector comprises a light source, the optical device described above, and a projecting optical device, the same actions and advantages as those provided in the optical device are provided.

Further as the projector has the optical device, degradation of the optical modulator due to heat can be prevented, so that an operating life of the projector can be prolonged.

Further as the projector has the optical device described above, an optical image formed by the optical modulator can be maintained in good conditions, and a clear optical image can be projected by the projector in the enlarged state.

BRIEF DESCRIPTION OF THE DRAWINGS

FIG. 8 is a perspective view of a frame member viewed from the light beam incident side according to the first embodiment;

FIGS. 17A, 17B, and 17C are views each showing a construction of the cooling chamber dividing section according to the third embodiment;

FIG. 23A and FIG. 23B are views each showing a general configuration of a frame member according to the fourth embodiment;

FIGS. 26A, 26B, and 26C are views each showing a state of the supporting frame incorporating a liquid crystal panel according to the fourth embodiment;

FIG. 33 is an exploded perspective view showing a general configuration of an optical modulator holder according to a seventh embodiment;

FIGS. 42A, 42B and 42C are views each showing a construction of a cooling chamber dividing section according to a tenth embodiment;

DETAILED DESCRIPTION OF PREFERRED EMBODIMENT(S)

First Embodiment

A first embodiment of the present invention is described below with reference to the related drawings.

[Configuration of the Projector]

Figure 1:
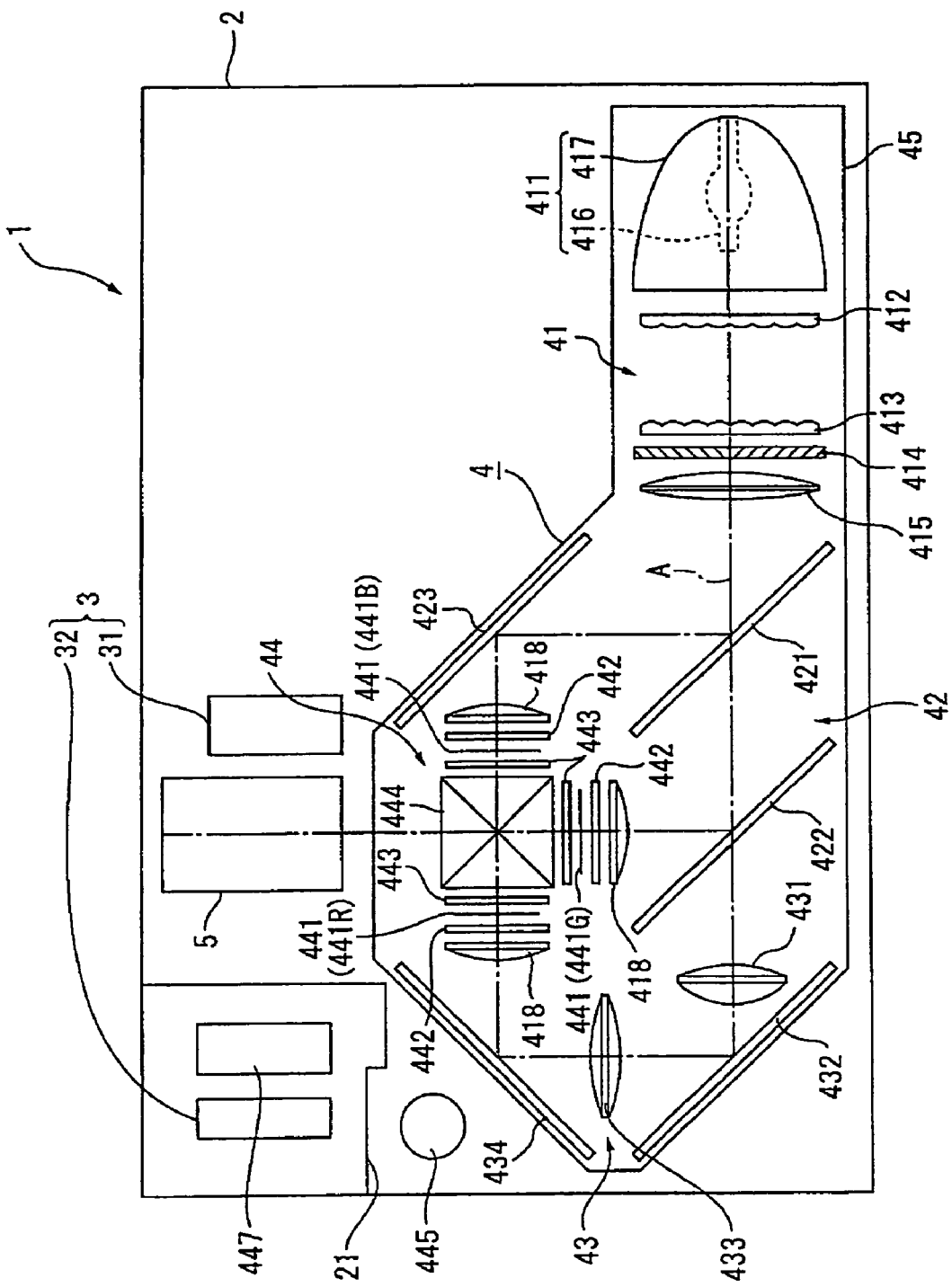
FIG. 1 is a view schematically showing the general configuration of a projector according to each embodiment of the present invention.

FIG. 1 is a view schematically showing the general configuration of a projector 1.

The projector 1 forms an optical image by modulating a light beam irradiated from a light source according to image information, and projects the formed optical image onto a screen in the enlarged state. The projector 1 comprises an exterior case 2, a cooling unit 3, an optical unit 4, and a projector lens 5.

In FIG. 1, although not shown, a power block, a lamp driving circuit, and the like are provided in spaces other than those to the cooling unit 3, optical unit 4, and projector lens 5 in the exterior case 2.

The exterior case 2 is made from a synthetic resin or the like, and has a substantially rectangular solid shape with the cooling unit 3, optical unit 4, and projector lens 5 accommodated therein. This exterior case 2 comprises an upper case constituting a ceiling, a front face, a rear face, and side faces of the projector 1 respectively, and a lower case constituting a bottom face, a front face, side faces, and a rear face of the projector 1 respectively, and the upper case and the lower case are fixed to each other with a screw or the like.

A raw material for the exterior case 2 is not limited to a synthetic resin, and other materials may be used, and for instance, the exterior case 2 may be made from a metal.

Although not shown, an air inlet port for introducing cooling air by the cooling unit 3 from outside of the projector 1 (for instance, air inlet port 22 in FIG. 2) and an air exhaust port for exhausting air warmed up in the projector 1 are provided in the exterior case 2.

Further formed in this exterior case 2 is a partition wall 21 positioned by the projector lens 5 and at a corner section of the exterior case 2 for partitioning a radiator for an optical device described hereinafter in the optical unit 4 from other components.

The cooling unit 3 sends cooling air into a cooling flow path formed inside the projector 1, and cools heat generated in the projector 1. This cooling unit 3 comprises a sirocco fan 31 positioned at the side of the projector lens 5 for introducing cooling air outside the projector 1 from an air inlet port (not shown) and formed in the exterior case 2 and blowing the cooling air onto a liquid crystal panel of the optical device of the optical unit 4 described hereinafter, and an axial flow fan 32 positioned inside the partition wall 21 formed in the exterior case 2 for introducing cooling air outside the projector 1 from an air inlet port 22 (Refer to FIG. 2) formed in the exterior case 2 and blowing the cooling air to a radiator of the optical unit 4 described hereinafter.

Although not shown in the figures, the cooling unit 3 has, in addition to the sirocco fan 31 and the axial flow fan 32, has a light source for the optical unit 4 described below, a power block, a lamp driving circuit, and the like (not shown).

The optical unit 4 is a unit for forming an optical image (color image) according to image information by optically processing a light beam irradiated from a light source. This optical unit 4 has a substantially L-shaped form extending along a rear face of the exterior case 2 and also extending along a side face of the exterior case 2 as shown in FIG. 1. Configuration of this optical unit 4 is described in detail hereinafter.

The projector lens 5 is a composite lens comprising a plurality of lenses assembled together. This projector lens 5 projects an optical image (color image) formed by the optical unit 4 onto a screen (not shown) in the enlarged state.

[Detailed Configuration of the Optical Unit]

As shown in FIG. 1, the optical unit 4 comprises an integrator illuminating optical system 41, a color separating optical system 42, a relay optical system 43, an optical device 44, and a casing 45 for optical components for accommodating therein the optical components 41 to 44.

The integrator illuminating optical system 41 is an optical system for substantially homogeneously illuminating an image forming region of a liquid crystal panel constituting the optical device 44. This integrator illuminating optical system 41 comprises, as shown in FIG. 1, a light source 411, a first lens array 412, a second lens array 413, a polarization converter 414, and a superposing lens 415.

The light source 411 comprises a light source lamp 416, and a reflector 417 for reflecting irradiated light irradiated from this light source lamp 416. As the light source lamp 416, a halogen lamp, a metal hydride lamp, a high pressure mercury lamp are often used. As the reflector 417, a parabolic mirror is used in FIG. 1, but the present invention is not limited to this configuration, and also the configuration is allowable in which an ellipsoidal mirror is used and a parallelizing concave lens for parallelizing a light beam reflected on the ellipsoidal mirror is employed in the light beam irradiation side.

The first lens array 412 has the configuration in which a plurality of small lenses each having a substantially rectangular contour when viewed from the light axis side are arrayed in the matrix form. Each of the small lenses divides a light beam irradiated from the light source 411 to a plurality of partial light beams.

The second lens array 413 has the substantially same configuration as that of the first lens array 412, in which a plurality of small lenses are arrayed in the matrix form. This second lens array 413 has the function to, with the superposing lens 415, form an image picked up by each of the small lenses in the first lens array 412 on a liquid crystal panel of the optical device 44 described hereinafter.

The polarization converter 414 is provided between the second lens array 413 and the superposing lens 415, and converts light from the second lens array 413 to a substantially one type of polarize light.

More specifically, each of the partial light beams converted to a substantially one type of polarized by the polarization converter 414 is finally superimposed by the superposing lens 415 onto the liquid crystal panel of the optical device 44. As only one type of polarized light can be used in a projector using a liquid crystal panel for modulating polarized light, a substantially half of light irradiated from the light source 411 emitting random polarized light To cope with this problem, by using the polarization converter 414, the light irradiated from the light source 411 is converted to substantially one type of polarized light to improve the efficiency in utilization of light in the optical device 44.

The color separating optical system 42 comprises, as shown in FIG. 1, two sheets of dichroic mirrors 421, 422, and a reflection mirror 423, and has the function to separate a plurality of light beams irradiated from the integrator illuminating optical system 41 into three color lights of red light, green light, and blue light with the dichroic mirrors 421, 422.

The relay optical system 43 comprises, as shown in FIG. 1, an incident-side lens 431, a relay lens 433, and reflection mirrors 432, 434, and has the function to lead the red light separated by the color separating optical system 42 to a liquid crystal panel for red light of the optical device 44 described hereinafter.

In this step, the dichroic mirror 421 in the color separating optical system 42 reflects the blue light component irradiated from the integrator illuminating optical system 41, while the red light and green light components pass through the dichroic mirror 421. The blue light reflected by the dichroic mirror 421 is reflected on the reflection mirror 423, passes through the a field lens 418, and reaches a liquid crystal panel for blue light of the optical device 44. This field lens 418 converts each of partial light beams irradiated from the second lens array 413 to that parallel to the center line (key light). Also the field lenses 418 provided in the light incident-side of the liquid crystal panels for green light and red light respectively has the same function.

Of the red light and green light passed through the dichroic mirror 421, the green light is reflected by the dichroic mirror 422, passes through the field lens 418, and reaches a liquid crystal panel for green light of the optical device 44. On the other hand, the red light passes through the dichroic mirror 422, and also passes through the relay optical system 43 and field lens 418, and reaches a liquid crystal panel for red light of the optical device 44. It is to be noted that the relay optical system 43 is used for red light because the length of a light pass for the red light is longer than those for other color lights and it is necessary to prevent drop of efficiency in utilization of light due to exhalation of light or for some other reasons. Namely, the relay optical system 43 is used to deliver partial light beams introduced into the incident-side lens 431 as they are to the field lens 418.

As shown in FIG. 1, the optical device 44 comprises three sheets of liquid crystal panels 441 (the liquid crystal panel for red light is indicated by 441R, liquid crystal panel for green light by 441G, and that for blue light by 441B respectively), an incident-side polarization plate 442 and irradiation-side polarization plate 443 as optical converters provided in the light beam incident side and light beam irradiation side of the liquid crystal panel 441, and a cross dichroic prism 444 as a color combining optical device, and these components are formed monolithically.

The optical device 44 (the specific configuration thereof will be described in detail below) comprises, in addition to the liquid crystal panel 441, incident-side polarization plate 442, irradiation-side polarization plate 443, cross dichroic prism 444, a main tank, a fluid press-feeding section, a radiator, a fluid circulating member, a fluid branching section, an optical modulator holder, and a relay tank.

Although not shown in the figure specifically, the liquid crystal panels 441 has the configuration in which liquid crystal panel as a electrochemical substance is sealed in a pair of transparent glass substrate, and the orientation of the liquid crystal panel is controlled according to a drive signal outputted from a control unit (not shown), and also the liquid crystal panel 441 modulates a polarizing direction of a polarized flight beam irradiated from the incident-side polarization plate 442.

The incident-side polarization plate 442 receives lights having various colors with the polarizing direction aligned to the substantially same direction by the polarization converter 414, and allows passage therethrough, of the irradiated light beams, only polarized light having the substantially same direction as the polarization axis of the flight beam aligned by the polarization converter 414, and absorbs other light beams. The incident-side polarization plate 442 has the configuration in which a polarization film as an optically converting film is adhered to a light-transmissible substrate such as sapphire glass or crystalline quartz.

The irradiation-side polarization plate 443 has the substantially same configuration as that of the incident-side polarization plate 442, and allows passage throughthere, of the light beams irradiated from the liquid crystal panels 441, only light beams having the polarization axis perpendicular to the light beam transmission axis of the incident-side polarization plate 442, and absorbs other light beams.

The cross dichroic prism 444 is an optical element for forming a color image by combining an optical image modulated for each of color lights irradiated from the irradiation-side polarization plate 443. The cross dichroic prism 444 has a substantially square form when viewed from the top in which four right angle prisms are adhered to each other, and two dielectric multilayered films are formed on an interface between the right angle prisms. These dielectric multilayered films reflect color lights irradiated from the liquid crystal panels 441R, 441B and having passed through the irradiation-side polarization plate 443, and allows passage therethrough of color lights irradiated from the liquid crystal panel 441G and having passed through the irradiation-side polarization plate 443. Thus the color lights modulated by the liquid crystal panels 441R, 441G, and 441G are combined to form a color image.

Figure 2:
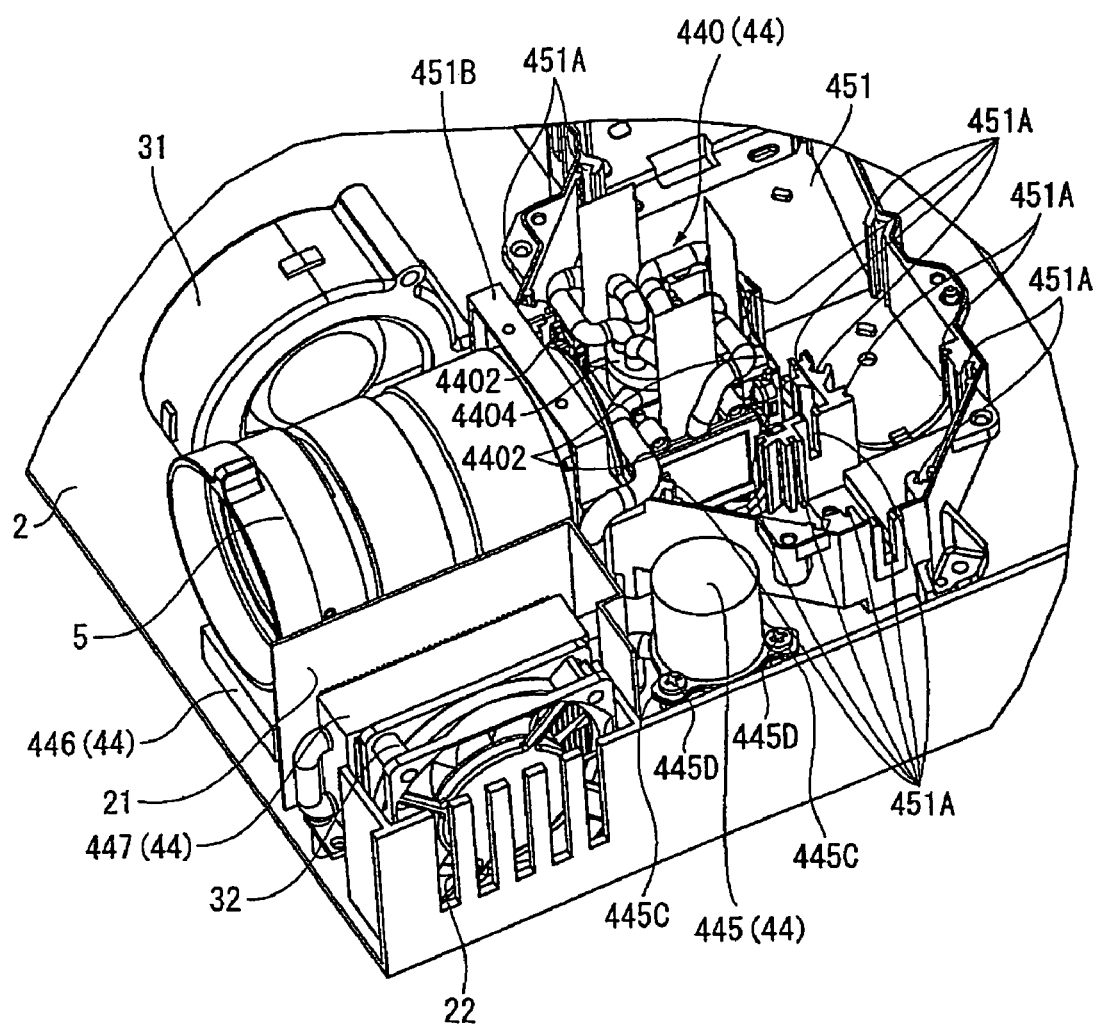
FIG. 2 is a perspective view of a portion inside of the projector viewed from the top side according to a first embodiment.

FIG. 2 is a perspective view showing a portion of inside of the projector 1 viewed from above. In FIG. 2, to simplify the description, of the optical components provided within the casing 45 for optical components, only a main body of optical device of the optical device 44 is described, and other optical components 41 to 43 are not shown.

Figure 3:
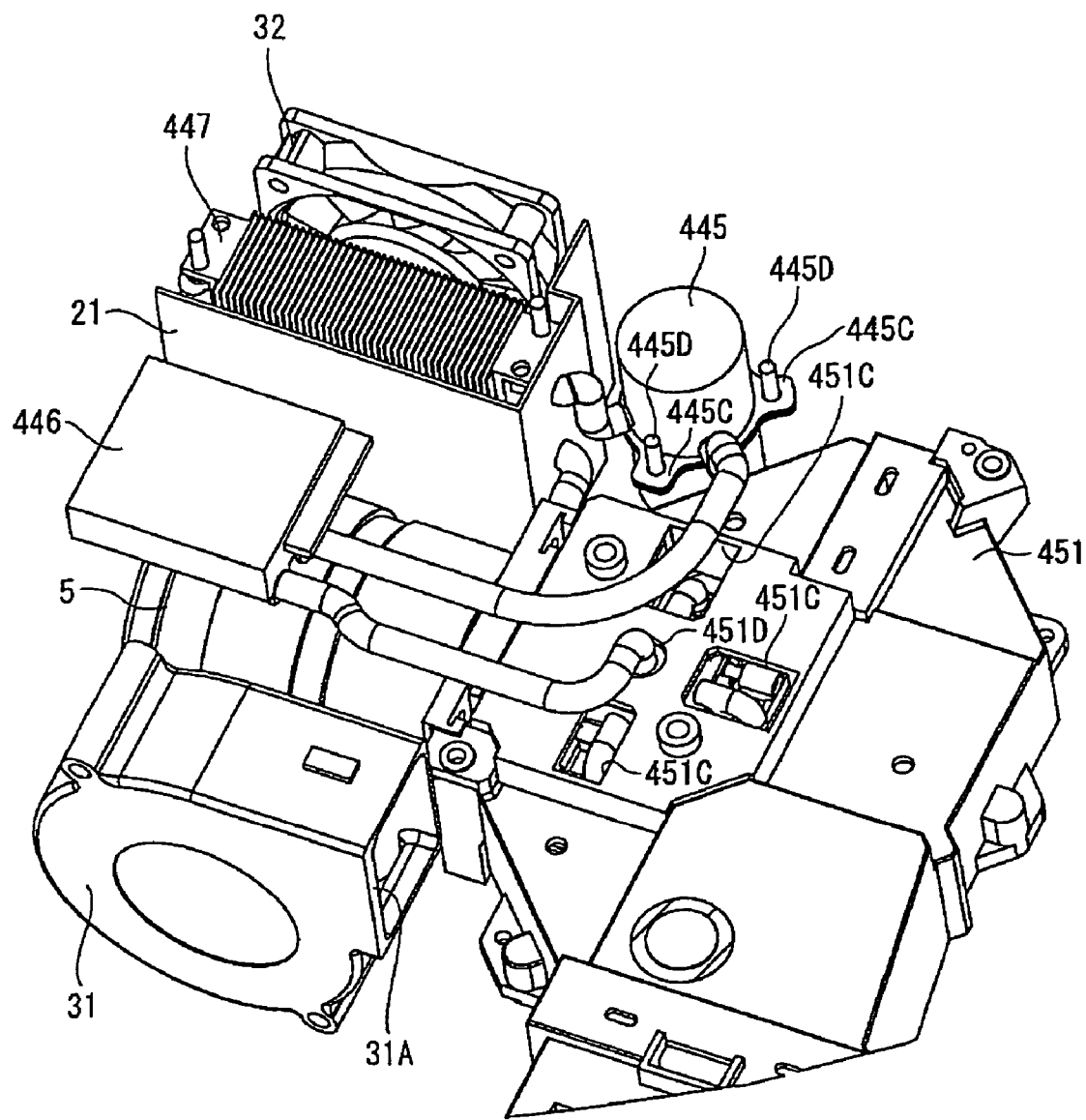
FIG. 3 is a perspective view of a portion inside of the projector viewed from the bottom side according to the first embodiment.

FIG. 3 is a perspective view showing a portion of inside of the projector 1 viewed from the bottom.

The casing 45 for optical component comprises, for instance, a metallic component, and a specified illumination optical axis A is set therein as shown in FIG. 1, and the optical components 41 to 43 and an optical device main body of the optical device 44 described hereinafter are accommodated therein at prespecified positions against the illumination optical axis A. The casing 45 for optical components is not always required to be formed with a metallic material, and other material may be used for forming the casing 45 on the condition that the material is thermally conductive. The casing 45 for optical components comprises, as shown in FIG. 2, a vessel-shaped component accommodation member 451 for accommodating therein the optical components 41 to 43 and an optical device main body described later of the optical device 44, and a cover member (not shown) for closing an opening of the component accommodation member 451.

Of these components, the component accommodation member 451 constitutes a bottom face, a front face, and side faces of the casing 45 for optical components.

In this component accommodation member 451, groove sections 451A are formed on the internal side faces and the optical components 412 to 415, 418, 421 to 423, 431 to 434 are set therein in slidable manner from the above as shown in FIG. 2.

As shown in FIG. 2, in a front portion of the side face, a projector lens installing section 451B for installing the projector lens 5 at a prespecified position against the optical unit 4 is formed. This projector lens installing section 451B has a substantially rectangular shape when viewed from the top, and a circular hole (not shown) is formed at a position corresponding to a light beam irradiating position from the optical device 44 in the substantially central portion thereof when viewed from the top, and the color image formed by the optical unit 4 is projected by the projector lens 5 through the hole in the enlarged state.

In the component accommodation member 451, three holes 451C each formed at a position corresponding to the position of the liquid crystal panels 441 of the optical device 44, and a hole 451D formed in correspondence to a cooling fluid flow-in section of a fluid branching section of the optical device 44 described below are formed on the bottom face thereof as shown in FIG. 3. Herein cooling air introduced by the sirocco fan 31 of the cooling unit 3 from the outside of the projector 1 into inside thereof is discharged from the discharging outlet port 31A (Refer to FIG. 3) of the sirocco fan 31 and is led via a dust (not shown) to the holes 451C.

[Configuration of the Optical Device]

Figure 4:
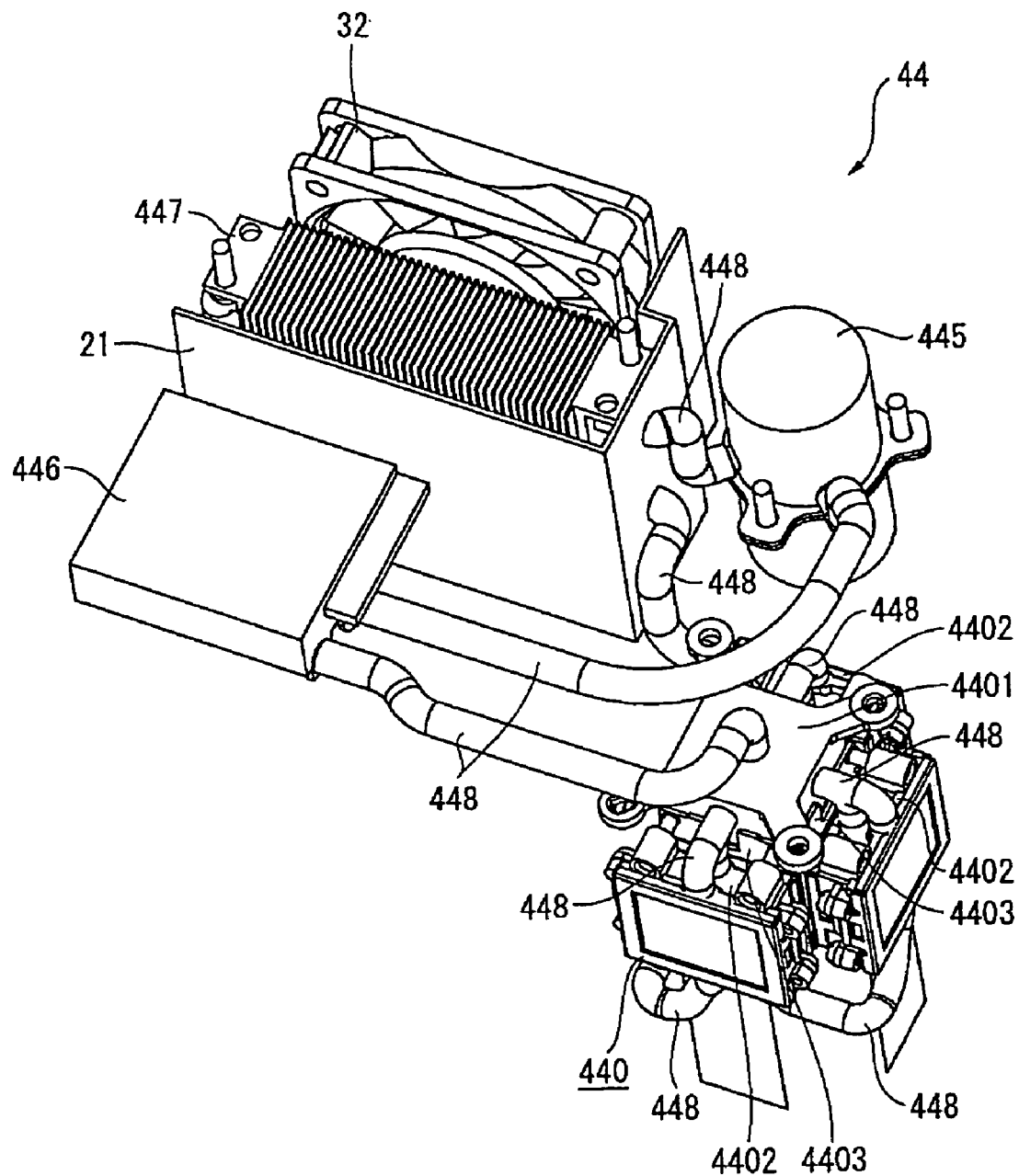
FIG. 4, is a perspective view of an optical device viewed from the bottom side according to the first embodiment.

FIG. 4 is a perspective view showing the optical device 44 viewed from the bottom side.

The optical device 44 comprises, as shown in FIG. 2 through FIG. 4, an optical device main body 440 in which the liquid crystal panels 441, incident-side polarization plate 442, irradiation-side polarization plate 443, and cross dichroic prism 444 are integrated with each other, a main tank 445, a fluid press-feeding section 446, a radiator 447, and a plurality of fluid circulating members 448.

Each of the plurality of fluid circulating members 448 has an aluminum-made tubular member enabling circulation of a cooling fluid therein, and the components 440, 445 to 447 are connected so that the cooling fluid can circulate therein. The circulating cooling fluid removes the heat generated in the liquid crystal panels 441, incident-side polarization plate 442, and irradiation-side polarization plate 443 each constituting the optical device main body 440.

In this embodiment, as the cooling fluid, ethylene glycol, which is a transparent non-volatile liquid, is employed. The cooling fluid is not limited to ethylene glycol, and other liquids may be employed.

The components 440, 445 to 447 are described one by one along the flow path of the circulating cooling fluid from the upstream side against the liquid crystal panels 441.

[Structure of the Main Tank]

Figure 5A:
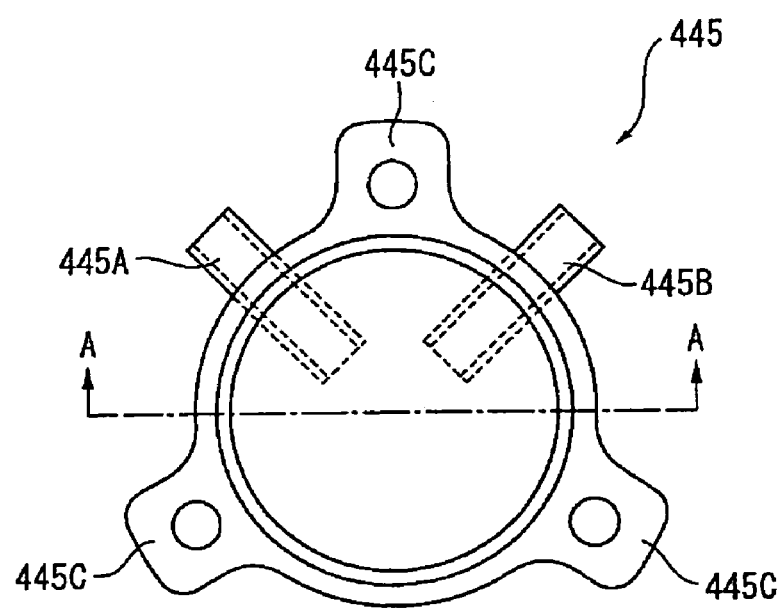
FIG. 5A and FIG. 5B are views each showing a construction of a main tank according to the first embodiment.
Figure 5B:
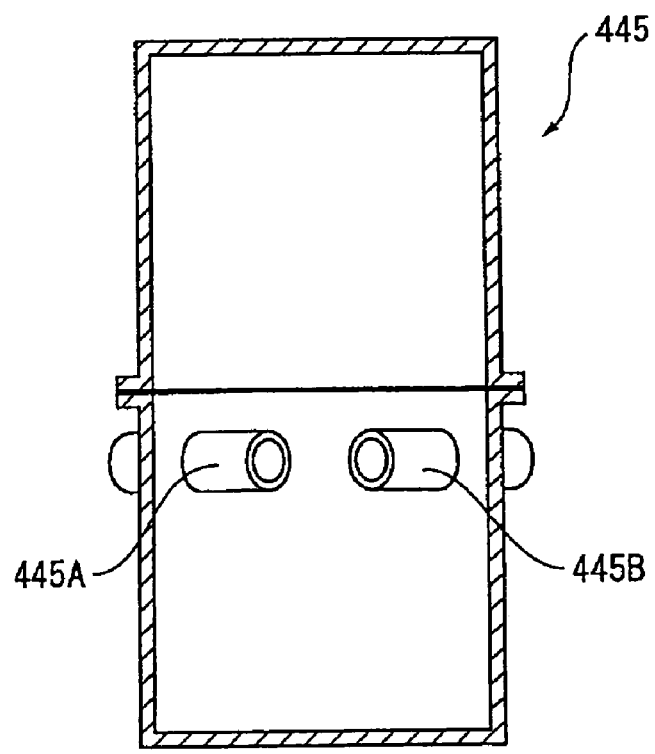

FIG. 5A and FIG. 5B are views each showing a structure of the main tank 445. More specifically, FIG. 5A is a flat view showing the main tank 445 viewed from the top side. FIG. 5B is a cross-sectional view taken along the line A—A in FIG. 5A.

The main tank 445 has a substantially circular form and comprises two vessel-shaped components each made from aluminum, and openings of the two vessel-shaped components are connected to each other to temporally store a cooling fluid therein. These vessel-shaped components are connected to each other by means of seal welding or with an elastic member such as rubber therebetween.

As shown in FIG. 5B, in this main tank 445, a cooling fluid inflow section 445A for inletting a cooling fluid into inside thereof and a cooling fluid outflow section 445B for leading the cooling fluid therein to the outside are formed at a substantially central portion in the column axial direction.

Each of these cooling fluid inflow sections 445A and cooling fluid outflow section 445B is formed with a substantially tubular member having a tube diameter smaller as compared to that of the fluid circulating member 448, and is arranged so that the components extrude from inside and outside of the main tank 445. An edge of the cooling fluid inflow section 445A protruding toward the outside is connected to an edge of the fluid circulating members 448, and a cooling fluid from the outside flows into the main tank 445 via the fluid circulating members 448. Further also an edge of the cooling fluid outflow section 445B protruding toward outside is connected to an edge of the fluid circulating members 448, and a cooling fluid inside the optical device 44 flows out to the outside thereof via the fluid circulating members 448.

The other edges protruding inward of the cooling fluid inflow section 445A and cooling fluid outflow section 445B extend toward the column shaft of the main tank 445 as shown in FIG. 5A, and are arranged respectively so that the edges are perpendicular to each other when from the top. With the configuration as described above, the cooling fluid flowing into the main tank 445 via the cooling fluid inflow section 445A can be prevented from immediately flowing out to the outside via the cooling fluid outflow section 445B, and the cooling fluid flowing in and that in the main tank 445 are mixed with each other to uniform a temperature of the cooling fluid.

Further as shown in FIG. 5A, three fixing sections 445C are formed each at a substantially central portion of the column-axial direction on the external peripheral surface of the main tank 445 in each of the two vessel-formed members respectively, and by inserting a screw 445D into each of the fixing sections 445C (as shown in FIG. 2 and FIG. 3) and screwing the fixing sections to the two bottom faces of the casing, the two vessel-formed members are connected to each other, and also the main tank 445 is fixed to the exterior case 2.

This main tank 445 is provided in a region having a triangular form when viewed from the top and formed with the casing 45 for optical components and inner fade faces of the exterior case 2. By providing the main tank 445 in this region, the accommodating efficiency in the exterior case 2 can be improved, so that size increase of the projector 1 can be prevented.

[Structure of a Fluid Press-feeding Section]

The fluid press-feeding section 446 feeds the accumulated cooling fluid into the main tank 445 and also forcefully feeds out the fed cooling fluid to outside of the main tank 445. For this purpose, as shown in FIG. 4, the fluid press-feeding section 446 is communicated to the other edge of the cooling fluid circulating member 448 connected to the cooling fluid outflow section 445B of the main tank 445, and is also communicated to an edge of the other cooling fluid circulating member 448 for sending out the cooling fluid to the outside.

This fluid press-feeding section 446 has, although not specifically shown in the figure, the configuration in which a vane wheel is provided inside an aluminum-made hollow member having a substantially rectangular form, and when the vane wheel rotates under the control by a control unit (not shown), the accumulated cooling fluid is forcefully fed into the main tank 445 via the cooling fluid circulating member 448 and also the cooling fluid fed is forcefully fed out to the outside of the main tank 445 via the cooling fluid circulating member 448. With the configuration as described above, the thickness of the fluid press-feeding section 446 in the rotational axis of the vane wheel can be reduced, and the fluid press-feeding section 446 can be placed at an empty space of the projector 1. In this embodiment, as shown in FIG. 2 or FIG. 3, the fluid press-feeding section 446 is provided under the projector lens 5.

Configuration of the fluid press-feeding section 446 is not limited to that of the continuous feed-out type as described above, and other configuration such as that of the intermittent feed-out type making use of a diaphragm may be used.

[Configuration of the Optical Device Main Body]

The optical device main body 440 comprises, in addition to the three liquid crystal panels 441, three incident-side polarization plates 442, three irradiation-size polarization plates 443, and cross dichroic prism 444, a fluid branching section 4401 (Refer to FIG. 4), three optical modulator holders 4402, three supporting members 4403, and a relay tank 4404 (Refer to FIG. 2).

[Structure of the Fluid Branching Section]

Figure 6A:
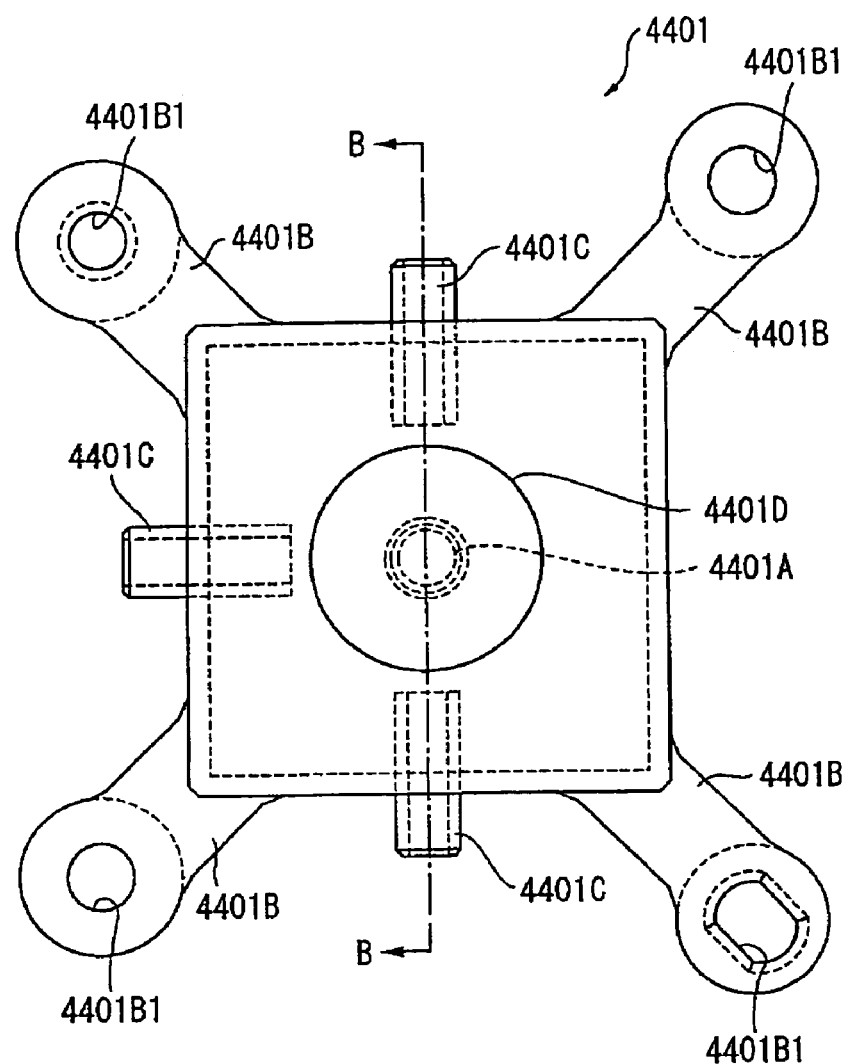
FIG. 6A and FIG. 6B are views each showing a construction of a fluid branching section according to the first embodiment.
Figure 6B:
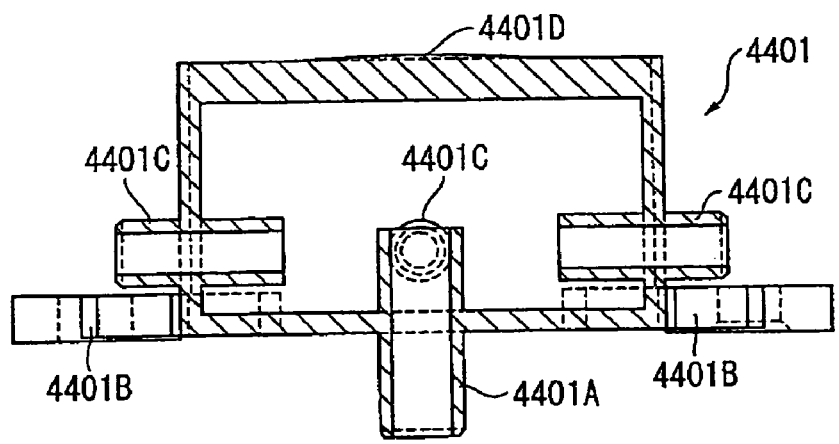

FIG. 6A and FIG. 6B are views each showing structure of he fluid branching section 4401. More specifically, FIG. 6A is a flat view showing the fluid branching section 4401 viewed from the top. FIG. 6B is a cross-sectional view taken along the line B—B in FIG. 6A.

The fluid branching section 4401 comprises an aluminum-made hollow member having a substantially rectangular form, and feeds the cooling fluid forcefully sent out from the fluid press-feeding section 446 and branches the fed-in cooling fluid to each of the three optical modulator holders 4402 to send it out. Further this fluid branching section 4401 is fixed to a lower face which is an edge face of the cross dichroic prism 444 crossing three light-beam incident side thereof, so that the fluid branching section 4401 has also the function as a prism fixing plate for supporting the cross dichroic prism 444.

In this fluid branching section 4401, as shown as in FIG. 6B, a cooling fluid inflow section 4401A for inletting the cooling fluid press-fed from the fluid press-feeding section 446 into inside thereof is formed at a substantially central portion of the bottom face. This cooling fluid inflow section 4401A comprises a substantially tubular member having a diameter smaller as compared to that of the cooling fluid circulating member 448 like the cooling fluid inflow section cooling fluid inflow section 445A of the main tank 445, and protrude to both inside and outside of the fluid branching section 4401. An edge of the cooling fluid inflow section 4401A protruding outward is connected to the other edge of the cooling fluid circulating member 448 communicated to the fluid press-feeding section 446, and the cooling fluid press-fed from the fluid press-feeding section 446 via the cooling fluid circulating member 448 flows via the edge into inside of the fluid branching section 4401.

Also arm sections 4401B each extending along the bottom face are formed at four corners of the bottom face respectively as shown in FIG. 6A. A hole 4401B1 is formed at a tip portion of the arm section 4401B, and by inserting screws (not shown) into the holes 4401B1 and screwing the arm sections 4401B to the component accommodation member 451 of the casing 45 for optical components, the optical device main body 440 is fixed to the component accommodation member 451 (Refer to FIG. 11). In this step, the fluid branching section 4401 and the casing 45 for optical components are connected to each other in the thermally conductive state.

In this fluid branching section 4401, a cooling fluid outflow section 4401C for branching and sending the fed-in cooling fluid to each of three optical modulator holders 4402 is formed, as shown in FIG. 6A, on each of three side faces corresponding to a light beam incident side of the cross dichroic prism 444.

The cooling fluid outflow section 4401C comprises a substantially tubular member having a diameter smaller as compared to that of the cooling fluid circulating member 448 like in the cooling fluid inflow section 4401A, and protrudes to both inside and outside of the fluid branching section 4401. An edge of the cooling fluid circulating member 448 is connected to an edge of each cooling fluid outflow section 4401C protruding outward, and the cooling fluid inside the fluid branching section 4401 flows out to the outside via the cooling fluid circulating member 448.

Further in this fluid branching section 4401, a spherical expanding portion 4401D is formed at a substantially central portion of the upper face as shown in FIG. 6A and FIG. 6B. By contacting a bottom face of the cross dichroic prism 444 to this expanding portion 4401D, a position of the cross dichroic prism 444 in the driving direction against the fluid branching section 4401 can be adjusted.

[Construction of the Optical Modulator Holder]

Figure 7:
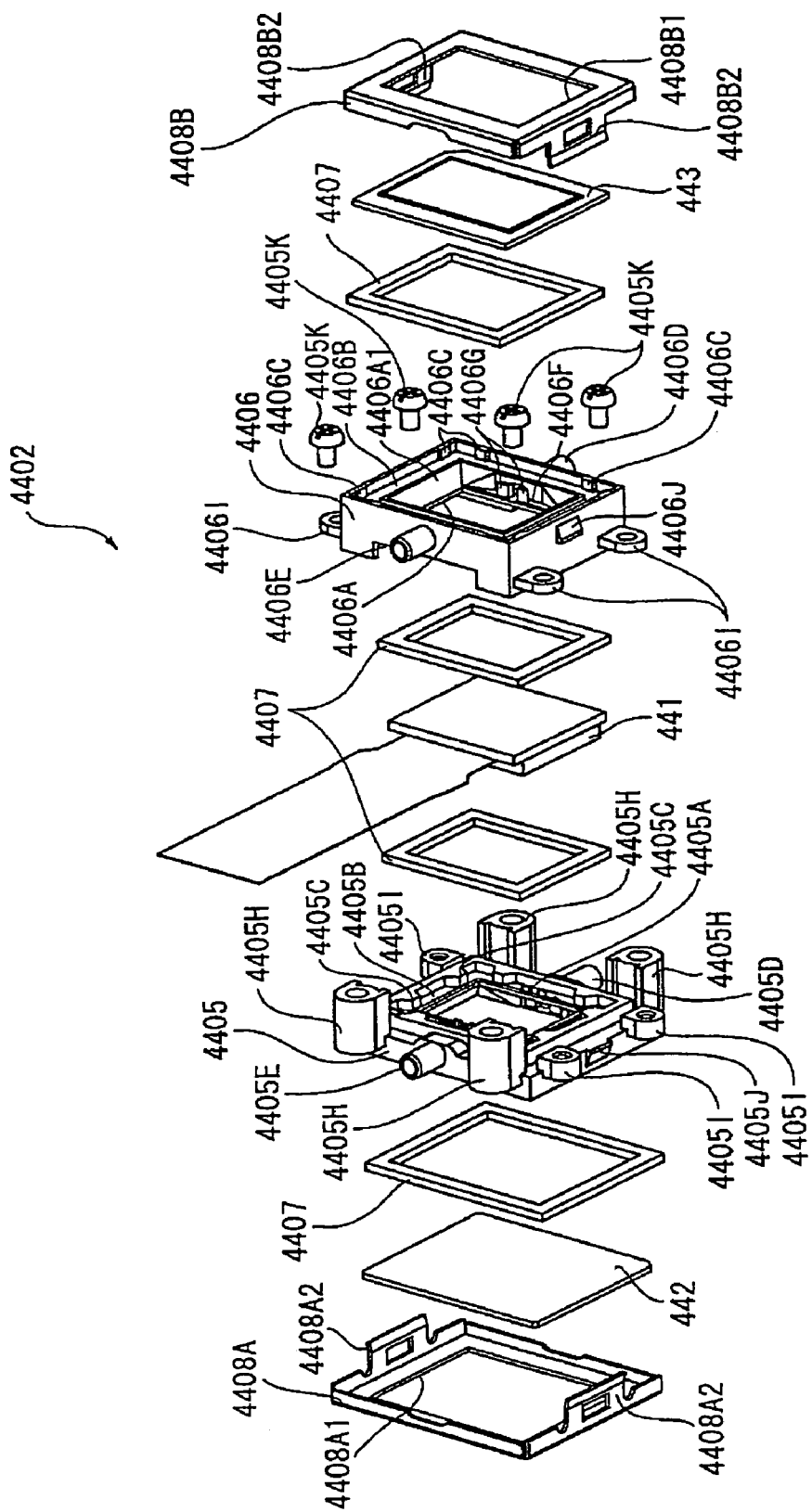
FIG. 7 is an exploded perspective view showing a general configuration of an optical modulator holder according to the first embodiment.

FIG. 7 is an exploded perspective view showing general configuration of the optical modulator holder 4402.

Three optical modulator holder 4402 hold three liquid crystal panels 441, three incident-side polarization plates 442, and three irradiation-size polarization plates 443 respectively, and a cooling fluid flows in and out of the inside of each of the thee optical modulator holders 4402 to cool the three liquid crystal panels 441, three incident-side polarization plates 442, and three irradiation-side polarization plates 443 with the cooling fluid respectively. Each of the three optical modulator holders has the same configuration, and only one of the optical modulator holders 4402 is described below.

The optical modulator holder 4402 comprises a pair of frame members 4405, 4406, four elastic members 4407, and a pair of polarization plate fixing members 4408A, 4408B as shown in FIG. 7.

The frame member 4405 is an aluminum-made frame body having a substantially rectangular form when viewed from the top and also having an opening 4405A having a rectangular form corresponding to an optical modulation face of the liquid crystal panel 441 formed at the substantially central portion thereof, and is placed in the light beam incident side against the frame member 4406, supports an edge face in the light-beam incident side of the liquid crystal panel 441, and also supports an edge face in the light beam irradiation side of the incident-side polarization plate 442.

FIG. 8 is a perspective view showing the frame member 4405 viewed from the light beam incident side.

In this frame member 4405, a recess 4405B having a rectangular frame-like form corresponding to a from of the elastic member 4407 is formed as shown in FIG. 8, and the incident-side polarization plate 442 is supported at this recess 4405B via the elastic member 4407. Because the frame member 4405 supports the edge face of the incident-side polarization plate 442 in the light beam irradiation side, the light beam incident side at the opening 4405A is closed by the elastic member 4407 and the edge face of the incident-side polarization plate 442 in the light beam irradiation side. Further a plurality of engaging projections 4405C are formed on an external peripheral surface of the recess 4405B, and an external side face of the elastic member 4407 contacts these engaging projections 4405C, so that the elastic member 4407 is positioned and set in the recess 4405B.

The opening 4405A has corner sections in the light beam incident side tapered so that the opening area becomes larger from the edge face in the light beam irradiation side toward the edge face in the light beam incident side as shown in FIG. 8, and also has a slant surface 4405A1.

Further in this frame member 4405, a rectangular and frame-like recess 4405B corresponding to a form of the elastic member 4407 is formed also on the edge face thereof in the light beam irradiation side like that on the light beam incident side as shown in FIG. 7, and an edge face in the light beam incident side of the liquid crystal panel 441 is supported by this recess 4405B via the elastic member 4407. Because the frame member 4405 supports the edge face in the light beam incident side of the liquid crystal panel 441, the light beam irradiation side of the opening 4405A is closed by the elastic member 4407 and the edge face in the light beam incident side of the liquid crystal panel 441. Also provided on the edge face in the light beam irradiation side is an engaging projection 4405C on an external peripheral surface of the recess 4405B.

When the light beam incident side and the light beam irradiation side of the opening 4405A are closed by the liquid crystal panel 441 and the incident-side polarization plate 442, a cooling chamber R1 (Refer to FIG. 11) enabling sealing of a cooling fluid inside the frame member 4405 is formed.

Further in this frame member 4405, an inlet port 4405D for introducing therethrough the cooling fluid flowing out of the cooling fluid outflow section 4401C of the fluid branching section 4401 into inside thereof is formed at a substantially central portion of the lower edge section as shown in FIG. 8. This inlet port 4405D comprises a substantially cylindrical member having a cylinder-diameter dimension smaller as compared to that of the fluid circulating member 448 and protruding outward from the frame member 4405. Connected to the protruding edge section of the inlet port 4405D is the other edge section of the fluid circulating member 448 connected to the cooling fluid outflow section 4401C of the fluid branching section 4401, so that the cooling fluid flowing out from the fluid branching section 4401 via the fluid circulating member 448 flows into the cooling chamber R1 (Refer to FIG. 11) of the frame member 4405.

Still further in this frame member 4405, an outlet port 4405E for flowing out therethrough the cooling fluid in the cooling chamber R1 (Refer to FIG. 11) of the frame member 4405 is formed at a substantially central portion of the upper edge section thereof as shown in FIG. 8. Namely, the outlet port 4405E is formed at a position opposite to the inlet port 4405D. This outlet port 4405E comprises, like the inlet port 4405D, a substantially cylindrical member having a cylinder-diameter dimension smaller as compared to that of the fluid circulating member 448 and protruding outward from the frame member 4405. Connected to the protruding edge section of the outlet port 4405E is the fluid circulating member 448, so that the cooling fluid inside the cooling chamber R1 (Refer to FIG. 11) flows out via the fluid circulating member 448.

On the opening 4405A, recesses 4405F each recessing toward the light beam irradiation side are formed at the inlet port 4405D and outlet port 4405E respectively as shown in FIG. 8, and the width of the external side face of the recess 4405F becomes smaller toward the positions.

Rectifying sections 4405G are formed on bottom faces of the recesses 4405F respectively.

Each of the rectifying sections 4405G is formed with two triangular columns 4405G1 each having a substantially triangular cross section. Each of the two triangular columns 4405G1 has, as shown in FIG. 8, a rectifying face 4405G2 rectifying flow directions of the cooling fluid flowing in via the inlet port 4405D and cooling fluid flowing toward the outlet port 4405E to a direction parallel to an optical modulation face of the three liquid crystal panels 441. These columns 4405G1 are provided with a prespecified space therebetween, and are also provides so that the rectifying faces 44052 corresponding to hypotenuses of the cross sections each having a substantially right angle triangle form get more separated from each other.

When the light beam incident side of the opening 4405A is closed with the incident-side polarization plate 442, a buffer section Bf1 (Refer to FIG. 11) capable of temporally storing a cooling fluid is formed with an edge face of the incident-side polarization plates 442 in the light beam irradiation side, recesses 4405F, and the rectifying section 4405G at a position not two-dimensionally interfering an optical modulation face of the three liquid crystal panels 441.

Further with this frame member 4405, four inserting sections 4405H each enabling insertion of a pin-shaped member of the supporting members 4403 described hereinafter are formed corners in the upper side as well as those in the lower side as shown in FIG. 8.

Further, in this frame member 4405, as shown in FIG. 8, on the upper side and the lower side near the corners, connecting sections 4405I for connecting frame member 4406 are formed.

Further in this frame member 4405, hooks 4405J each capable of being engaged with a polarization plate fixing member 4408A are formed at substantially central portions of the left and right edge sides respectively as shown in FIG. 8.

The frame member 4406 comprises an aluminum-made member, and holds the three liquid crystal panels 441 via the elastic member 4407 together with the frame member 4405 therebetween, and also supports the irradiation-size polarization plates 443 via the elastic member 4407 with a face opposite to the frame member 4405 and that in the opposite site, and the specific structure is substantially the same as the frame member 4405 described above. Namely formed in this frame member 4406 are formed an opening 4406A (including slant surface 4406A1, a recess 4406B, a hooking projection 4406C, an inlet port 4406D, an outlet port 4406E, a recess 4406F, a rectifying section 4406G, a connecting section 4406I, and a hook 4406J like the opening 4405A (including the slant surface 4405A1), recess 4405B, engaging projection 4405C, inlet port 4405D, outlet port 4405E, recess 4405F, rectifying section 4405G (including the column 4405G1 and the rectifying face 4405G2), connecting section 4405I, and hook 4405J each in the frame member 4405.

Inside the frame member 4406, like in the frame member 4405, when the light beam incident side and the light beam irradiation side of the opening 4406A are closed with the three liquid crystal panels 441 and the irradiation-side polarization plate 443 respectively, a cooling chamber R1 capable of storing a cooling fluid therein (Refer to FIG. 11) is formed in the frame member 4405.

Also inside the cooling chamber R2, substantially like in the cooling chamber R1, a buffer section Bf1 capable of temporally storing a cooling fluid therein (Refer to FIG. 11) is formed with the edge face of the irradiation-size polarization plates 443 in the light beam incident side, recess 4406F, and rectifying section 4406G at a position not not-dimensionally interfering the optical modulation face of the three liquid crystal panels 441.

The cooling fluid circulating member 448 for connecting the cooling fluid outflow section 4401C of the fluid branching section 4401 to each of the inlet ports 4405D, 4406D of the frame members 4405, 4406 has a form branching to two ways as shown in FIG. 4. Namely the cooling fluid flowing out from the cooling fluid outflow section 4401C of the fluid branching section 4401 is branched to two ways via the cooling fluid circulating member 448 and flows into the cooling chambers R1 and R2 of the frame member 4406, frame member 4406 (Refer to FIG. 11).

When a screw 4405K is set in each of the connecting sections 4405I and 5506I of the frame members 4405, 4406, the three liquid crystal panels 441 is held via the elastic member 4407 between the frame members 4405 and 4406, and the counter faces of the openings 4405A, 4406A of the frame members 4405, 4406 are sealed.

The elastic members 4407 are set and positioned between the incident-side polarization plates 442 and the frame member 4405, between the frame member 4405 and the three liquid crystal panels 441, between the three liquid crystal panels 441 and the frame member 4406, and between the frame member 4406 and the irradiation-size polarization plates 443 respectively to seal each of the cooling chambers R1, R2 of the frame members 4405, 4406 (Refer to FIG. 11) for preventing, for instance, leakage of a cooling fluid. The elastic member 4407 is made from silicon rubber having the elasticity, and one or both surfaces thereof are subjected to the surface process for improving the bridging density of the surface layer. For instance, Sarcon GR-series d (Trade name registered by Fuji Koubunshi Kogyo Co. Ltd.) may be employed as the elastic member 4407. By subjecting the elastic member 4407 to the surface processing, the work for setting the recesses 4405B, 4406B on the frame members 4405, 4406 can be facilitated.

Further also butyl rubber or fluorine rubber each with the low water transmission rate may be used as the elastic member 4407.

The polarization plates 4408A, 4408B press-fit the incident-side polarization plates 442 and irradiation-size polarization plates 443 via the elastic members 4407 respectively into the recesses 4405B, 4406B of the frame members 4405, 4406 respectively. The polarization plate fixing members 4408A, 4408B comprises substantially rectangular bodies when viewed from the top and having the openings 4408A1, 4408B1 formed at the substantially central portions respectively, and peripheral portions of the openings 4408A1, 4408B1 press-fit the incident-side polarization plates 442 and irradiation-size polarization plates 443 to the frame members 4405, 4406 respectively. Further hook engaging sections 4408A2, 4408B2 are formed at right and left edge sections of each of the polarization plate fixing members 4408A, 4408B, and when the hook engaging sections 4408A2, 4408B2 are engaged with hooks 4405J, 4406J of the frame members 4405, 4406, the polarization plate fixing members 4408A, 4408B are fixed to the frame members 4405, 4406 with the incident-side polarization plates 442 and irradiation-size polarization plates 443 pressed thereto.

[Structure of the Supporting Member]

The supporting member 4403 comprises a plate body having a rectangular form when viewed from the top with an opening (not shown) formed at a substantially central portion.

On an edge face of this supporting member 4403 in the light beam incident side, pin-shaped members 4403A each protruding from the plate body (Refer to FIG. 11) are formed at a position corresponding to the four inserting sections 4405H of the optical modulator holder 4402.

The supporting member 4403 supports the optical modulator holder 4402 when the pin-shaped members 4403A (Refer to FIG. 11) are inserted into the four inserting sections 4405H of the optical modulator holder 4402, and when an edge face of the plate body in the light beam irradiation side is adhered and fixed to the edge face of the cross dichroic prism 444 in the light beam incident side, the optical modulator holder 4402 is integrated with the cross dichroic prism 444.

[Structure of the Relay Tank]

Figure 9A:
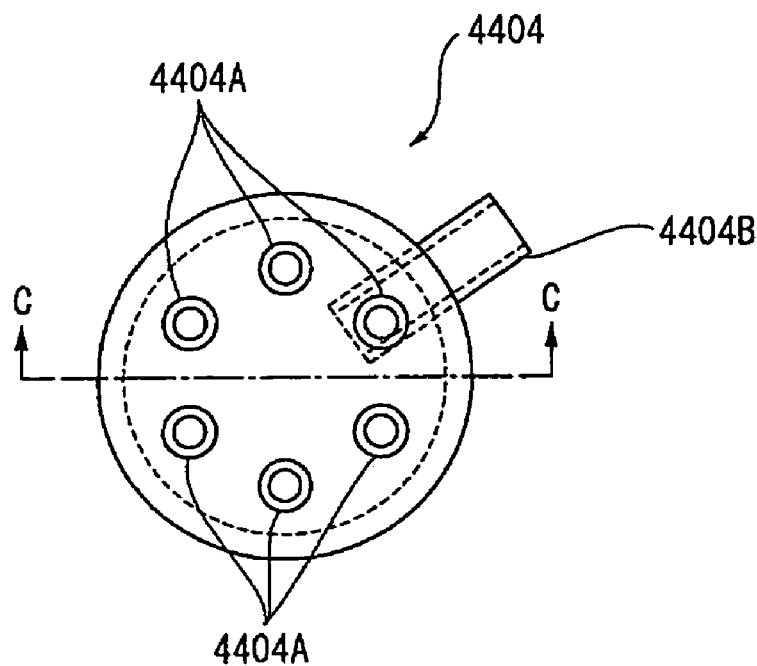
FIG. 9A and FIG. 9B are views each showing a construction of a relay tank according to the first embodiment.
Figure 9B:
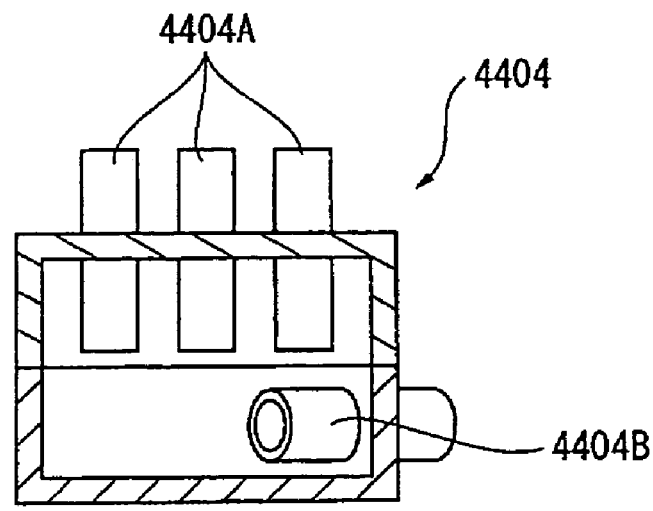

FIG. 9A and FIG. 9B are views each showing a structure of the relay tank 4404. More specifically, FIG. 9A is a flat view showing the relay tank 4404 viewed from the top. FIG. 9B is a cross-sectional view taken along the line C—C in FIG. 9A.

The relay tank 4404 comprises a hollow member having a substantially cylindrical form and made from aluminum, and is fixed to a top face of the cross dichroic prism 444 crossing the three light-beam incident-side edge faces. This relay tank 4404 receives a cooling fluid sent out from each of the optical modulator holders 4402 in batch and sends out the received cooling fluid to the outside.

In this relay tank 4404, six cooling fluid inflow sections 4404A each for inletting the cooling fluid sent from each of the frame members 4405, 4406 of each of the optical modulator holders 4402 are formed on the top face thereon, as shown in FIG. 9A and FIG. 9B. Each of the cooling fluid inflow sections 4404A comprises a substantially cylindrical member having a smaller diameter as compared to that of the fluid circulating members 448, and protrudes to both outside and inside of the relay tank 4404. Connected to an edge protruding outward of each of the cooling fluid inflow sections 4404A is the other edge of the fluid circulating members 448 with an edge thereof connected to the outlet ports 4405E, 4406E of the frame members 4405, 4406 of each of the three optical modulator holders 4402, so that the cooling fluid sent out via the fluid circulating members 448 from each optical modulator holder 4402 flows into the relay tank 4404 in batch.

In a lower section of the external face of the relay tank 4404 is formed a cooling fluid outflow section 4404B for sending out the fed-in cooling fluid to the outside as shown in FIG. 9A and FIG. 9B. The cooling fluid outflow section 4404B comprises, like the cooling fluid inflow section 4404A, a substantially cylindrical member having a smaller diameter as compared to that of the fluid circulating members 448, and protrudes to both outside and inside of the relay tank 4404. An edge of the fluid circulating members 448 is connected to an edge of the cooling fluid outflow section 4404B protruding outward, so that the cooling fluid inside the relay tank 4404 flows out to the outside via the fluid circulating members 448.

[Structure of the Radiator]

Figure 10A:
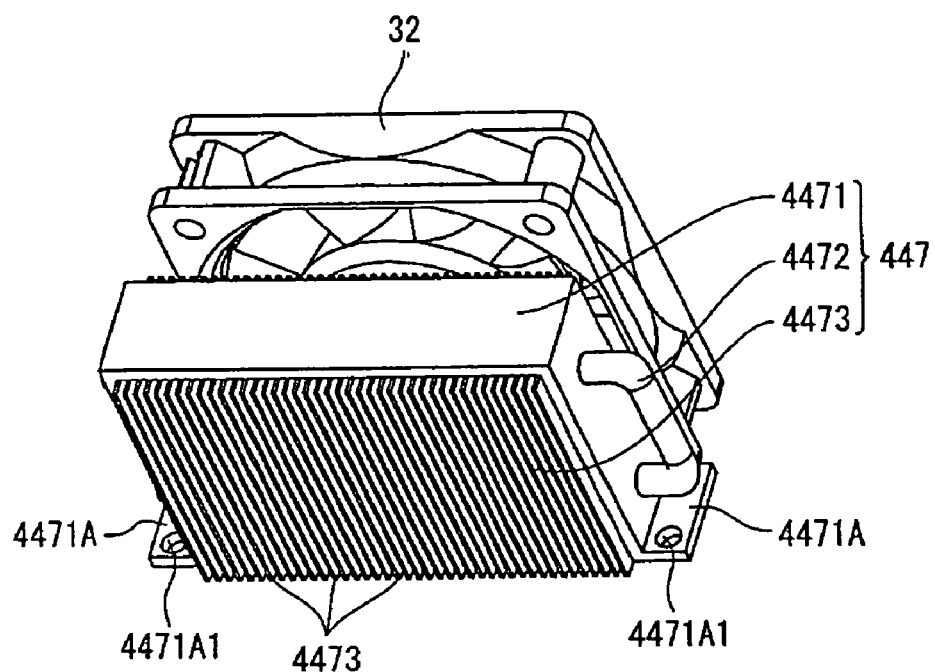
FIG. 10A and FIG. 10B are views each showing a construction of a radiator and a positional relation between the radiator and an axial-flow fan according to the first embodiment.
Figure 10B:
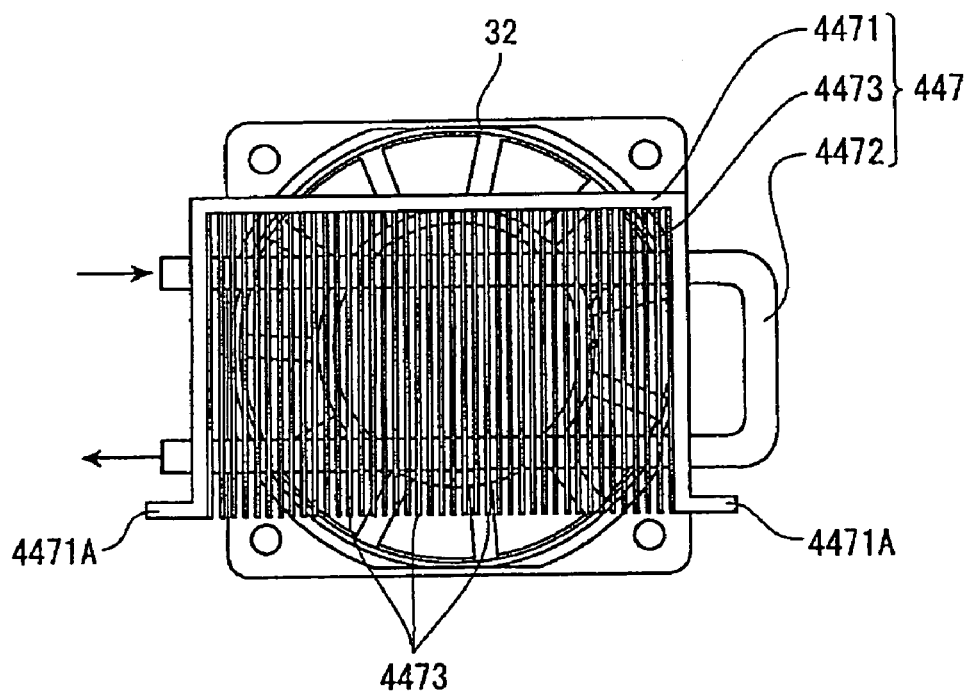

FIG. 10A and FIG. 10B are views showing structure of the radiator 447 and a positional relation between the radiator 447 and the axial flow fan 32. More specifically, FIG. 10A is a perspective view showing the radiator 447 and the axial flow fan 32 viewed from the top. Further FIG. 10B is a flat view showing the radiator 447 and the axial flow fan 32 from the side of the radiator 447.

The radiator 447 is provided in the inner side from a partition wall 21 formed in the exterior case 2 as shown in FIG. 1 or in FIG. 2, and releases heat of the cooling fluid heated by the liquid crystal panel 441, each incident-side polarization plate 442, and irradiation-side polarization plate 443 in the optical device main body 440. This radiator 447 comprises a fixing section 4471, a tubular section 4472, and a plurality of heat-radiating fins 4473 as shown in FIG. 10A and FIG. 10B.

The fixing section 4471 comprises, for instance, a thermally conductive member made from a metal or the like, and has a substantially horseshoe-shaped form viewed from the top as shown in FIG. 10B, and a tubular section 4472 can be inserted between the horseshoe-shaped edges opposite to each other. Further this fixing section 4471 supports a plurality of heat-radiating fins 4473 in the horseshoe-shaped inner side faces. An extending section 4471A extending outward is formed at a horse-shaped tip portion of this fixing section 4471, and the radiator 447 is fixed to the exterior case 2 by setting a screw (not shown) in the exterior case 2 via the hole 4471A1 of the extending section 4471A.

The tubular section 4472 is made from aluminum, and extends, as shown in FIG. 10B, from a horseshoe-shaped tip edge portion of the fixing section 4471 toward the other horse-shaped tip edge section, and a tip portion thereof in the extending direction bends by about 90 degrees downward, and further the tip portion bends in the extending direction by about 90 degrees to form a horseshoe-shaped portion when viewed from the top and extending from the other horseshoe-shaped tip edge portion of the fixing section 4471 toward the former horseshoe-shaped tip edge portion thereof, so that the fixing section 4471 and the heat-radiating fin 4473 are connected to each other in the thermally conductive state. Further this tubular section 4472 has a diameter smaller as compared to that of the fluid circulating members 448, and an edge thereof in the upper side in FIG. 10B connects to the other edge of the fluid circulating members 448 connected to the cooling fluid outflow section 4404B of the relay tank 4404 in the optical device main body 440. Further, the other edge thereof in the lower side in FIG. 10B connects to the other edge of the fluid circulating members 448 connected to the cooling fluid inflow section 445A of the main tank 445. Therefore, the cooling fluid flowing out of the relay tank 4404 passes via the fluid circulating members 448 through the tubular section 4472, and the cooling fluid having passed through the tubular section 4472 flows into the main tank 445 via the fluid circulating members 448.

The heat-radiating fin 4473 comprises, for instance, a plate body comprising a thermally conductive member made from such a material as metal and enabling insertion of the tubular section 4472. A plurality of heat-radiating fins 4473 extend in a direction perpendicular to the inserting direction of the tubular section 4472, and are arranged parallel to each other along the inserting direction of the tubular section 4472. When the plurality of heat-radiating fins 4473 are arranged as described above, as shown in FIG. 10A and FIG. 10B, cooling air discharged from the axial flow fan 32 passes through the plurality of heat-radiating fins 4473.

As described above, the cooling fluid circulates through the flow path formed with the main tank 445, fluid press-feeding section 446, fluid branching section 4401, each optical modulator holder 4402, relay tank 4404, radiator 447, and main tank 445 arranged in the order described above via a plurality of fluid circulating members 448.

[Cooling Mechanism]

The cooling mechanisms for the liquid crystal panels 441, incident-side polarization plate 442, and irradiation-side polarization plate 443 are described below.

Figure 11:
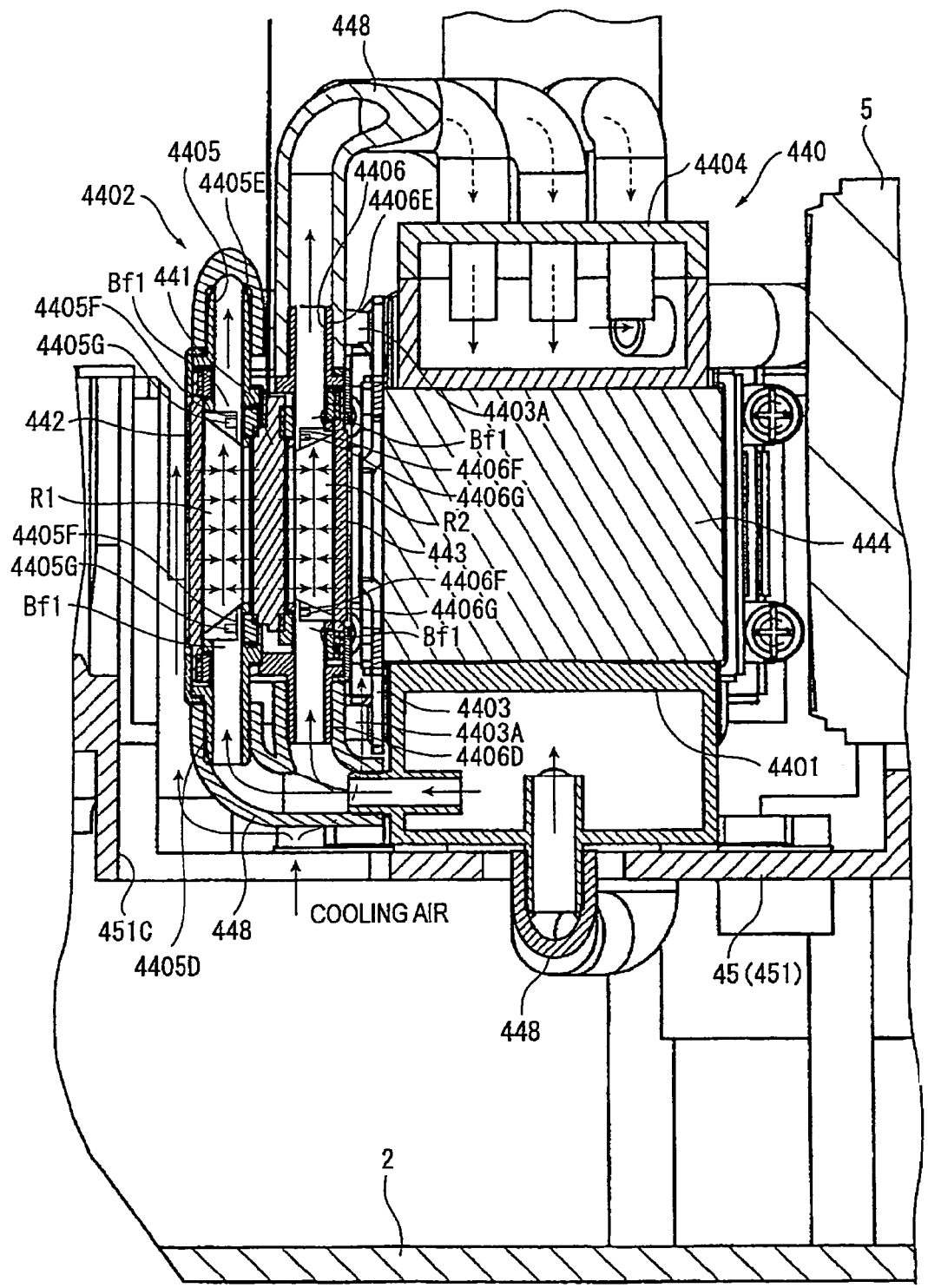
FIG. 11 is a cross-sectional view illustrating a cooling construction of a liquid crystal panel, incident-side polarization plate, and irradiation-side polarization plate according to the first embodiment.

FIG. 11 is a cross-sectional view showing the cooling mechanisms for the liquid crystal panel 441, incident-side polarization plate 442, and irradiation-side polarization plate 443.

When the fluid press-feeding section 446 is driven, the cooling fluid inside the main tank 445 is press-fed via the fluid press-feeding section 446 toward the fluid branching section 4401, is branched by the fluid branching section 4401, and flows into the cooling chambers R1, R2 of each optical modulator holder 4402. In this step, the cooling fluid flowing into each of the cooling chambers R1 and R2 is temporally accumulated in each buffer section Bf1 and then is rectified by the rectifying sections 4405G, 4406G to extend into inside of the cooling chambers R1, R2.

The heat generated by the light beam from the light source 411 in the liquid crystal panel 441, incident-side polarization plate 442, and irradiation-side polarization plate 443 is delivered to the cooling fluid in the cooling chambers R1, R2 of the frame members 4405, 4406 of the optical modulator holder 4402.

The heat delivered to the cooling fluid inside the cooling chambers to the cooling chambers R1, R2 moves from the cooling chambers R1, R2 to the relay tank 4404 and then to the radiator 447 along a flow of the cooling fluid. When the warmed-up cooling fluid passes through the tubular section 4472 of the radiator 447, heat of the cooling fluid is delivered to the tubular section 4472 and then to the plurality of heat-radiating fin 4473. Then the heat delivered to the plurality of heat-radiating fins 4473 is cooled down by the cooling air discharged from the axial flow fan 32.

The cooling fluid cooled down by the radiator 447 moves from the radiator 447 to the main tank 445, and then to fluid press-feeding section 446 and fluid branching section 4401, and again moves to the cooling chambers R1, R2.

The cooling air led from the outside to inside of the projector 1 by the sirocco fan 31 of the cooling unit 3 is led to inside of the casing 45 for optical components via a hole 451C formed on a bottom face of the casing 45 for optical components. The cooling air led into inside of the casing 45 for optical components flows over an external face of the optical modulator holder 4402 and between the optical modulator holder 4402 and the supporting member 4403, and flows upward from the bottom to the top. In this step, the cooling air cools an edge face of the incident-side polarization plate 442 in the light beam incident side and an edge face of the irradiation-side polarization plate 443 in the light beam irradiation side.

In the first embodiment described above, the frame members 4405, 4406 constituting the optical modulator holder 4402 have the inlet ports 4405D, 4406D and the outlet ports 4405E, 4406E respectively, and therefore the inlet ports 4405D, 4406D and the outlet ports 4405E, 4406E are connected to each other with the fluid circulating members 448, a cooling fluid can be convected with the circulation speed of the cooling fluid inside the cooling chambers R1, R2 raised. Further with the configuration as described above, different from the conventional configuration in which a cooling fluid is sealed in a cooling chamber, a larger capacity of a cooling fluid exchanging heat with the liquid crystal panel 441 is available, so that the heat exchanging capability between the liquid crystal panel 441 and the cooling fluid can be improved.

The cooling chambers R1, R2 are formed with the openings 4405A, 4406A of the frame members 4405, 4406 closed with the liquid crystal panel 441, incident-side polarization plate 442, and irradiation-side polarization plate 443, so that the heat generated not only in the liquid crystal panels 441 but also in the incident-side polarization plate 442 and irradiation-side polarization plate 443 can directly be radiated to the cooling fluid filled in the cooling chambers R1, R2. Because of this feature, the liquid crystal panel 441, incident-side polarization plate 442, and irradiation-side polarization plate 443 can efficiently be cooled.

The frame members 4405, 4406 have the buffer sections Bf1 each formed at a position not two-dimensionally interfering an optical modulation face of the liquid crystal panel 441 respectively, so that the frame members 4405, 4406 can temporally stored a cooling fluid flowing therein via the inlet ports 4405D, 4406D, and also can rectify a flow direction of the cooling fluid to a direction parallel to the optical modulation face. Because of this feature, a flow velocity of the cooling fluid at various positions inside the cooling chambers R1, R2 can be uniformed, and further a stripe-formed image caused by non-uniformity of the flow velocity is not generated in an optical image formed by the liquid crystal panels 441, so that the optical image formed by the liquid crystal panel 441 can be maintained in the good conditions. Further as a flow velocity of the cooling fluid at various positions inside the cooling chambers R1, R2 can be uniformed, so that also a surface temperature of the liquid crystal panel 441 can be uniformed, and therefore it is possible to prevent generation of local over heating and to form a clear optical image with the liquid crystal panels 441.

The frame members 4405, 4406 have the rectifying sections 4405G, 4406G, and therefore the buffer sections Bf1 each for temporally accumulating a cooling fluid flowing therein via the inlet ports 4405D, 4406D can be formed with the recesses 4405F, 4406F, incident-side polarization plate 442, irradiation-side polarization plate 443, and the rectifying sections 4405G, 4406G respectively. Because of this feature, configuration of the buffer section Bf1 can be simplified.

Further it is possible to temporally accumulate a cooling fluid flowing therein via the inlet ports 4405D, 4406D and then, with the rectifying sections 4405G and 4406G, rectify the flow direction to a direction parallel to the optical modulation face of the liquid crystal panel 441. Because of this configuration, it is possible to effectively uniform a flow velocity of a cooling fluid on a surface parallel to the optical modulation surface of the liquid crystal panel 441 with the rectifying sections 4405G, 4406G.

Further as the rectifying sections 4405G, 4406G are formed with two columns 4405G1 each having a rectifying face 4405G2 respectively, so that it is possible to temporally accumulate a cooling fluid flowing therein via the inlet ports 4405D, 4406D and then rectify the flow direction to a direction parallel to the optical modulation face of the liquid crystal panel 441 with simple configuration.

Further the buffer section Bf1 is formed no only in the side of the inlet ports 4405D, 4406D, but also in the side of the outlet ports 4405E, 4406E, so that, even when a flow direction of a cooling fluid is reversed, namely even when setting is performed so that the inlet ports 4405D, 4406D and the outlet ports 4405E, 4406E function reversely, it is possible to temporally accumulate a cooling fluid flowing therein via the outlet ports 4405E, 4406E and then rectify a flow direction of the cooling fluid to a direction parallel to the optical modulation surface. Because of this feature, even when a flow direction of a cooling fluid is reversed, a flow velocity at various positions inside the cooling chambers R1, R2 can be uniformed, and it is possible to maintain an optical image formed with the liquid crystal panel 441 in good conditions and further to uniform a surface temperature of the liquid crystal panel 441, so that a clear optical image can be formed with the liquid crystal panel 441.

Further as the optical device 44 comprises the fluid press-feeding section 446, it is possible to forcefully circulate a cooling fluid with the fluid press-feeding section 446 and also to cause circulation of the cooling fluid within the cooling chambers R1 and R2 without fail. Because of this feature, it is possible to always secure a large temperature difference between the liquid crystal panel 441 and a cooling fluid, so that the cooling efficiency of the liquid crystal panel 441 can be improved.

Further as the buffer sections Bf1 are formed in the optical modulator holder 4402, a cooling fluid press-fed by the fluid press-feeding section 446 can temporally be accumulated therein. Because of this feature, a pressure of the cooling fluid press-fed by the fluid press-feeding section 446 is not directly applied to inside of the cooling chambers R1, R2, namely the pressure is not loaded to the liquid crystal panels 441, incident-side polarization plate 442, nor to the irradiation-side polarization plate 443. Therefore, a pressure loaded to the liquid crystal panel 441 can be adjusted by the buffer sections Bf1, and degradation of an image quality due to the pressure loaded to the liquid crystal panel 441 can be prevented. Further, deformation of the incident-side polarization plate 442 and irradiation-side polarization plate 443 due to a pressure applied thereto can be prevented, so that degradation of the image quality due to displacement of the polarization axis can be prevented.

Further as the projector 1 comprises the optical device 44 described above, thermal degradation of the liquid crystal panel 441, incident-side polarization plate 442, and irradiation-side polarization plate 443 can be prevented, so that a lifetime of the projector 1 can be prolonged.

Further as the projector 1 has the optical device 44 described above, an optical image formed by the liquid crystal panel 441 can be maintained in good conditions, and a clear optical image can be projected by the projector lens 5 onto a screen in the enlarged state.

Second Embodiment

Next a second embodiment of the present invention is described with reference to the related drawings.

In the following descriptions, the same reference numerals are assigned to the same structures and components as those in the first embodiment described above, and the detailed description thereof is omitted herefrom.

In the first embodiment, the in the optical modulator holder 4402 constituting the optical device 44, there are provided a pair of cooling chambers R1, R2, and heat generated in the liquid crystal panel 441, incident-side polarization plate 442, and irradiation-side polarization plate 443 is radiated by circulating a cooling fluid.

In contrast, in the second embodiment, in an optical modulator holder 5402 constituting the optical device 54, only one cooling chamber R3 is formed, and the heat generated in the liquid crystal panel 441 and irradiation-side polarization plate 443 is radiated by circulating a cooling fluid therein.

In the first embodiment, the incident-side polarization plate 442 is integrated as the optical device 44, but in the second embodiment, the incident-side polarization plate 442 is not integrated as an optical device 54, and like the optical components 412 to 415, 418, 421 to 423, 431 to 434, the incident-side polarization plate 442 is accommodated in the casing 45 for optical components by sliding it into the groove 451A of the component accommodation member 451 in the casing 45 for optical components.

Although not shown specifically, this incident-side polarization plate 442 comprises a reflection type of polarization element allowing passage of a light beam having a specific polarization axis and reflecting light beams having different polarization axes. For instance, as the incident-side polarization plate 442, a reflection type of polarization element comprising a light-transmissible substrate such as a glass sheet and a multilayered film comprising a number of film sheets prepared by extending a polymer and laminated on the light-transmissible substrate may be used. Further as the incident-side polarization plate 442, not only the light-transmissible polarization element comprising the organic material as described above, but also the reflection type of polarization element of an inorganic material and comprising, for instance, a light-transmissible substrate such as a glass sheet and a plurality of projecting stripe portions arranged in parallel to each other each comprising a conductive material such as metal, projecting from the light-transmissible substrate and extending toward inside of a face of the light-transmissible substrate may be employed.

Figure 12:
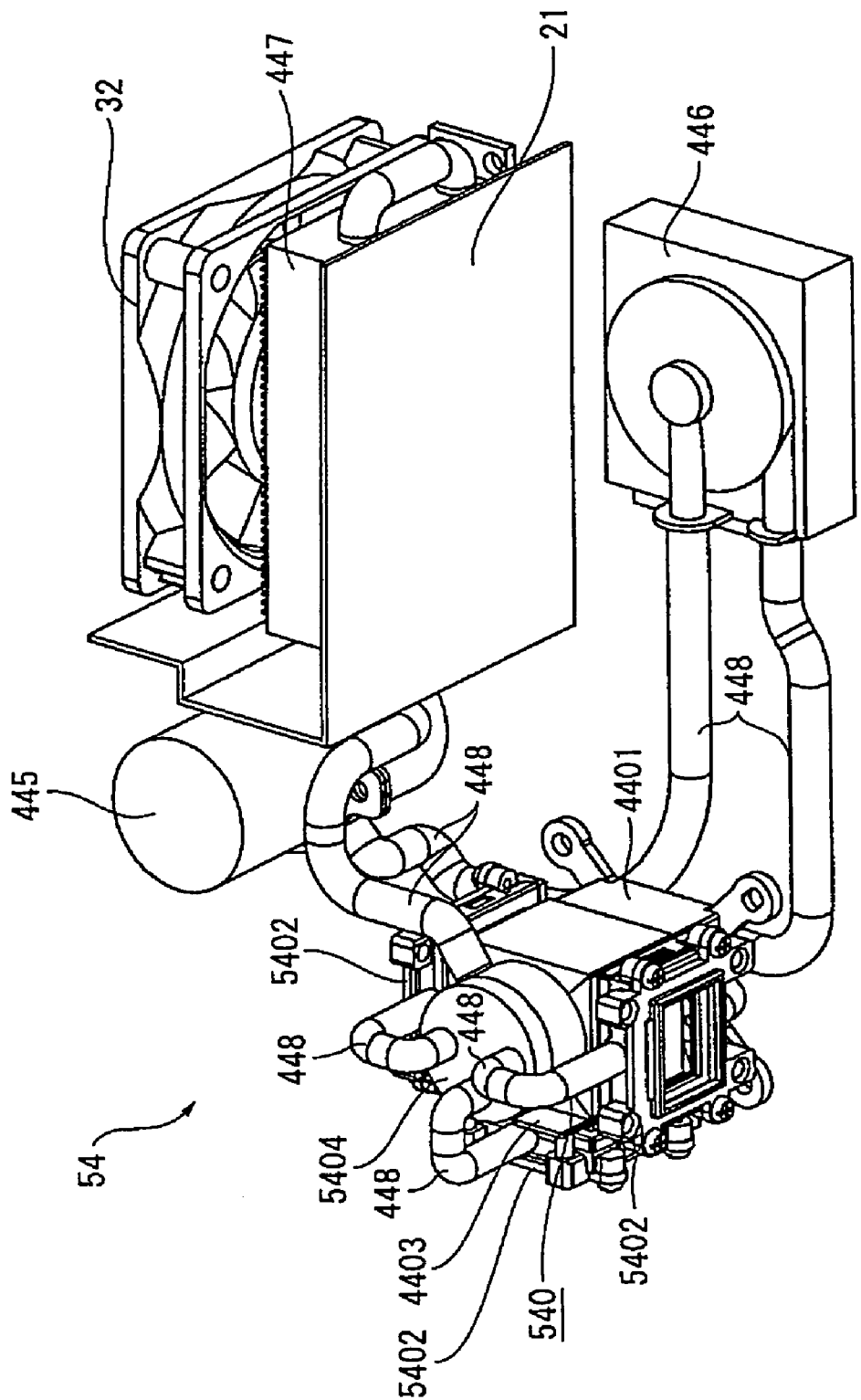
FIG. 12 is a perspective view of an optical device viewed from the top side according to a second embodiment.

FIG. 12 is a perspective view showing the optical device 54 according to the second embodiment viewed from the top side.

Figure 13:
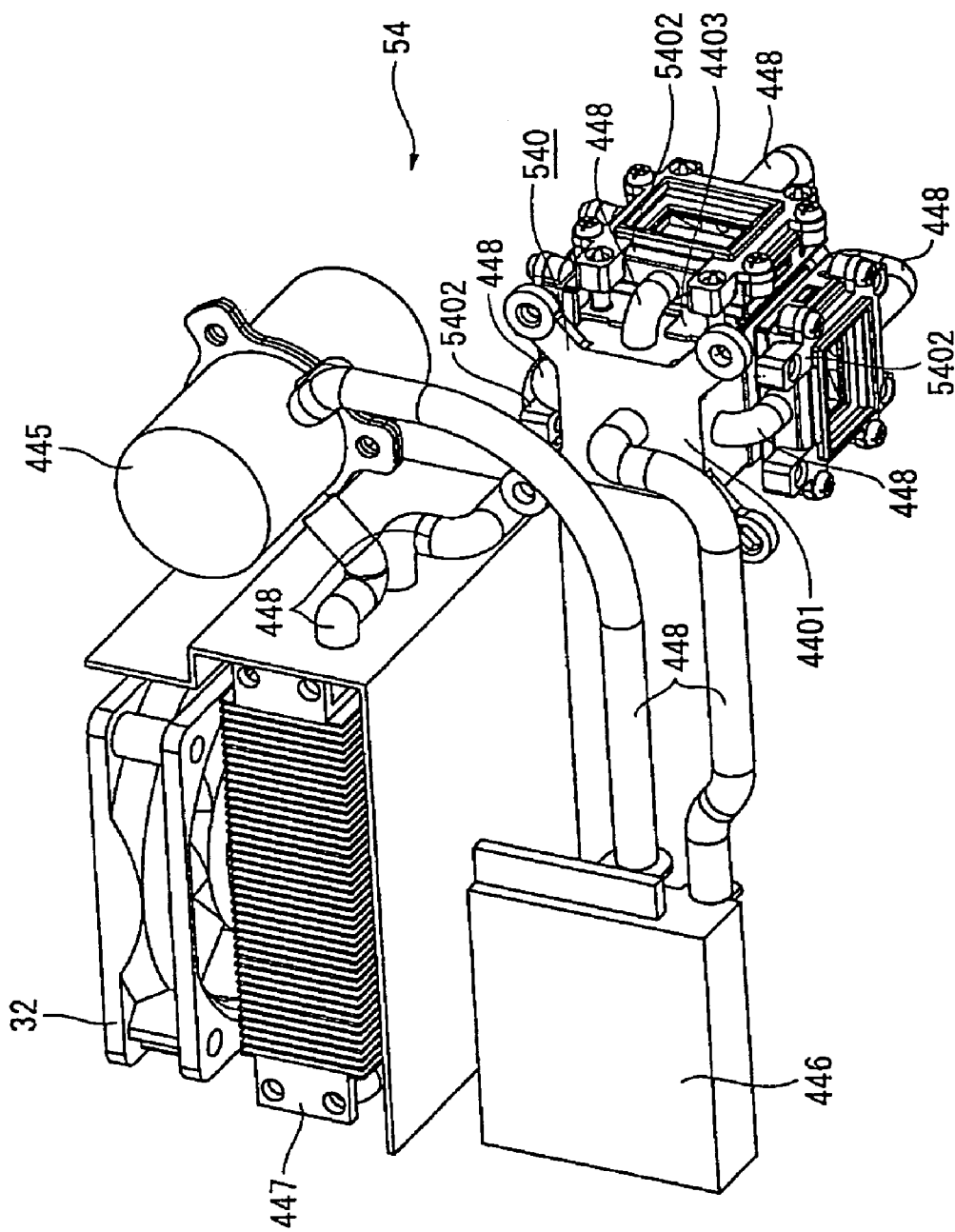
FIG. 13 is a perspective view of the optical device viewed from the bottom side according to the second embodiment.

FIG. 13 is a perspective view showing the optical device 54 viewed from the bottom side.

The optical device 54 comprises, in addition to the main tank 445, fluid press-feeding section 446, radiator 447, and a plurality of fluid circulating members 448 each described in the first embodiment, an optical device main body 540.

The optical device main body 540 comprises, in addition to the three liquid crystal panels 441, three irradiation-side polarization plate 443, cross dichroic prism 444, fluid branching section 4401 (Refer to FIG. 13), and three supporting member 4403, three optical modulator holders 5402, and a relay tank 5404 (Refer to FIG. 12), and these components 441, 443, 444, 4401, 4403, 5402, and 5404 are integrated with each other.

Figure 14:
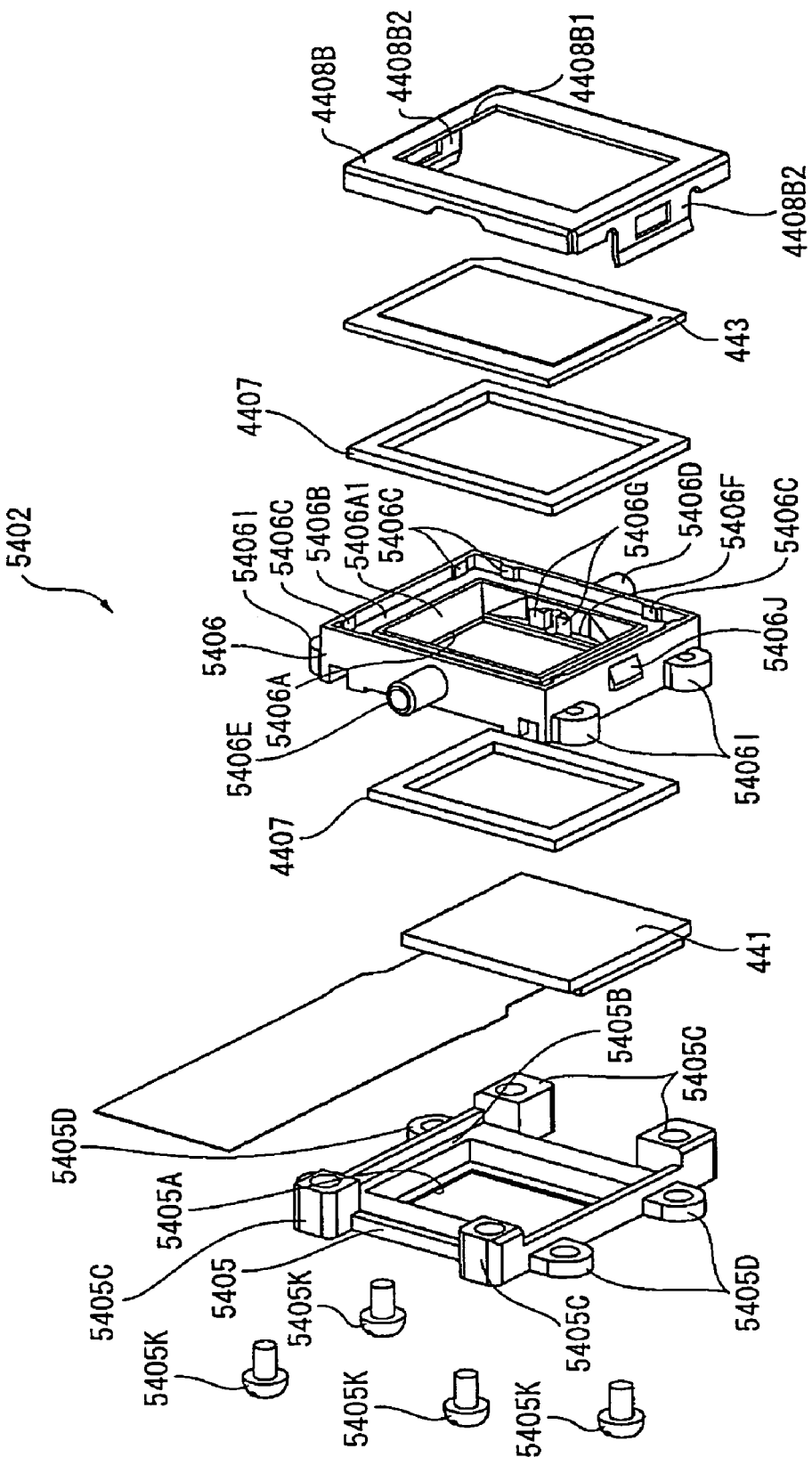
FIG. 14 is an exploded perspective view showing a general configuration of an optical modulator holder according to the second embodiment.

FIG. 14 is a developed perspective view showing general configuration of the optical modulator holders 5402.

The three optical modulator holders 5402 support the three liquid crystal panels 441 and the three irradiation-side polarization plates 443 respectively, and also a cooling fluid flows into and flows out of the three optical modulator holders 5402 to cool the three liquid crystal panels 441, and the three irradiation-side polarization plates 443 respectively. Each of the optical modulator holders 5402 has the same configuration, so that description is made below by referring only one optical modulator holder 5402. This optical modulator holder 5402 has the substantially same configuration as that of the optical modulator holder 4402 described in the first embodiment, and comprises a pair of frame members 5405, 5406, two elastic members 4407, and a polarization plate fixing member 4408B.

The frame member 5405 is a frame body having a substantially rectangular form when viewed from the top side and also having an opening 5405A having an opening with the rectangular form corresponding to an optical modulation face of the liquid crystal panels 441 formed at the substantially central portion thereof, and is provided in the light beam incident side against the frame member 5406, and presses and fixes the liquid crystal panel 441 via the elastic member 4407 to the frame member 5406 from the light beam incident side.

In this frame member 5405, a support face 5405B for supporting an edge face of the liquid crystal panel 441 in the light beam incident side is formed on the edge face thereof in the light beam irradiation side as shown in FIG. 14.

Further in the frame member 5405, four inserting sections 5405C each allowing insertion of the pin-shaped member 4403A (Refer to FIG. 15) of the supporting member 4403 are formed at the edge corner portions in the upper section and also at the edge corner portions in the lower section.

Further in the frame member 5405, connecting sections 5405D each for connection to the frame member 5406 are formed in the edge corner sections in the left side and also at the edge corner sections in the right side as shown in FIG. 14.

The frame member 5406 is made from an aluminum-made member, and holds the liquid crystal panels 441 with the frame member 5405 via the elastic member 4407, and also supports the irradiation-side polarization plate 443 with the polarization plate fixing member 4408B via the elastic member 4407 on a counter face to the face opposite to the frame member 5405, and the specific structure is substantially identical to that of the frame member 4406 described in the first embodiment above. Namely, formed in this frame member 5406 are an opening 5406A (including a slant surface 5406A1), a recess 5406B, a hooking projection 5406C, an inlet port 5406D, an outlet port 5406E, a recess 5406F, a rectifying section 5406G, a connecting section 5406I, and a hook 5406J like the opening 4406A (including the slant surface 4406A1), recess 4406B, hooking projection 4406C, inlet port 4406D, outlet port 4406E, recess 4406F, rectifying section 4406G, connecting section 4406I, and hook 4406J each formed in the frame member 4406 described in the first embodiment.

By setting screws 5405K in the connecting sections 5405D, 5406I of the frame members 5405, 5406, the liquid crystal panel 441 is pressed via the elastic member 4407 to the frame member 5406, and the light beam incident side of the opening 5406A of the frame member 5406 is sealed.

When the polarization plate fixing member 4408B is fixed to the frame member 5406, the irradiation-side polarization plate 443 is pressed via the elastic member 4407 to the frame member 5406, and the light beam irradiation side of the opening 5406A of the frame member 5406 is sealed.

As described above, when the light beam incident side and the light beam irradiation side of the opening 5406A of the frame member 5406 are sealed, a cooling chamber R3 (Refer to FIG. 15) is formed inside the frame member 5406. Further, in the cooling chamber R3, a buffer section Bf1 (Refer to FIG. 15) allowing temporal accumulation of a cooling fluid is formed with an edge face of the irradiation-side polarization plate 443 in the light beam incident side, recess 5406F, and rectifying section 5406G at a position not two-dimensionally interfering the optical modulation face of the liquid crystal panel 441.

As only one cooling chamber R3 is formed in the optical modulator holder 5402 as described above, the fluid circulating members 448 for connection at an edge thereof between the cooling fluid outflow section 4401C of the fluid branching section 4401 and optical modulator holder 5402 do not branch in the other edge, and is connected to the inlet port 5406D of the frame member 5406.

The relay tank 5404 has the substantially same configuration as that of the relay tank 4404 described in the first embodiment, and the difference is only the point that only three cooling fluid inflow sections 4404A are formed because the optical modulator holder 5402 has only one cooling chamber R3. Other portions in the configuration are the same as those of the relay tank 4404 described in the first embodiment.

Next, a cooling mechanism for the liquid crystal panel 441 as well as for the irradiation-side polarization plate 443 is described below.

Figure 15:
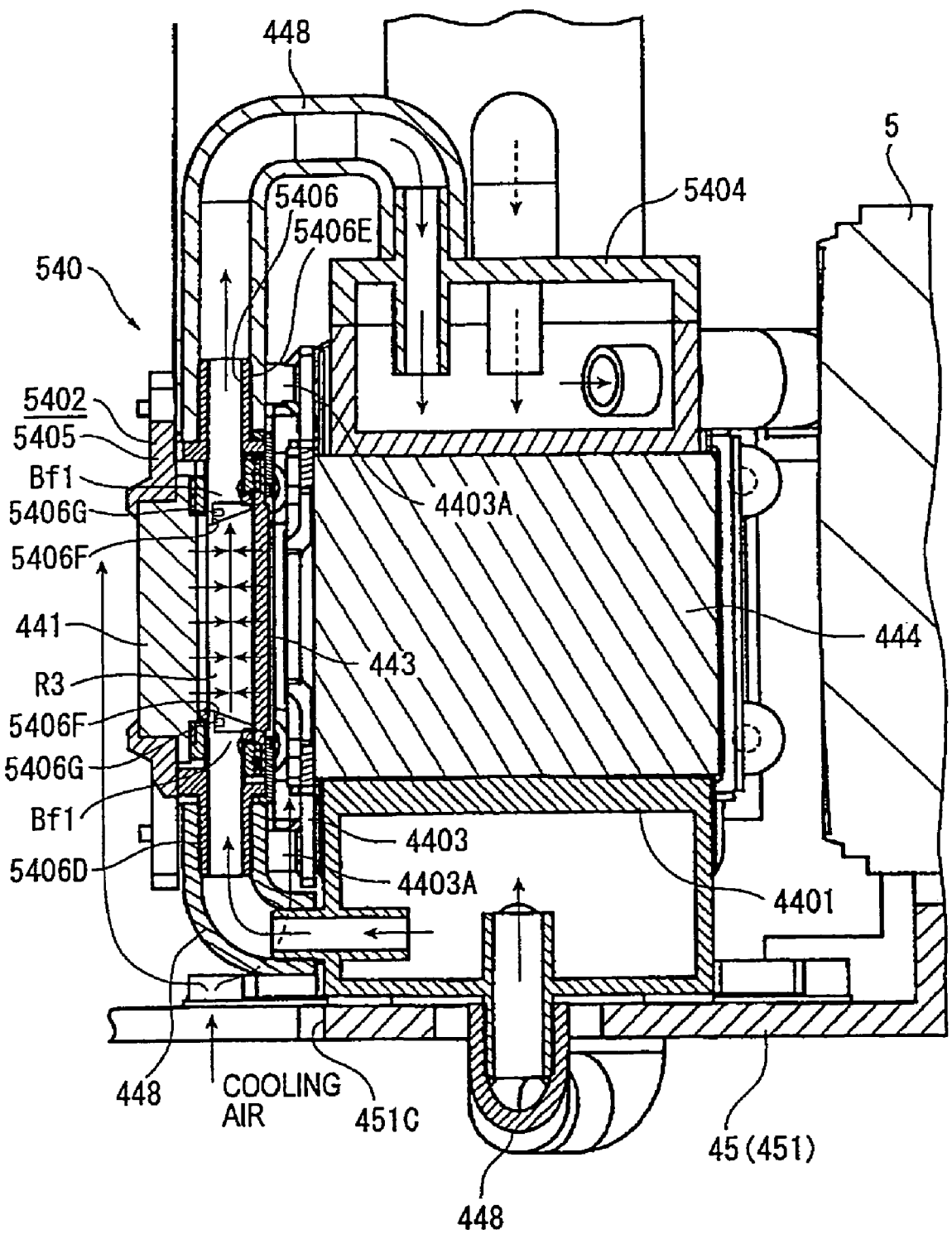
FIG. 15 is a cross-sectional view illustrating a cooling construction of a liquid crystal panel and irradiation-side polarization plate according to the second embodiment.

FIG. 15 is a cross-sectional view showing a cooling mechanism for the liquid crystal panel 441 as well as for the irradiation-side polarization plate 443.

When the fluid press-feeding section 446 is driven, a cooling fluid inside the main tank 445 is press-fed via the fluid press-feeding section 446 to the fluid branching section 4401 and is branched by the fluid branching section 4401 to flow into each cooling chamber R3 of each optical modulator holder 5402. In this step, the cooling fluid flowing into inside of each cooling chamber R3 is accumulated once in each buffer section Bf1, and then a flow direction of the cooling fluid is rectified by the rectifying section 5406G so that the cooling fluid spreads inside the cooling chamber R3.

In this step, heat generated by a light beam irradiated from the light source 411 in the liquid crystal panel 441 and irradiation-side polarization plate 443 is delivered to the cooling fluid inside the cooling chamber R3 of the frame member 5406 in the optical modulator holder 5402.

The heat delivered to the cooling fluid inside the cooling chamber R3 moves from the cooling chamber R3 to the relay tank 5404, and then to the radiator 447, and is radiated by the radiator 447 like in the first embodiment described above.

The cooling fluid cooled by the radiator 447 moves from the radiator 447 to the main tank 445 and then to the fluid press-feeding section 446 and fluid branching section 4401, and is again led into the cooling chamber R3.

Cooling air is flown by the sirocco fan 31 of the cooling unit 3 over an external face of the optical modulator holder 5402 and to between the optical modulator holder 5402 and the supporting member 4403, and then flows upward from the bottom. In this step, the cooling air cools and flows along an edge face of the liquid crystal panel 441 in the light beam incident side and an edge face of the irradiation-side polarization plate 443 in the light beam irradiation side.

In the second embodiment described above, different from the first embodiment, the incident-side polarization plate 442 is formed with a reflection type of polarization element, so that temperature increase in the incident-side polarization plate 442 is prevented and it is not necessary to integrate the incident-side polarization plate 442 with the optical device 54. Therefore, the optical modulator holder 5402 is required only to support the liquid crystal panel 441 and the irradiation-side polarization plate 443, so that configuration of the optical modulator holder 5402 can be simplified.

Further as the optical modulator holder 5402 comprises only one cooling chamber R3, also configuration of the fluid circulating members 448 for connecting the fluid branching section 4401 to the optical modulator holder 5402 and also for connecting the optical modulator holder 5402 to the relay tank 5404 can be simplified.

Third Embodiment

Next, a third embodiment of the present invention is described with reference to the related drawings.

In the following descriptions, the same reference numerals are assigned to the same structures and components as those in the first embodiment described above, and the detailed description thereof is omitted or simplified herein.

In this embodiment, the difference from the first embodiment is only the point that, in the optical modulator holder 4402, the cooling chamber dividing sections 4400 dividing the cooling chambers R1, R2 into two regions in the light beam incident side and the light beam irradiation side are arranged in the cooling chambers R1, R2 respectively. Other structures are the same as those in the first embodiment described above.

Figure 16:
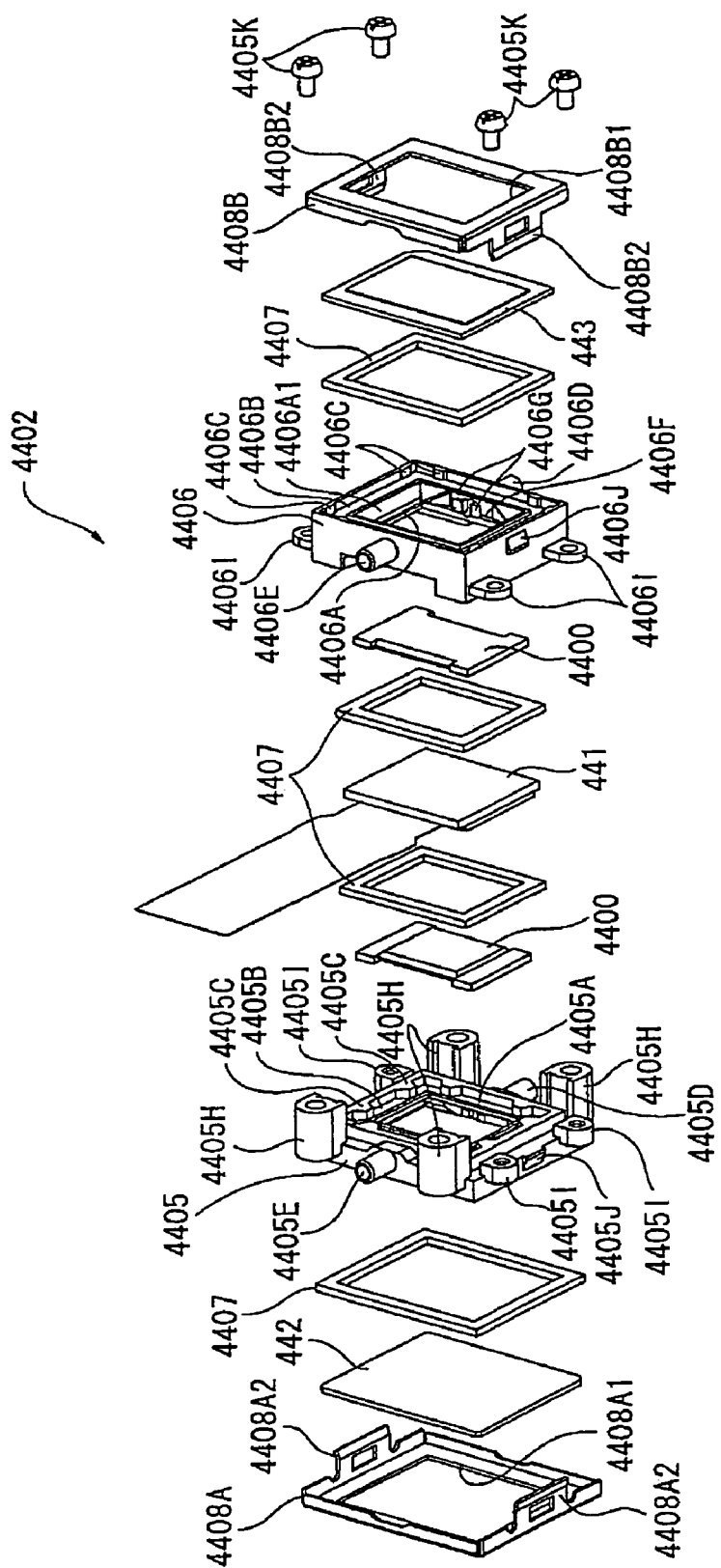
FIG. 16 is a view showing an arrangement position of cooling chamber dividing sections according to a third embodiment.

FIG. 16 is a view showing the positions in which the cooling chamber dividing sections 4400 are arranged in the third embodiment.

FIGS. 17A, 17B, and 17C are views each showing the structure of the cooling chamber dividing section 4400. More specifically, FIG. 17A is a view showing the cooling chamber dividing section 4400 arranged in the light beam incident side of the liquid crystal panel 441 viewed from the light beam irradiation side. FIG. 17B is a cross-sectional view taken along the line D—D in FIG. 17A. FIG. 17C is a cross-sectional view taken along the line E—E in FIG. A.

The two cooling chamber dividing sections 4400 are arranged between the liquid crystal panel 441 and the frame members 4405, 4406 respectively as shown in FIG. 16.

Configuration of the two cooling chamber dividing sections 4400 is the same and only the cooling chamber dividing section 4400 arranged between the liquid crystal panel 441 and the frame member 4405 is described below.

This cooling chamber dividing section 4400 comprises, as shown in FIGS. 17A, 17B, and 17C, a dividing section body 4400A and contact sections 4400B.

The dividing section body 4400A is a plate body having a substantially rectangular form when viewed from the top with the dimension a little smaller than that of the opening 4405A of the flame member 4405.

In this dividing section body 4400A, as shown in FIG. 17A or FIG. 17B, taper sections 4400A1 each having slant surfaces 4400A2 with the corner portions tapered in the light beam incident side and in the light beam irradiation side are formed in the upper and lower edge portions thereof respectively. Namely, the upper and lower edge sections of the dividing section body 4400A have a form in which the cross-sectional areas become smaller in the upward direction and in the downward direction respectively.

Further in this dividing section body 4400A, as shown in FIG. 17A or FIG. 17C, taper sections 4400A3 each having slant surfaces 4400A4 with the corner sections tapered in the light beam irradiation side are formed in the edge portions of the left side and the right side respectively. Namely, the edge faces of the dividing section body 4400A in the light beam irradiation side expand toward a substantially central portion thereof when viewed from the top in the light beam irradiation side with these taper sections 4400A1, 4400A3.

The contact sections 4400B are portions contacting the frame member 4405, and are formed along the peripheries of the left and right edge portions of the dividing section body 4400A respectively as shown in FIGS. 17A, 17B, and 17C. These contact sections 4400B are plate bodies each having a substantially rectangular form when viewed from the top extending in the upward and downward directions, and the thickness thereof is formed smaller as compared to that of the dividing section body 4400A as shown in FIG. 17B or FIG. 17C.

The dividing section body 4400A and the contact sections 4400B described above comprising a light-transmissible member such as a glass sheet are a molded product monolithically formed by molding. It is to be noted that the dividing section body 4400A and the contact sections 4400B are not limited to any member if having the light transmittance state, and preferably made from a light-transmissible member having a thermal conductivity of 10 W/m·K or more.

The cooling chamber dividing section 4400 arranged in the light beam irradiation side of the liquid crystal panel 441 is arranged, as shown in FIG. 16, so that the edge face in the light beam axis thereof is placed reversely to that of the cooling chamber dividing section 4400 arranged in the light beam incident side of the liquid crystal panel 441.

Figure 18:
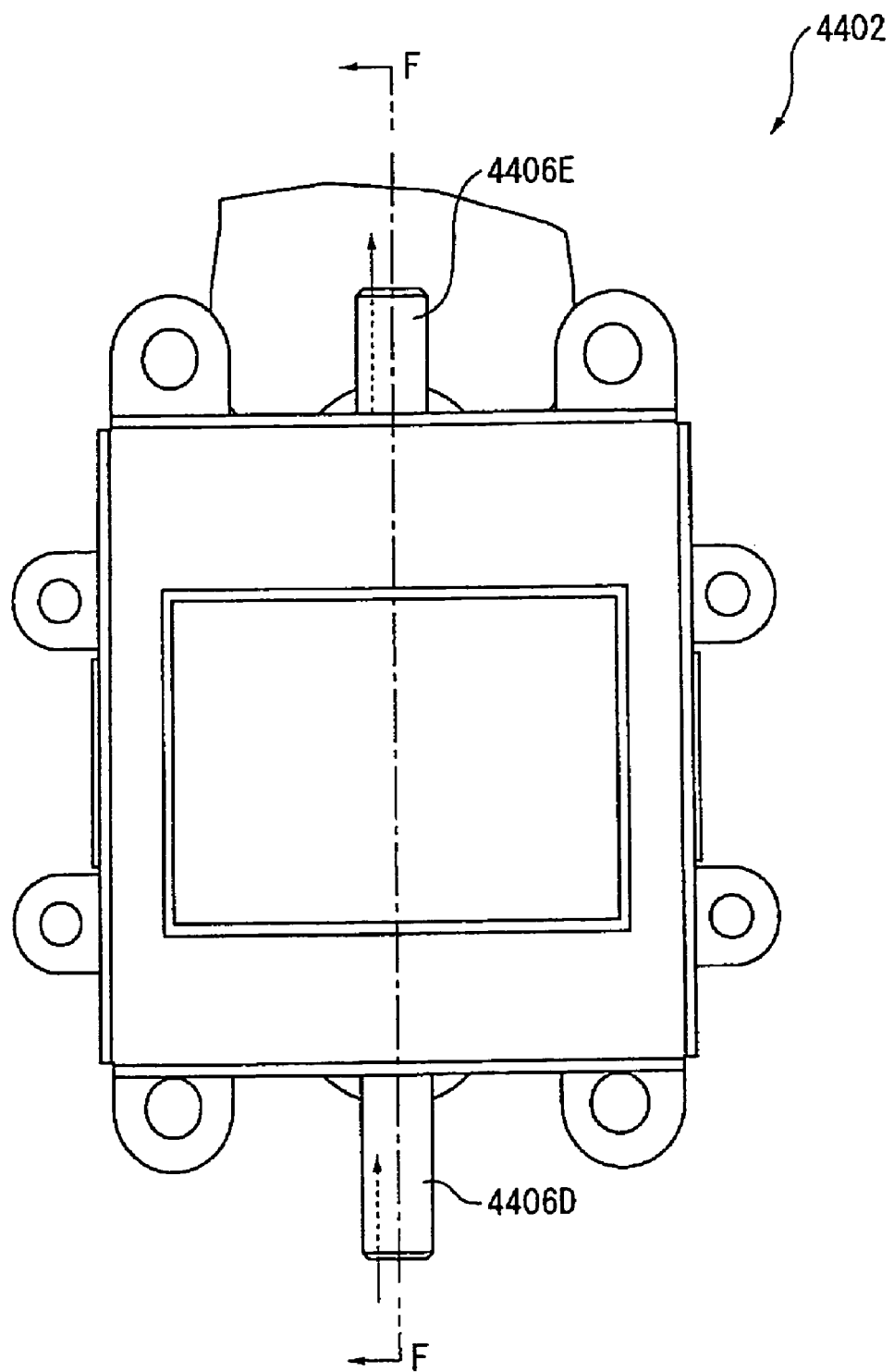
FIG. 18 is a view illustrating a state of the cooling chamber dividing sections arranged inside cooling chambers respectively according to the third embodiment.
Figure 19:
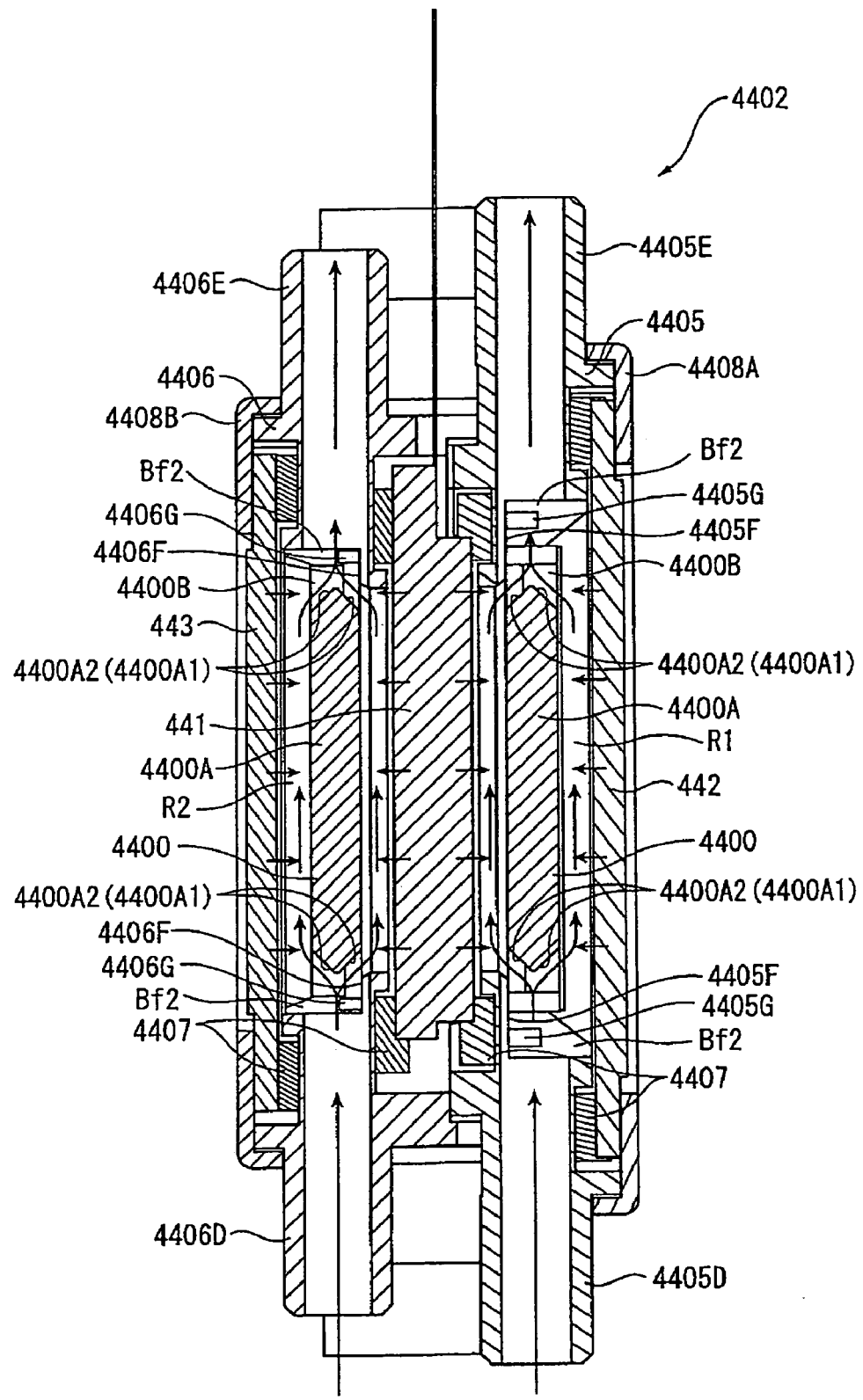
FIG. 19 is a view illustrating a state of the cooling chamber dividing sections arranged inside the cooling chambers respectively according to the third embodiment.

FIG. 18 and FIG. 19 are views each showing the state of the cooing chamber dividing sections 4400 arranged in the cooling chambers R1, R2 respectively. More specifically, FIG. 18 is a view showing the optical modulator holder 4402 viewed from the light beam irradiation side. FIG. 19 is a cross-sectional view taken along the line F—F in FIG. 18.

Although not shown in the figures, recesses having a smaller thickness in the light axis as compared to that of the recess 4405B are formed in the edge sides in the left direction and the right direction of the recess 4405B formed in the light beam irradiation side of the frame member 4405. The recesses (not shown) described above have a form corresponding to the contact sections 4400B of the cooling chamber dividing section 4400, and when the cooling chamber dividing section 4400 is arranged in the cooing chamber R1, the edge faces of the contact sections 4400B in the light beam incident side in the cooling chamber dividing section 4400 contact the recesses (not shown) described above. When the optical modulator holder 4402 is mounted, edge sections in the left and right directions of the elastic member 4407 placed between the liquid crystal panel 441 and the frame member 4405 contact in the edge faces of the contact sections 4400B in the light beam irradiation side, and the cooing chamber dividing section 4460 is pressed and fixed into the recesses (not shown) described above.

The recesses (not shown) described above are also formed in the frame member 4406.

When the cooling chamber dividing sections 4400 are arranged inside the cooling chambers R1, R2 respectively, as shown in FIG. 19, prespecified spaces are made respectively between the cooling chamber dividing sections 4400 and incident-side polarization plate 442, the liquid crystal panel 441, and the irradiation-side polarization plate 443 with the recesses (not shown) described above and the elastic members 4407.

In this embodiment, the dimension in the light axis direction of these spaces is set in the range from 0.5 mm to 2 mm. Preferably the dimension in the light axis direction of these spaces is set in the range from 0.5 mm to 1 mm.

Further when the cooling chamber dividing section 4400 is arranged inside the cooling chamber R1, as shown in FIG. 19, buffer sections Bf2 allowing temporal accumulation of a cooling fluid are formed at positions not two-dimensionally interfering the optical modulation face of the liquid crystal panel 441 with the edge faces of the incident-side polarization plate 442 in the light beam irradiation side, recesses 4405F, rectifying sections 4405G, and the taper sections 4400A1 of the dividing section body 4400A in the cooling chamber dividing section 4400. In the cooling chamber R2 like in the cooing chamber R1, the buffer sections Bf2 are also formed at positions not two-dimensionally interfering the optical modulation face of the liquid crystal panel 441 with the edge faces of the irradiation-side polarization plate 443 in the light beam incident side, recesses 4406F, rectifying sections 4406G, and the taper sections 4400A1 of the dividing section body 4400A in the cooling chamber dividing section 4400.

With the configuration described above, as shown in FIG. 19, the cooling fluid flowing into the cooling chambers R1, R2 from the inlet ports 4405D, 4406D is temporarily accumulated with each buffer section Bf2, and the flow direction of the cooling fluid is rectified in a direction parallel to the optical modulation face of the liquid crystal panel 441 with the rectifying sections 4405G, 4406G, and then the flow of the cooling fluid is rectified in the light beam incident side and in the light beam irradiation side to convect along the edge faces of the cooling chamber dividing section 4400 in the light beam incident side and the light beam irradiation side. The cooling fluid circulating along the edge faces of the cooling chamber dividing section 4400 in the light beam incident side and the light beam irradiation side is guided toward the substantially central portion in the thickness direction of the cooling dividing section 4400 with each of the slant surfaces 4402A2 formed in the edge portions of the cooling chamber dividing section 4400 in the lower side to flow outside of the cooling chambers R1, R2 via the outlet ports 4405E, 4406E.

In the third embodiment described above, different from the first embodiment described above, as the buffer sections Bf2 comprise the recesses 4405F, 4406F, the rectifying sections 4405G, 4406G, the incident-side polarization plate 442, the irradiation-side polarization plate 443, and the cooling chamber dividing sections 4400, it is possible to temporally accumulate the cooling fluid flowing therein via the inlet ports 4405D, 4406D and then rectify the flow direction of the cooling fluid to a direction parallel to the optical modulation face of the liquid crystal panel 441 with the rectifying sections 4405G, 4406G and also rectify the flow direction to a direction perpendicular to the optical modulation face of the liquid crystal panel 441 with the cooling chamber dividing sections 4400. With the configuration described above, the flow velocity of the cooling fluid at various positions inside the cooling chambers R1, R2 can greatly be homogenized with both the rectifying sections 4405G, 4406G and the cooling chamber dividing sections 4400, so that an optical image formed with the liquid crystal panel 441 can be maintained in better conditions. As the flow velocity of the cooling fluid can greatly be homogenized at various positions inside the cooling chambers R1, R2, surface temperature of the liquid crystal panel 441 can also further be homogenized with the local overheating prevented, so that a clearer optical image can be formed with the liquid crystal panel 441.

By providing the cooling chamber dividing sections 4400 inside the cooling chambers R1, R2 respectively, the thickness of the cooling fluid layer contacting the liquid crystal panel 441, incident-side polarization plate 442, and irradiation-side polarization plate 443 inside of the cooling chambers R1, R2 respectively is reduced, so that the circulation speed of the cooling fluid contacting the liquid crystal panel 441, incident-side polarization plate 442, and irradiation-side polarization plate 443 respectively can be raised. Therefore, it is possible to maintain a temperature difference between the liquid crystal panel 441, incident-side polarization plate 442, and irradiation-side polarization plate 443 to further efficiently cool the liquid crystal pane 441, incident-side polarization plate 442, and irradiation-side polarization plate 443.

As the cooling chamber dividing sections 4400 have taper sections 4400A1 at the upper and lower edge portions of the inlet ports 4405D, 4406D and outlet ports 4405E, 4406E respectively, the cooling fluid flowing from the inlet ports 4405D, 446D into the cooling chambers R1, R2 is not stalled therein and can smoothly be convected in the light beam incident side and the light beam irradiation side of the cooling chamber dividing sections 4400, so that it is possible to guide the cooling fluid circulating in the light beam incident side and the light beam irradiation side of the cooling chamber dividing section 4400 to the outlet ports 4405E and 4406E smoothly.

With the feature described above, different from the cooling chamber dividing section without the taper sections 4400A1, the circulation speed of the cooling fluid contacting the liquid crystal panel 441, incident-side polarization plate 442, and irradiation-side polarization plate 443 respectively can be maintained in good conditions to increase the heat volume delivered by the cooling fluid, so that the liquid crystal panel 441, incident-side polarization plate 442, and irradiation-side polarization plate 443 can be cooled down with the cooing fluid in efficient manner.

As the cooling fluid flowing from the inlet ports 4405D, 4406D into the cooling chambers R1, R2 is not stalled therein, phenomenon of foam generation in the cooling chambers R1, R2 can be suppressed, so that the image quality of an optical image formed with the liquid crystal panel 441 can be maintained in good conditions.

Further, as the circulation speed of the cooling fluid can convect inside the cooling chambers R1, R2 keeping a higher circulation speed, the revolving speed can be set low when the fluid press-feeding section 446 is driven with the noise occurred in the fluid press-feeding section 446 minimized, so that the noise caused by the projector 1 can be reduced. Further, by setting the revolving speed of the fluid press-feeding section 446 to low level consumption of electric power can be reduced.

Further as the cooling chamber dividing section 4400 has a form in which the substantially central portion viewed from the top extends toward the liquid crystal panel 441 with the taper sections 4400A1, 4400A3, the thickness of the cooling fluid layer circulating between the liquid crystal panel 441 and the cooling chamber dividing section 4400 can be further reduced, so that the circulation speed of the cooling fluid contacting the liquid crystal panel 441 can be further increased.

The cooling chamber dividing sections 4400 comprise the dividing section body 4400A and the contact sections 4400B and are arranged inside the cooling cambers R1, R2 respectively by contacting the contact sections 4400B to the recesses of the frame members 4405, 4406, so that each cooling chamber dividing section 4400 can be arranged at a prespecified position inside of each cooling chambers R1, R2 in good conditions. Because of this feature, there is no displacement of the cooling chamber dividing sections 4400 inside the cooling chambers R1, R2, and the thickness of the cooling fluid layer contacting the liquid crystal panel 441, the incident-side polarization plate 442, and the irradiation-side polarization plate 443 respectively is not changed, so that the cooling state in the liquid crystal panel 441, incident-side polarization plate 442, and irritation-side polarization plate 443 can be maintained in good conditions.

The contact sections 4400B are formed along the peripheries of the edge portions of the dividing section body 4400A in the left side and the right side respectively, which ensuring each of the cooling chamber dividing sections 4400 to be provided for the frame members 4405, 4406, so that displacement of the cooling chamber dividing sections 4400 can be prevented without fail.

The dividing section body 4400A and the contact sections 4400B are a molded product monolithically formed by molding and also the slant surfaces 4400A2 can easily be formed, which makes it easy to produce the cooling chamber dividing sections. By forming the cooling chamber dividing sections 4400 by molding, the contact sections 4400B positioned at the edge portions of the dividing section body 4400A in the left and right sides can easily be formed as well. Further as the slant surfaces 4400A2 can be formed with a desired angle, so that a fluid volume of the cooling fluid flowing into between the cooling chamber dividing section 4400 and the liquid crystal panel 441, the incident-side polarization plate 442, and the irradiation-side polarization plate 443 can be controlled effectively. Further, the edge faces of the cooling chamber dividing section 4400 in the light beam incident side and/or in the light beam irradiation side can easily be formed so that the edge faces have a liner form or a nonlinear form, allowing any setting of the state in the cooling fluid circulating in the light beam incident side and/or the light beam irradiation side of the cooling chamber dividing section 4400. Because of the features, when producing the cooling chamber dividing section 4400, the production cost of the cooling chamber dividing section 4400 can be reduced, and the cooling efficiency of the liquid crystal panel 441, incident-side polarization plate 442 and irradiation-side polarization plate 443 can be increased with lower cost.

By setting the thermal conductivity of the cooling chamber dividing section 4400 to 10 W/m·K or more, heat of the cooling fluid circulating in the light beam incident side and the light beam irradiation side of the cooing chamber dividing section 4400 can be delivered to the cooling chamber dividing section 4400, and it is possible to suppress the temperature difference of the cooling fluid circulating in the light beam incident side and the light beam irradiation side of the cooing chamber dividing section 4400. Consequently, the liquid crystal panel 441, the incident-side polarization plate 442, and the irradiation-side polarization plate 443 can be cooled down uniformly.

Fourth Embodiment

A fourth embodiment of the present invention is described below with reference to the related drawings.

In the following descriptions, he same reference numerals are assigned to the same structures and components as those in the first embodiments, and detailed description thereof is omitted or simplified herein.

In the first embodiment, the optical modulator holder 4402 constituting the optical device main body 440 comprises two inlet ports 4405D, 4406D and two outlet ports 4405E, 4406E. A cooling fluid is flown via the inlet ports 4405D, 4406D into the cooling chambers R1, R2 respectively, and is flown out via the outlet ports 4405E, 4406E from the cooling chambers R1, R2 respectively.

In contrast, in the fourth embodiment, an optical modulator holder 6402 constituting an optical device main body 640 has a pair of cooling chambers R4, R5 formed therein, and these cooling chambers R4, R5 are communicated to each other in the optical modulator holder 6402. The optical modulator holder 6402 has one inlet port 6405D and one outlet port 6406D, and a cooling fluid is flown into inside of the cooling chambers R4 and R5 via the inlet port 6405D, and the cooling fluid in the cooling chambers R4, R5 is flown out to the outside via the outlet port 6406D. Other portions of the configuration excluding the optical device main body 640 are the same as those in the first embodiment.

Figure 20:
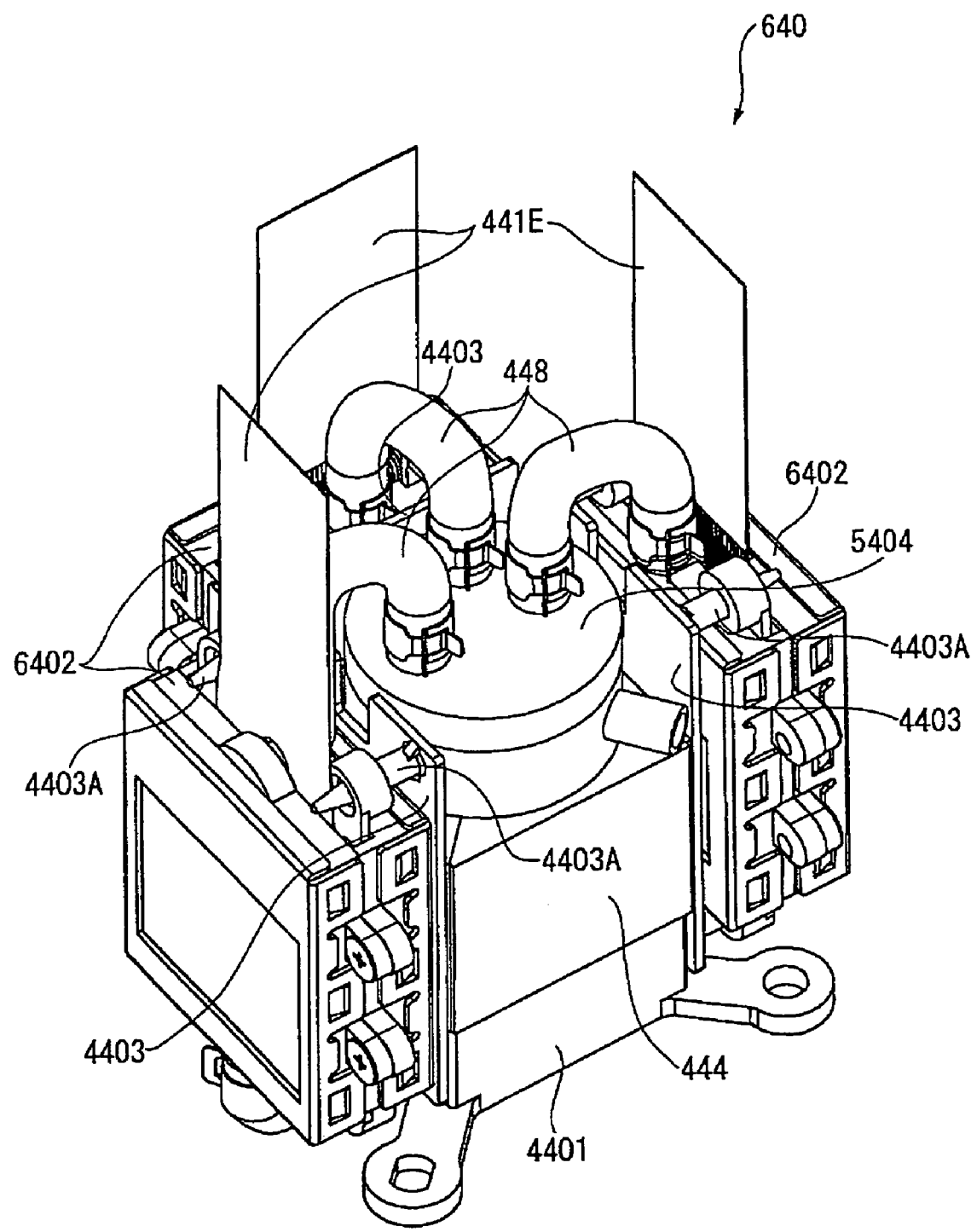
FIG. 20 is a perspective view of an optical device body viewed from the top side according to a fourth embodiment.

FIG. 20 is a perspective view showing the optical device main body 640 according to the fourth embodiment of the present invention viewed from the top side.

Figure 21:
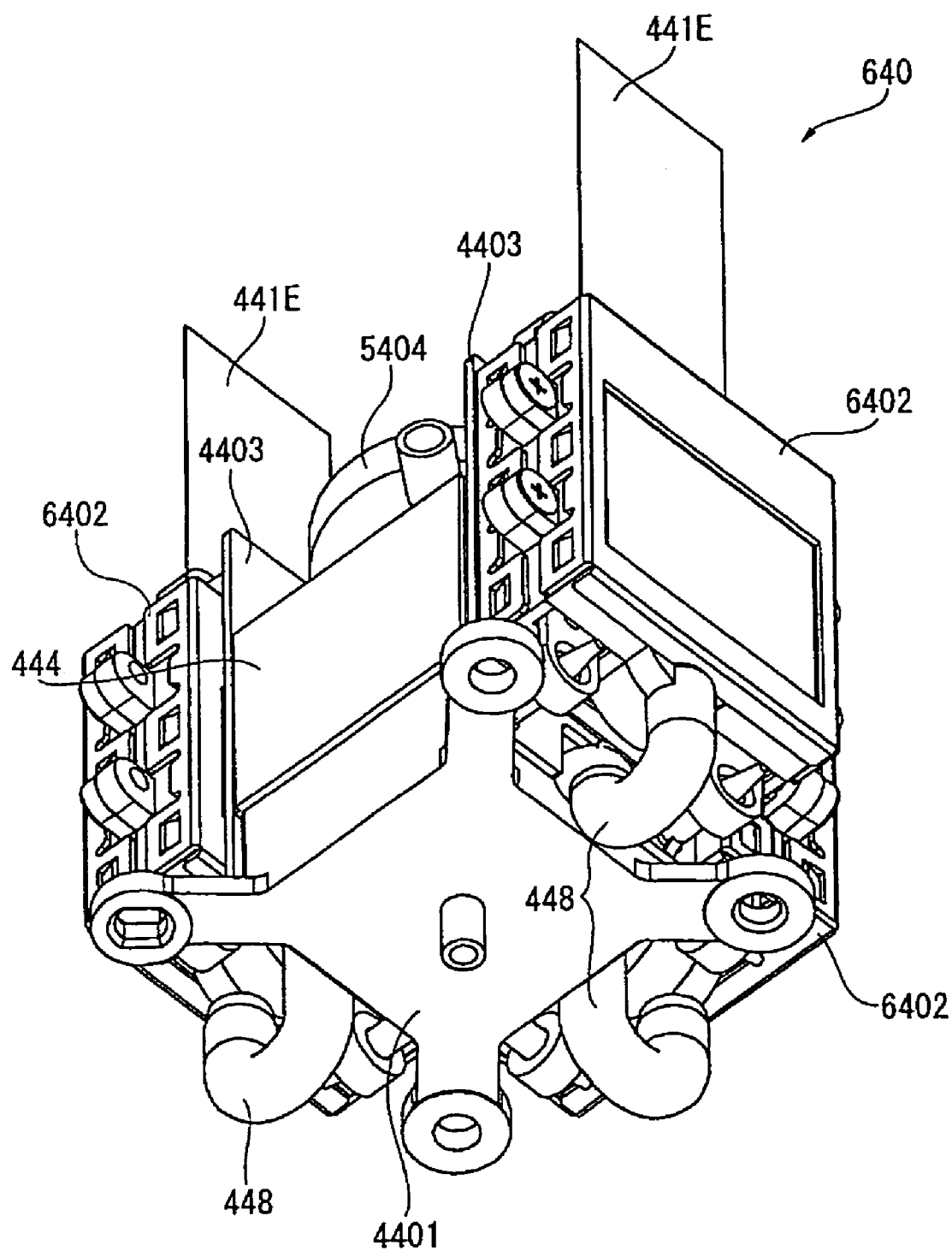
FIG. 21 is a perspective view of the optical device body viewed from the bottom side according to the fourth embodiment.

FIG. 21 is a perspective view showing the optical device main body 640 viewed from the bottom side.

As shown in FIG. 20 or in FIG. 21, the optical device main body 640 comprises, in addition to the three liquid crystal panels 441, three incident-side polarization plates 442, three irradiation-side polarization plate 443, cross dichroic prism 444, fluid branching section 4401, supporting member 4403 each described in the first embodiment and relay tank 5404 described in the second embodiment, three optical modulator holders 6402.

FIG. 2 is a developed perspective view showing the general configuration of the optical modulator holder 6402.

Figure 22:
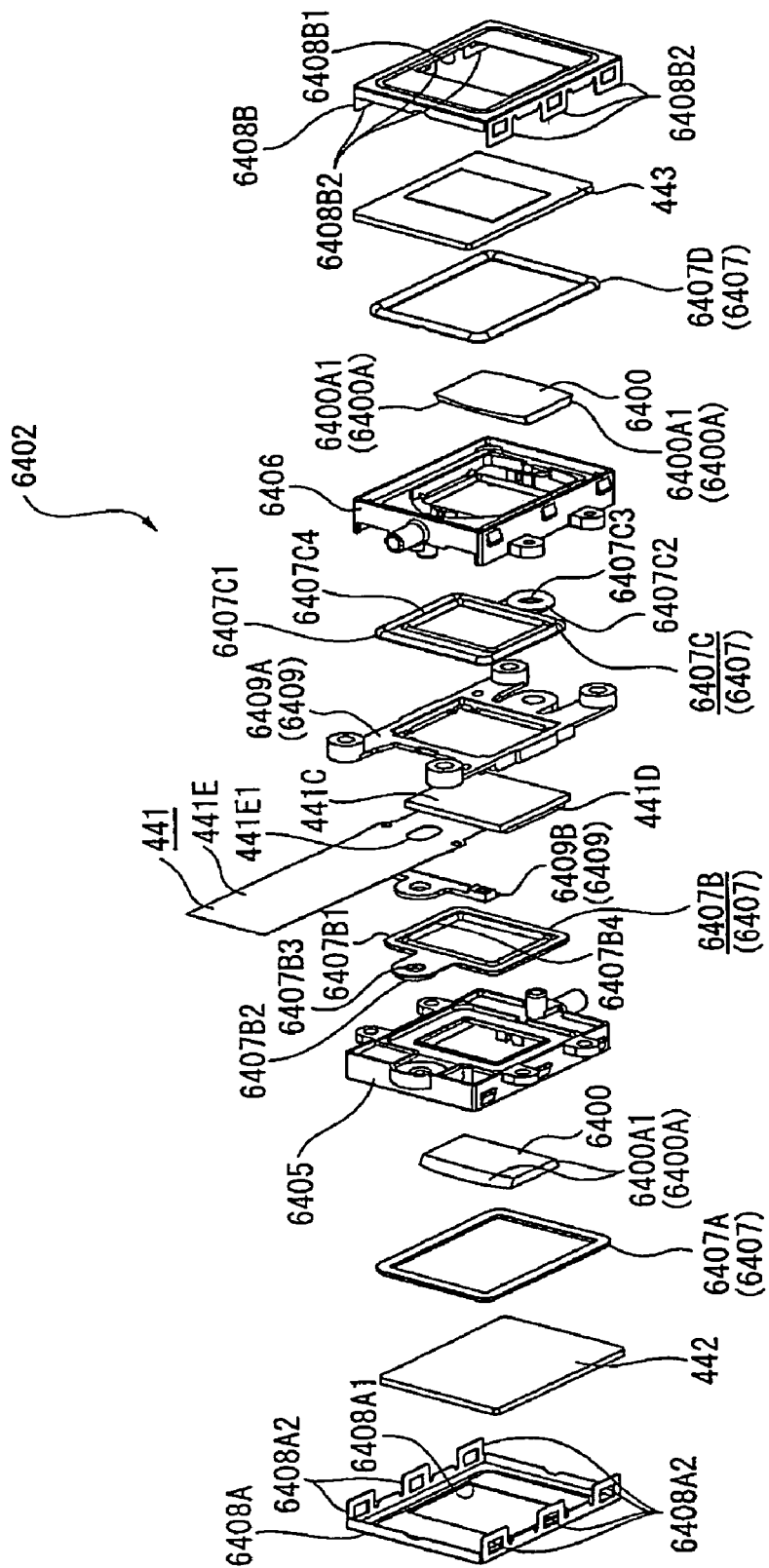
FIG. 22 is an exploded perspective view showing a general configuration of an optical modulator holder according to the fourth embodiment.

The optical modulator holders 6402 have the three liquid crystal panels 441, three incident-side polarization plate 442, and three irradiation-side polarization plates 443 described like the optical modulator holder 4402 described in the first embodiment, and a cooling fluid flows in and out of each of the three optical modulator holders 6402 to cool the three liquid crystal panels 441, three incident-side polarization plate 442, and three irradiation-side polarization plate 443 with the cooling fluid respectively. The three optical modulator holders 6402 have the same configuration, so that only one of the three optical modulator holders 6402 is described below. This optical modulator holder 6402 has, as shown in FIG. 22, a pair of frame members 6405, 6406, four elastic members 6407, a pair of polarization plate fixing members 6408A, 6408B, a support frame 6409, and two cooling chamber dividing sections 6400.

FIG. 23A and FIG. 23B are views each showing the general configuration of the frame member 6405. More specifically, FIG. 23A is a perspective view showing the frame member 6405 viewed from the light beam irradiation side. Further FIG. 23B is a perspective view showing the frame member 6405 viewed from the light beam incident side.

The frame member 6405 comprises an integral molding product prepared by molding a resin material such as PC (polycarbonate) with PPS (polyphenylene sulfide) or GF (glass fiber) added therein, and is arranged in the light beam incident side against the frame member 6406 to support the light beam incident side of the liquid crystal panel 441 and also to support the light beam irradiation side of the incident-side polarization plate 442, and the specific configuration is the substantially same as the form of the frame member 4405 described in the first embodiment. Namely the frame member 6405 has, as shown in FIG. 23A and FIG. 23B, an opening 6405A (including a slant surface 6405A1), recesses 6405B, 6405F, rectifying sections 6405G (including columns 6405G1 and rectifying faces 6405G2), and a connecting section 6405I which are the substantially same as the opening 4405A (including a slant surface 4405A1), recesses 4405B and 4405F formed in the light beam irradiation side edge face, rectifying sections 4405G (including the column 4405G1 and rectifying faces 4405G2), and connecting sections 4405I in the frame member 4405.

Of the recesses 6405F according to the present embodiment, an upper side wall of the recess 6405F provided in the upper side has a curved form and the substantially central portion in the horizontal direction recessing upward as shown in FIG. 23B. Also a lower side wall of the recess 6405F provided in the lower side has a curved form and the substantially central portion in the horizontal direction thereof recessing downward.

In the frame member 6405, an edge face in the light beam irradiation side has a recess 6405C formed thereon and recessing toward the light beam incident side as shown in FIG. 23A. This recess 6405C has a form corresponding to that of a second elastic body of an elastic member 6407 described below, and is formed with a first recess 6405C1 provided along a periphery of the opening 6405A and having a substantially rectangular form viewed from the top side and a second recess 6405C2 provided in the substantially central portion in the horizontal direction in the upper side and having a substantially circular form when viewed from the top side, the recesses 6405C1 and 6405C2 provided continuously. An edge face of the liquid crystal panels 441 in the light beam incident side is supported with these recesses 6405C via the second elastic member and the support frame 6409. As the frame member 6405 supports the edge face of the liquid crystal panel 441 in the light beam incident side, the light beam irradiation side of the opening 6405A is sealed with the second elastic member, support frame 6409, and the edge face of the liquid crystal panel 441 in the light beam incident side.

As shown in FIG. 23A and FIG. 23B, formed at the substantially central portion in the horizontal direction in the lower section of the first recess 6405C1 is a cylindrical portion 6405E having the light beam irradiation side edge face and a hole 6405E1 penetrating through the lower side recess 6405F and protruding from the light beam irradiation side edge face in the substantially perpendicular direction to be inserted into an insert hole of the frame member 6406 described later.

The cylindrical portion 6405E is communicated to an inlet port 6405D described hereinafter in the direction substantially perpendicular thereto. A portion of an internal side face of this cylindrical portion 6405E extends crossing the central axis of the inlet port 6405D to form a projection 6405E2 (See FIG. 28) for branching the cooling fluid flowing therein via the inlet port 6405D to the light beam incident side as well as to the light beam irradiation side of the frame member 6406.

Formed at the substantially central portion of the second recess 6405C2 is an insert hole 6405H penetrating the edge face in the light beam irradiation side as well as the upper side recess 6405F enabling insertion of a cylindrical portion of the frame member 6406 described later as shown in FIG. 23A or in FIG. 23B.

Further in the frame member 6405, three hooks 6405J with the polarization plate fixing member 6408A hooked herein are formed in the left edge section and in the right edge section respectively as shown in FIG. 23A and in FIG. 23B.

These three hooks 6405J are formed at positions near the edge in the vertical direction and at a substantially central portion in the vertical direction in the left edge section and in the right edge section respectively symmetrically against the substantially central portion in the vertical direction.

As shown in FIG. 22, the polarization plate fixing member 6408A has the substantially same form as that of the polarization plate fixing member 4408A described in the first embodiment, and has an opening 6408A1 and a hook engaging portion 6408A2 similar to the opening 4408A1 and hook engaging portion 4408A2 in the polarization plate fixing member 4408A. There are provided six hook engaging portions 6408A2 in correspondence to the six hooks 6405J as shown in FIG. 22.

When the light beam irradiation side of the opening 6405A in the frame member 6405 is sealed with the liquid crystal panel 441 and the light beam incident side polarization plate 442 is pressed and fixed to the recess 6405B of the frame member 6405 via a first elastic member of an elastic member 6407 described hereinafter to seal the light beam incident side of the opening 6405A in the frame member 6405, the cooling chamber R4 capable of receiving a cooling fluid therein is formed inside the frame member 6405 (in the opening 6405A and in a clearance between the recess 6405B and the incident-side polarization plate 442) (See FIG. 28).

Further in the frame member 6405, formed at the substantially central portion in the lower edge section is, as shown in FIG. 23A and FIG. 23B, an inlet port 6405D penetrating a lower side wall of the recess 6405F provided in the lower side for inletting a cooling fluid from the outside into inside of the cooling chamber R4. This inlet port 6405D comprises a substantially cylindrical member having a smaller diameter as that of the fluid circulating members 448 like the inlet port 4405D described in the first embodiment, and protrudes outward from the frame member 6405. Connected to a protruding edge of the inlet port 6405D is the other edge of the fluid circuiting member 448 with one edge thereof connected to the cooling fluid outflow section 4401C of the fluid branching section 4401, so that a cooling fluid flowing out from the fluid branching section 4401 flows into inside of the cooling chamber R4 via the fluid circulating member 448.

As described above, only one inlet port 6405D is formed in the optical modulator holder 6402, so that the fluid circulating members 448 connecting the cooling fluid outflow section 4401C of the fluid branching section 4401 to the optical modulator holder 5402 is connected to the inlet port 6405D without the other edge branching similar to the second embodiment described above.

Further in the frame member 6405, in the light beam incident side of the internal side face of the opening 6405A, four positioning projections 6405L each for positioning and fixing a cooling chamber dividing section 6400 are formed as shown in FIG. 23B.

These positioning projections 6405L are provided at positions near four corners of the internal face of the opening 6405A as shown in FIG. 2B3, and each of the positioning projections 6405L is formed as a column having a substantially right angle triangular cross section. In each of the positioning projections 6405L, an edge face corresponding to a hypotenuse of the cross section having a form like a right angle triangle faces toward the light beam incident side, and the thickness in the optical-axial direction becomes gradually smaller toward the central portion in the vertical direction.

Figure 24A:
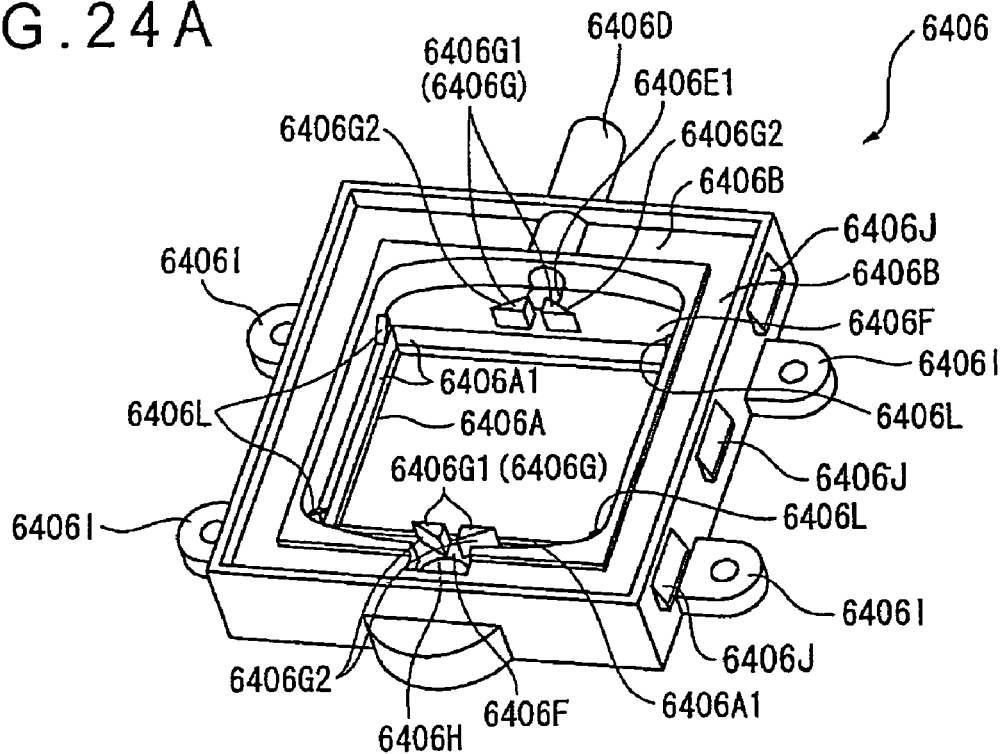
FIG. 24A and FIG. 24B are views each showing a general configuration of another frame member according to the fourth embodiment.
Figure 24B:
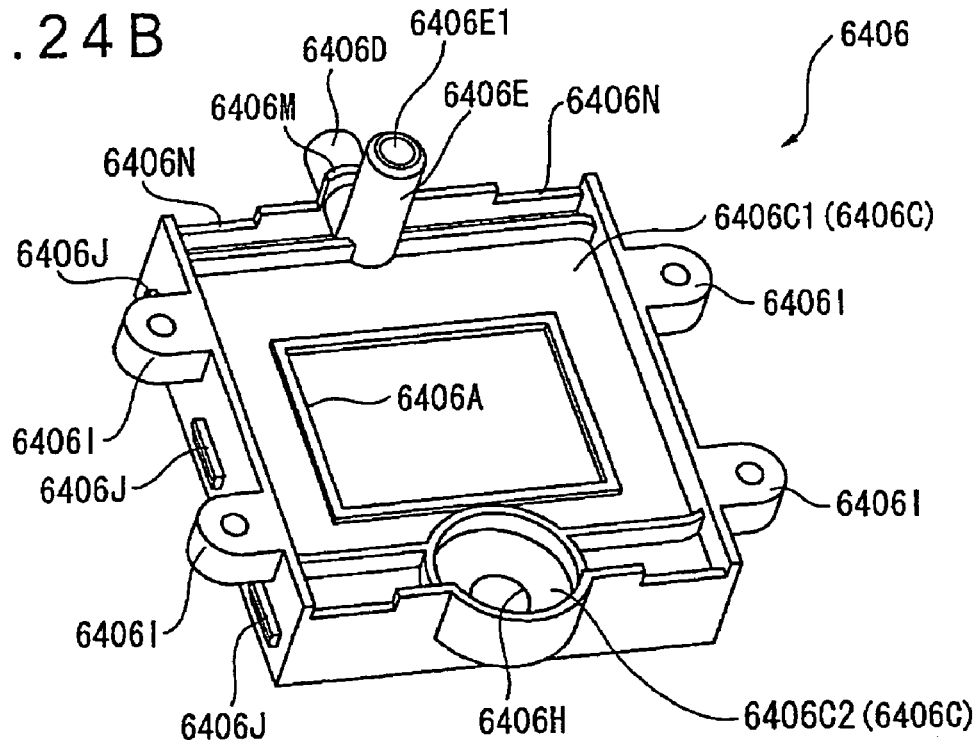

FIG. 24A and FIG. 24B are views each showing the general configuration of the frame member 6406. More specifically, FIG. 24A is a perspective view showing the frame member 6406 viewed from the light beam irradiation side. FIG. 24B is a perspective view showing the frame member 6406 viewed from the light beam incident side.

The frame member 6406 comprises a molded product prepared by molding a resin material such as PC (polycarbonate) with PPS (polyphenylene sulfide) or GF (glass fiber) added therein, and is connected with a screw (not shown) to the frame member 6405 described above to hold the liquid crystal panel 441 via the elastic member 6407 and a support frame 6409 together with the frame member 6405, and further supports the irradiation-side polarization plate 443 via the elastic member 6407 with a counter face to the face opposite to the frame member 6405, and the specific structure is the substantially same as that of the frame member 4406 described in the first embodiment. Namely this frame member 6406 has an opening 6406A (including a slant surface 6406A1), recesses 6406B, 6406F, rectifying sections (including columns 6406G1 and rectifying faces 6402G), and a connecting section 6406I substantially similar to the opening 4406A (including the slant surface 4406A1), recesses 4406B, 4406F formed on the edge face in the light beam irradiation side, rectifying sections 4406G (including the column 4406G1 and rectifying sections 4406G2), and connecting section 4406I respectively of the frame member 4406.

It is to be noted that the recess 6406F according to this embodiment has the same form as that of the recess 6405F in the frame member 6405 described above.

On an edge face of the frame member 6406 in the light beam incident side, a recess 6406C recessing toward the light beam irradiation side is formed as shown in FIG. 24B. This recess 6406C corresponds to a form of a third elastic member in the elastic member 6407 described above, and is formed with the first recess 6406C1 provided along a periphery of the opening section 6406A and having a substantially rectangular form when viewed from the top and the second recess 6406C2 positioned at the substantially central portion in the horizontal direction in the lower section and having a substantially circular form when viewed from the top side provided continuously. An edge face of the liquid crystal panels 441 in the light beam irradiation side is supported by the recesses 6406C via the third elastic member and the support frame 6409. Because the frame member 6406 supports the edge face of the liquid crystal panel 441 in the light beam irradiation side, the light beam incident side of the opening 6406A is sealed with the third elastic member, support frame 6409, and the edge face of the liquid crystal panel 441 in the light beam irradiation side.

Further formed at the substantially central portion in the horizontal direction in the upper section of the first recess 6406C1 is a cylindrical portion 6406E having a hole 6406E1 penetrating the recess 6406F provided in the upper side and the edge face in the light beam incident side and protruding from the edge face in the light beam incident side in the substantially perpendicular direction in correspondence to the insert hole 6405H of the frame member 6405 as shown in FIG. 24A and FIG. 24B.

Further formed at the substantially central portion of the second recess 6406C2 is an insert hole 6406H penetrating the recess 6406F provided in the lower side and the edge ace in the light beam irradiation side and enabling insertion of the cylindrical portion 6405E in the frame member 6405.

In the state in which the frame member 6405 and the frame member 6406 are assembled with each other, the cylindrical portion 6405E of the frame member 6405 is inserted into an insert hole 6406H of the frame member 6406 via an insert hole of the support frame 6409 described hereinafter and an insert hole of the third elastic member in the elastic member 6407 described hereinafter. Because of this configuration, the cooling fluid flowing into inside of the frame member 6405 via the inlet port 6405D is branched to the projection 6405E2 (See FIG. 28) of the cylindrical portion 6405E, and flows via a hole 6405E1 of the cylindrical portion 6405E and the insert hole 6406H to the light beam incident side of the frame member 6405 (cooling chamber R4) and also to the light beam irradiation side of the frame member 6406 (cooling chamber R5 described hereinafter (See FIG. 28)).

Further in the state where the frame member 6405 and the frame member 6406 is assembled with each other, the cylindrical portion 6406E in the frame member 6406 inserted into the insert hole 6405H of the frame member 6405 via an insert hole 441E1 of a flexible print board 441E in the liquid crystal panel 441 (See FIG. 22), an insert hole described later of the support frame 6409, and the insert hole of the second elastic member in the elastic member 6407 also described later. Because of this configuration, the cooling fluid can flow in the light beam incident side of the frame member 6405 (cooling chamber R4) and in the light beam irradiation side of the frame member 6406 (cooling chamber R5 described hereinafter (See FIG. 28)) via the hole 6401E1 of the cylindrical portion 6406E as well as via the insert hole 6405H.

An internal diameter of each of the cylindrical portions 6405E, 6406E is preferably in the range from 1 mm to 5 mm, and more preferably in the range from 2 mm to 3 mm. In this embodiment, the internal diameter cross section of the cylindrical portion 6405E is substantially the same as that of the cylindrical portion 6406E. Further internal diameters of the insert holes 6405H, 6406H are adjusted to that the cylindrical portions 6406E, 6405E can be engaged therein respectively.

The present invention is not limited to the configuration in which the internal diameter cross section of the cylindrical portion 6405E is substantially the same as that of the cylindrical portion 6406E, and also the configuration is allowable in which the internal diameter cross section of the cylindrical portion 6405E is different from that of the cylindrical portion 6406E.

In the frame member 6406, the three hooks 6406J like the hooks 6405J in the frame member 6405 for the polarization plate fixing member 6408B to be engaged in are formed in the left edge portion and in the right edge portion of the frame member 6406 respectively as shown in FIG. 24A and in FIG. 24B.

The polarization plate fixing member 6408B has a form similar to that of the polarization plate fixing member 6408A described above as shown in FIG. 22, and has an opening 6408B1 and a hook engaging section 6408B2 like the opening 6408A1 and the hook engaging section 6408A2.

When the light beam incident side of the opening 6406A in the frame member 6406 is closed with the liquid crystal panel 441 and also the irradiation-side polarization plate 443 is pressed and fixed to the recess 6406B of the frame member 6406 by the polarization plate fixing member 6408B via a fourth elastic member of the elastic member 6407 described hereinafter to seal the light beam irradiation side of the opening 6406A in the frame member 6406, a cooling chamber R5 capable of receiving a cooling fluid (See FIG. 28) is formed inside the frame member 6406 (inside the opening 6406A and in a clearance between the recess 6406B and the irradiation-side polarization plate 443).

Further in the frame member 6406, formed at the substantially central portion thereof in the upper side is an outlet port 6406D penetrating the upper side wall of the recess 6406F provided in the upper side and communicating to the cylindrical portion 6406E in the substantially perpendicular direction for feeding a cooling fluid inside the cooling chambers R4, R5 to the outside. This outlet port 6406D comprises a substantially cylindrical member having a smaller diameter as compared to that of the fluid circulating members 448 like the inlet port 6405D, and protrudes outward from the frame member 6406. Thus the cooling fluid flowing into the cooling chamber R4 via the inlet port 6405D and then flows into the cooling chamber the insert hole 6405H and the cylindrical portion 6406E and that flowing in via the inlet port 6405D, branched by the projection 6405E2 of the cylindrical portion 6405E, and then flowing into the cooling chamber R5 are fed out to the relay tank 5404 via the outlet port 6406D and the fluid circulating members 448.

In this embodiment, the internal diameter cross sections of the inlet port 6405D and the outlet port 6406D are the substantially same as those of the cylindrical sections 6405E, 6406E. With the configuration as described above, a flow path resistance against the cooling fluid inside the optical modulator holder 6402 can substantially be uniformed, so that a convention velocity of the cooling fluid can be raised.

The present invention is not limited to the configuration in which the internal diameter cross sections of the inlet port 6405D and outlet port 6406D are substantially identical to those of the cylindrical portions 6405E, 6406E, but the internal diameter cross sections of the inlet port 6405D and outlet port 6406D may be different from those of the cylindrical portions 6405E, 6406E.

Further in the frame member 6406, four positioning projections 6406L like the positioning projections 6405L in the frame member 6405 described above are formed in the light beam irradiation side of the internal side face of the opening 6406A as shown in FIG. 24.

Further formed on an edge face of the frame member 6406 in the light beam incident side, as shown in FIG. 24B, is a pressing section 6406M positioned above the cylindrical portion 6406E and protruding from the light beam incident side edge face in the substantially perpendicular direction. In the state in which the frame member 6405 and the frame member 6406 are assembled with each other, the pressing section 6406M is inserted into the insert hole 441E1 (See FIG. 22) of the flexible print board 441E in the liquid crystal panel 441 with the tip contacting a periphery of an insert hole on the support frame 6409 described hereinafter to press the support frame 6409 to the frame member 6405.

Further in the frame member 6406, formed at the upper edge portion and the lower edge portion of the edge face in the light beam incident side are two notches 6406N recessing toward the light beam irradiation side respectively in correspondence to projections of the support frame 6409 described hereinafter as shown in FIG. 24B. In the state where the frame member 6405 and frame member 6406 are assembled with each other, the projection of the support frame 6409 protrudes outward via the four notches 6406N.

The elastic member 6407 comprises, as shown in FIG. 22, a first elastic member 6407A provided between the incident-side polarization plate 442 and the frame member 6405, a second elastic member 6407B provided between the frame member 6405 and the liquid crystal panel 441, a third elastic member 6407C provided between the liquid crystal panel 441 and the frame member 6406, and a fourth elastic member 6407D provided between the frame member 6406 and the irradiation-side polarization plate 443.

Of these components, the first elastic member 6407A and the fourth elastic member 6407D have substantially rectangular frame-shaped forms substantially similar to that of the elastic member 4407 described in the first embodiment as shown in FIG. 22. Further in each of the first elastic member 6407A and fourth elastic member 6407D the edge faces opposing to a pair of the frame members 6405, 6406 are flat, while edge faces thereof opposing to the incident-side polarization plate 442 and irradiation-side polarization plate 443 are curved to provide a semicircular cross section. The first elastic member 6407A and the fourth elastic member 6407D are provided in the recesses 6405B and 6406B of the frame members 6405, 6406 respectively.

The second elastic member 6407B comprises an elastic member 6407B1 having a substantially rectangular frame-shaped form when viewed from the top and an elastic member 6407B2 positioned at the substantially central portion of the upper edge rim of the elastic member 6407B1 and having a substantially circular form when viewed from the top provided monolithically.

Of these components, in the inner peripheral section of the elastic member 6407B1, an elastic member 6407B4 having the thickness smaller as compared to that of the elastic member 6407B1 and also having a substantially circular cross section as shown in FIG. 22. In the elastic member 6407B1, an edge face thereof opposing to the liquid crystal panel 441 is flat, while an edge face thereof opposing to the frame member 6405 is curved with the cross section having a substantially semicircular form. The elastic members 6407B1, 6407B4 are provided in the recess 6405C1 of the frame member 6405 in opposition to the curved face of the elastic member 6407B1, so that the elastic members 6407B1, 6407B4 extend over the support frame 6409 and the liquid crystal panels 441.

Formed at a substantially central portion of the elastic member 6407B2 is an insert hole 6407B3 allowing insertion of the cylindrical portion 6405E of the frame member 6405. Also this elastic member 6407B2 has a substantially semicircular cross section like the elastic member 6407B1 described above. The curved face of this elastic member 6407B2 contacts the second recess 6405C2 of the frame member 6405, and the flat face thereof contacts the support frame 6409.

The third elastic member 6407C is formed with the elastic member 6407C1 having a substantially rectangular frame-shaped formed when viewed from the top and the elastic member 6407C2 positioned at the substantially central portion of the lower edge section of the elastic member 6407C1 provided monolithically.

Of these components, in the elastic member 6407C1, an elastic member 6407C4 having a substantially circular cross section and also having the thickness smaller than that of the elastic member 6407B1 is monolithically formed in the inner peripheral section. Further the elastic member 6407C1 has a flat edge face opposite to the liquid crystal panel 441 like the elastic member 6407B1, while the edge face opposite to the frame member 6406 is curved, and has a substantially semi-circular cross section. The elastic members 6407C1, 6407C4 are placed so that the first recess 6406C1 of the frame member 6406 faces against the curved face of the elastic member 6407C1, and span over the support frame 6409 and the liquid crystal panels 441.

Further formed at the substantially central portion of the elastic member 6407C2 is an insert hole 6407C3 allowing insertion of the cylindrical portion 6406E of the frame member 6406. Also this elastic member 6407C2 has a substantially semicircular cross section like the elastic member 6407C1 described above. This elastic member 6407C2 is provided so that the curved face contacts the second recess 6406C2 of the frame member 6406 and the flat face contacts the support frame 6409.

These elastic members 6407 seals the cooling chambers R4, R5 of the frame members 6405, 6406, prevent a cooling fluid from flowing out from spaces between the incident-side polarization plate 442 and the frame member 6405, between the frame member 6405 and the liquid crystal panel 441, between the liquid crystal panels 441 and the frame member 6406, and between the frame member 6406 and the irradiation-side polarization plate 443, and also prevent the cooling fluid from being leaked from the connecting sections between the cylindrical portions 6405E, 6406E and the insert holes 6406H, 6405H toward the liquid crystal panel 441.

The elastic members 6407 should preferably comprise a rubber member with the hardness Hs (as measured by the JIS spring method) in the range from 30 to 50. There is no specific restriction over the material, and for instance, such materials as silicon rubber, butyl rubber with low water-permeability, or fluorine rubber.

Figure 25:
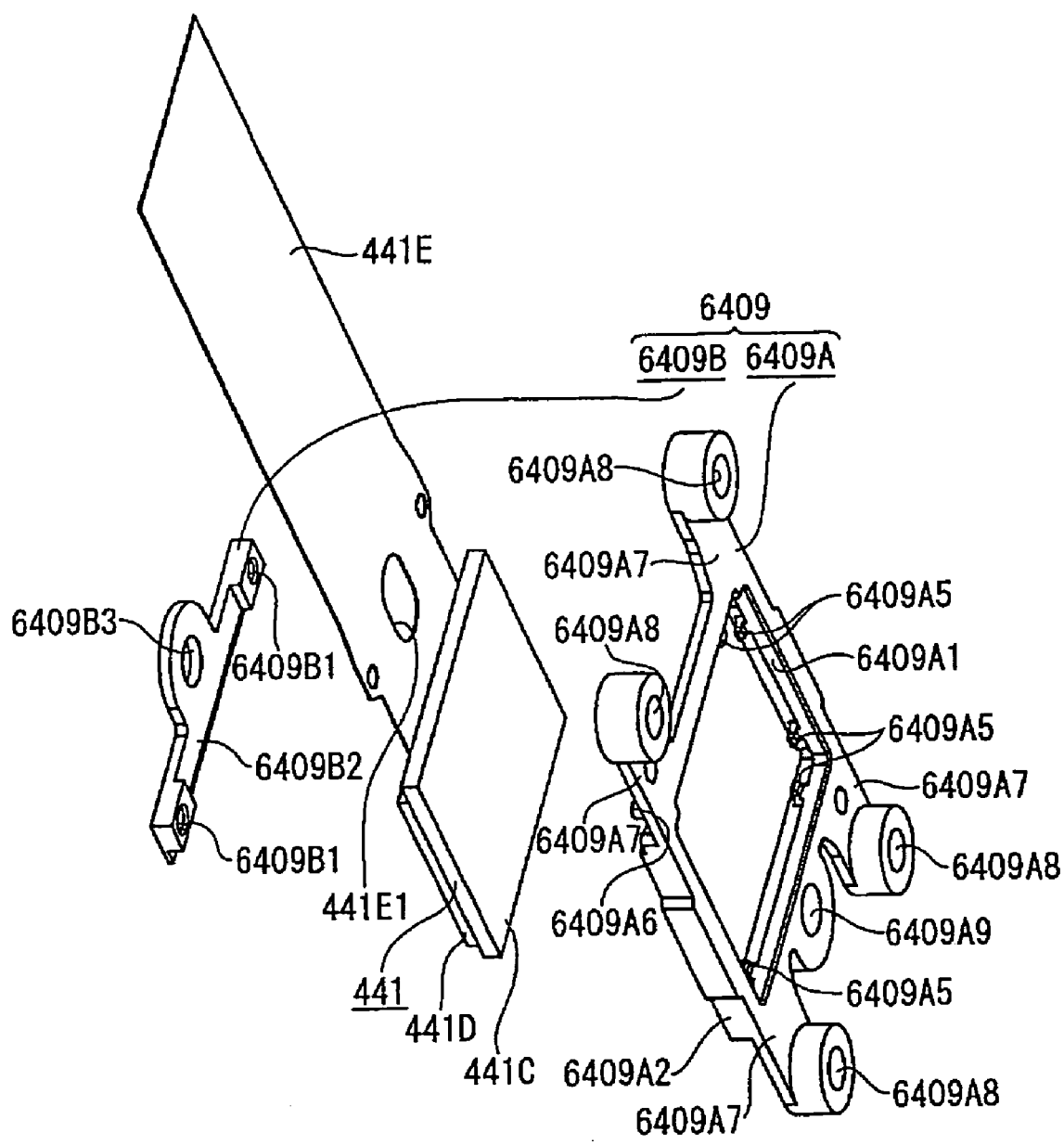
FIG. 25 is an exploded perspective view showing a general configuration of a supporting frame according to the fourth embodiment.

FIG. 25 is a developed perspective view showing the general configuration of the support frame 6409. More specifically, FIG. 25 is a developed perspective view showing the support frame 6409 viewed from the light beam irradiation side.

FIG. 26A, FIG. 26B, and FIG. 26C are views each showing the state in which the liquid crystal panel 441 is incorporated in the support frame 6409. More specifically, FIG. 26A is a view showing the support frame 6409 viewed from the light beam irradiation side. FIG. 26B is a cross-sectional view taken along the line G—G in FIG. 26A. FIG. 26C is a view showing the support frame 6409 viewed from the light beam incident side.

The support frame 6409 comprises an aluminum-made plate body having a substantially rectangular form when viewed from the top, supports the liquid crystal panel 441, and also positions the liquid crystal panels 441 at a pre-specified position against the illumination light axis A of a light beam irradiated from the light source 411. This support frame 6409 comprises a support frame body 6409A, and a support auxiliary section 6409B as shown in FIG. 25, FIG. 26A, FIG. 26B, and FIG. 26C.

The support flame body 6409A is a carrier for supporting the liquid crystal panel 441 and comprises a plate body having a rectangular form when viewed from the top side.

In this support frame body 6409A, formed at the substantially central portion thereof an opening 6409A1 having the substantially same external dimensions as those of the driving board 441C of the liquid crystal panels 441 as shown in FIG. 25, or in FIG. 26A, FIG. 26B, and FIG. 26C.

Further in the support frame body 6409A, formed on the light beam incident side edge face thereof is an expanding section 6409A2 expanding from a periphery of the opening 6409A1 toward the light beam incident side as shown in FIG. 25 or in FIG. 26C.

In this expanding section 6409A2, the upper side edge portion extends toward inside of the opening 6409A1, namely downward as shown in FIG. 26A or FIG. 26B. Because of this configuration, a step portion 6409A3 is formed in the upper side of the internal face of the opening 6409A1 as shown in FIG. 26A or in FIG. 26C. A bottom portion of this step portion 6409A3 two-dimensionally interferes an upper side edge section of the driving board 441C in the liquid crystal panel 441 as shown in FIG. 26A or in FIG. 26B when the liquid crystal panel 441 is incorporated in the support frame 6409. Namely, this step portion 6409A3 contacts an edge face of the driving board 441C in the light beam incident side and has the function for restricting a position of the liquid crystal panels 441 in a direction toward the outside.

As shown in FIG. 26A, on the internal side face of the opening 6409A1, formed in the base portion of the upper side edge portion in the expanding direction of the expanding section 6409A2 is a hole 6409A4 in correspondence to the width of the flexible print board 441E of the liquid crystal panels 441, and when the liquid crystal panel 441 is placed on the support frame 6409, the flexible print board 441E is inserted in this hole 6409A4.

Further formed on the internal side face of the opening 6509A1 are a plurality of projections 6409A5 each protruding toward inside of the opening 6409A1 in the side of the expanding section 6409A2 as shown in FIG. 25, FIG. 26B, or in FIG. 26C. In this embodiment, two projections 6409A5 are formed on each side edge portion of the internal side face respectively. It is to be noted that a number of the projections 6409A5 is not limited to that described above. These projections 6409A5 are provided so that a trajectory formed by linking the tip portions is an external positional reference surface for a counter board 441D of the liquid crystal panels 441, and has the function for restricting a position in a direction toward inside of the liquid crystal panel 441.

Further formed on the edge face of the support frame body 6409A in the light beam incident side are pins 6409A6 protruding toward the light beam incident side at positions near the right and left edge sections in the upper section of the expanding section 6409A2 respectively as shown in FIG. 25 or in FIG. 26C.

Further in the support frame body 6409A, formed at the upper edge corner portion and the lower edge corner portion are four projections 6409A7 extending upward and downward respectively and protruding horizontally from the side edge portions of a pair of frame members 6450, 6406 when the optical modulator holder 6402 is assembled as shown in FIG. 25 or in FIG. 26A, FIG. 26B, and FIG. 26C. Further at the tip portions of the projections 6407A7, attachment holes 6409A8 allowing passage of the pin-shaped members 4403A of the supporting member 4403 are formed as shown in FIG. 25 or in FIG. 26A, FIG. 26B, and in FIG. 26C.

In the support frame body 6409A, formed at the substantially central portion of the lower side edge section is an insert hole 6409A9 allowing insertion of the cylindrical portion 6406E of the frame member 6406 as shown in FIG. 25 or in FIG. 26A, FIG. 26B, and in FIG. 26C.

The support auxiliary section 6409B is attached to an upper side of the expanding section 6409A2 on an edge face of the support frame body 6409A in the light beam incident side, and assists the support frame body 6409A supporting the liquid crystal panel 441. This support auxiliary section 6409B has a form corresponding to an upper side edge portion of the light beam incident side edge face of the support frame body 6409A, and comprises a plate body extending right and left directions and also having a substantially rectangular form when viewed from the top.

Formed at the positions near the left and right edge sections of this support auxiliary section 6409B are engagement holes 6409B1 each penetrating the light beam incident side edge face and the light beam irradiation side edge face thereof and enabling engagement of the pin 6409A6 of the support frame body 6409A respectively as shown in FIG, 25 or in FIG. 26C.

Further in the support auxiliary section 6409B, formed at the substantially central portion of the edge face thereof in the light beam incident side in the horizontal direction is a recess 6409B2 having the width corresponding to the width of the flexible print board 441E of the liquid crystal panel 441 and recessing toward the light beam incident side as shown in FIG. 25.

Further in the support auxiliary section 6409B, formed at the substantially central portion in the upper side is an insert hole 6409B3 extending upward and allowing insertion of the cylindrical portion 6405E of the frame member 6405 as shown in FIG. 25 or in FIG. 26C.

Incorporation of the liquid crystal panels 441 in the support frame 6409 described above is performed as described below.

At first, the flexible print board 441E of the liquid crystal panels 441 is inserted into the opening 6409A1 from the light beam incident side of the support frame body 6409A, and the liquid crystal panels 441 is set in the opening 6409A1 so that the liquid crystal panel 441 protrudes to the outside of the support frame body 6409A from the opening 6409A1 via the hole 6409A4. In this step, the edge face of the driving board 441C in the light beam incident side contacts the step section 6409A3 to restrict a position of the liquid crystal panel 441 in a direction toward the outside, and also the external face of the counter board 441D contacts tips of the plurality of projections 6409A5 to restrict a position of the liquid crystal panel 441 in a direction toward the outside, thus the liquid crystal panel 441 being positioned against the support frame body 6409A.

The thickness of the support frame body 6409A at the position where the expanding section 6409A2 is formed is the substantially same as that of the liquid crystal panel 441 as shown in FIG. 26B. The dimension from the edge face in the light beam irradiation side to the bottom of the step section 6409A3 is designed to be the substantially same as the thickness of the driving board 441C of the liquid crystal panel 441 as shown in FIG. 26B. Because of this configuration, when the liquid crystal panels 441 is set on the support frame body 6409A, the edge face of the support frame body 6409A in the light beam irradiation side, the edge face of the expanding section 6409A2 in the light beam incident side, and the edge face of the liquid crystal panels 441 in the light beam irradiation side as well as in the light beam incident side are substantially on the same plain.

After the liquid crystal panels 441 is positioned on the support frame body 6409A, an adhesive with high extendability is filled in a clearance between the internal side face of the opening 6409A1 and an external peripheral surface of the driving board 441C and also in spaces formed by the plurality of projections 6409A5 in a clearance between the internal side face of the opening 6409A1 and the external peripheral surface of the counter board 441D. Because of this feature, the liquid crystal panel 441 is positioned against the support frame body 6409A in the fixed state, and also the cooling fluid from the clearances described above is prevented from flowing into inside of the liquid crystal panel 441.

The adhesive should preferably be prepared by using a material capable of blocking a cooling fluid from the clearances described above, and for instance an adhesive with urethane rubber mixed therein is preferable. Further when a UV ray-cured type or anaerobiotic material is used as a main component, the efficiency in the assembly work can be improved.

After the liquid crystal panels 441 is positioned against the support frame body 6409A in the fixed state, the support auxiliary section 6409B is attached to the upper side of the expanding section 6409A2 on the edge face of the support frame body 6409A in the light beam incident side.

More specifically, the support auxiliary section 6409B is set against the support frame body 6409A so that the pin 6409A6 of the support frame body 6409A is engaged in the engagement hole 6409B1 of the support auxiliary section 6409B. In this step, the flexible print board 441E of the liquid crystal panel 441 protruding via the hole 6409A4 of the support flame body 6409A is positioned in a space formed between the recess 6409B2 of the support auxiliary section 6409B and the edge face of the support frame body 6409A in the light beam incident side so that the support frame body 6409A can freely be engaged in or disengaged from the space.

An adhesive similar to that used for positioning the liquid crystal panel 441 against the support frame body 6409A is filled in a clearance between the support frame body 6409A and the support auxilrary section 6409B to fix the support auxiliary section 6409B against the support frame body 6409A.

The thickness of the support auxiliary section 6409B is substantially identical to the height of the expanding section 6409A2 in the support frame body 6409A in the expanding direction as shown in FIG. 26B. Because of this feature, in the state where the support auxiliary section 6409B is set in the support frame body 6409A, the edge face of the expanding section 6409A2 in the light beam incident side and the edge face of the support auxiliary section 6409B in the light beam incident side are substantially on the same plain.

When the support frame 6409 with the liquid crystal panel 441 is incorporated in a pair of frame members 6405, 6406, an insert hole 6409A9 of the support frame body 6409A and an insert hole 6409B3 of the support auxiliary section 6409B each play the function for positioning the support frame 6409 against the pair of the frame members 6405, 6406. Namely by inserting cylindrical portions 6405E, 6406E of the pair of frame members 6405, 6406 into the insert holes 6409A9, 6409B3 of the support frame 6409 respectively, the support frame 6409 is positioned against the pair of frame members 6405, 6406, namely the three liquid crystal panels 441 are positioned at prespecified positions on the frame members 6405, 6406. When the pair of frame members 6405, 6406 and the support frame 6409 are assembled with each other, openings of the first recesses 6405C1, 6406C1 in the pair of frame members 6405, 6406 are closed by the edge face of the support frame 6409 in the light beam incident side and the edge face of the counter board 441D of the three liquid crystal panels 441 in the light beam incident side, and by the edge face of the support frame 6409 in the light beam irradiation side and the edge face of the driving board 441C of the three liquid crystal panels 441 in the light beam irradiation side respectively, thus elastic body accommodating sections 6407E for accommodating therein the elastic member 6407B1 of the second elastic member 6407B and the elastic member 6407C1 of the third elastic member 6407C respectively being formed (Refer to FIG. 28).

The two cooling chamber dividing sections 6400 are provided, like the cooling chamber dividing section 4400 described in the third embodiment, in the cooling chambers R4, R5 respectively as shown in FIG. 22 for dividing each of the cooling chambers R4, R5 to the light beam incident side and light beam irradiation side respectively. Each of the cooling chamber dividing sections 6400 comprises a light-transmissible member having a substantially rectangular form when viewed from the top and also having a little smaller dimensions as compares to the openings 6405A, 6406A of the frame members 6405 and 6406, and is arranged, as shown in FIG. 22, between the incident-side polarization plate 442 and the frame member 6405 and between the frame member 6406 and the irradiation-side polarization plates 443. As the material for these cooling chamber dividing sections 6400, the same material as that used for the cooling chamber dividing section 4400 described in the third embodiment may be employed.

In these cooling chamber dividing sections 6400, in the vertical side edge section, a taper section 6400A having a slant surface 6400A1 beveled only at the corner section of the edge face opposing to the three liquid crystal panels 441 is formed as shown in FIG. 22. Namely, the vertical side edge section has a form with the cross section gradually becoming smaller toward the upper and lower directions due to the taper section 6400A.

The cooling chamber dividing sections 6400 contact the positioning projections 6405L, 6406L of the frame members 6405, 6406 respectively at the slant surface 6400A1 in the vertical side edge portion respectively when the optical modulator holder 6402 is assembled, and are positioned against the frame members 6405, 6406 respectively and are fixed to the frame members 6405, 6406, for instance, with an adhesive respectively.

As described above, when each of the cooling chamber dividing sections 6400 is provided in the cooling chamber R4, like in the third embodiment described above, the buffer section Bf2 for temporarily accumulating a cooling fluid therein is formed with the edge face of the incident-side polarizaton plate 442 in the light beam irradiation side, recess 6405F, rectifying section 6405G, and the vertical side edge section of the cooling chamber dividing section 6400 at a position not two-dimensionally interfering the optical modulation face of the three liquid crystal panels 441. Also in the cooling chamber R5, the buffer section Bf2 is formed with the edge face of the irradiation-side polarization plate 443 in the light beam incident side, recess 6406F, rectifying section 6406G and the vertical side edge section of the cooling chamber dividing section 6400 at a position not two-dimensionally interfering the optical modulation face of the three liquid crystal panels 441

Figure 28:
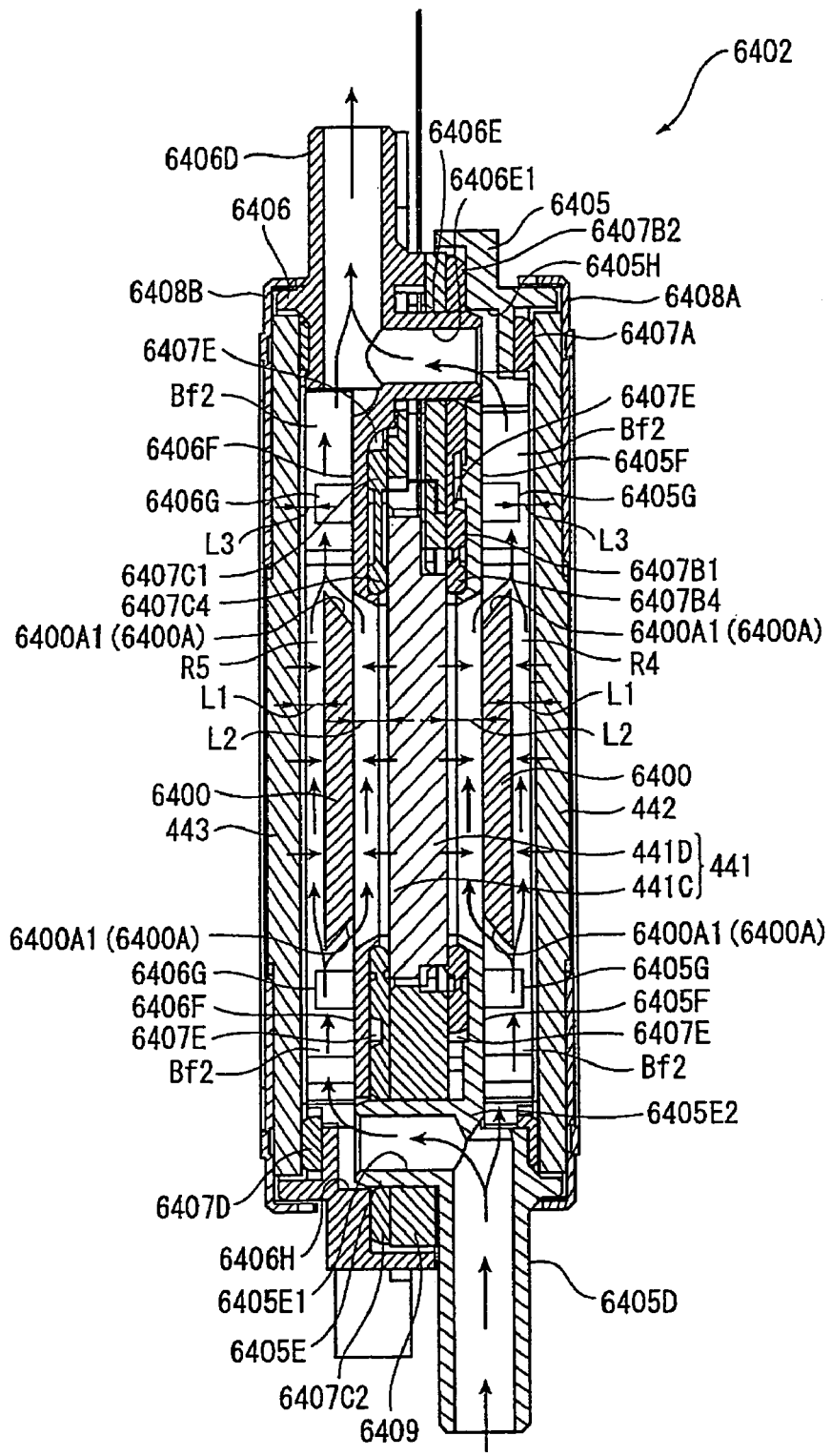
FIG. 28 is a view illustrating a cooling construction of the liquid crystal panel incident-side polarization plate, and irradiation-side polarization plate according to the fourth embodiment.

In this embodiment, in the state where the cooling chamber dividing sections 6400 are set in the cooling chamber R4, the distance L2 between the liquid crystal panel 441 and the cooling chamber dividing sections 6400 (Refer to FIG. 28) is larger than the distance L1 between the incident-side polarization plate 442 and the cooling chamber dividing section 6400 (Refer to FIG. 28).

Also in the case of the cooling chamber dividing sections 6400 set in the cooling chamber R5, the distance L2 between the liquid crystal panel 441 and the cooling chamber dividing sections 6400 (Refer to FIG. 28) is larger than the distance L1 between the irradiation-side polarization plate 443 and the cooling chamber dividing section 6400 (Refer to FIG. 28) as described above.

The distance L1 should preferably be in the range from 0.3 mm to 1.0 mm and in this embodiment the distance L1 is 0.7 mm. The distance L2 should preferably be in the range from 1.0 mm to 2.0 mm, and in this embodiment the distance L2 is 1.4 mm.

Further in this embodiment, the distance L3 between each of the rectifying sections 6405G, 6406G and the incident-side polarization plates 442 and the distance L3 between each of the rectifying sections 6405G, 6406G and the irradiation-side polarization plate 443 (Refer to FIG. 28) is smaller than the distance L1. In this embodiment, the distance L3 is 0.4 mm.

Next cooling mechanisms for the liquid crystal panel 441, incident-side polarization plates 442, and irradiation-size polarization plate 443 are described below.

Figure 27:
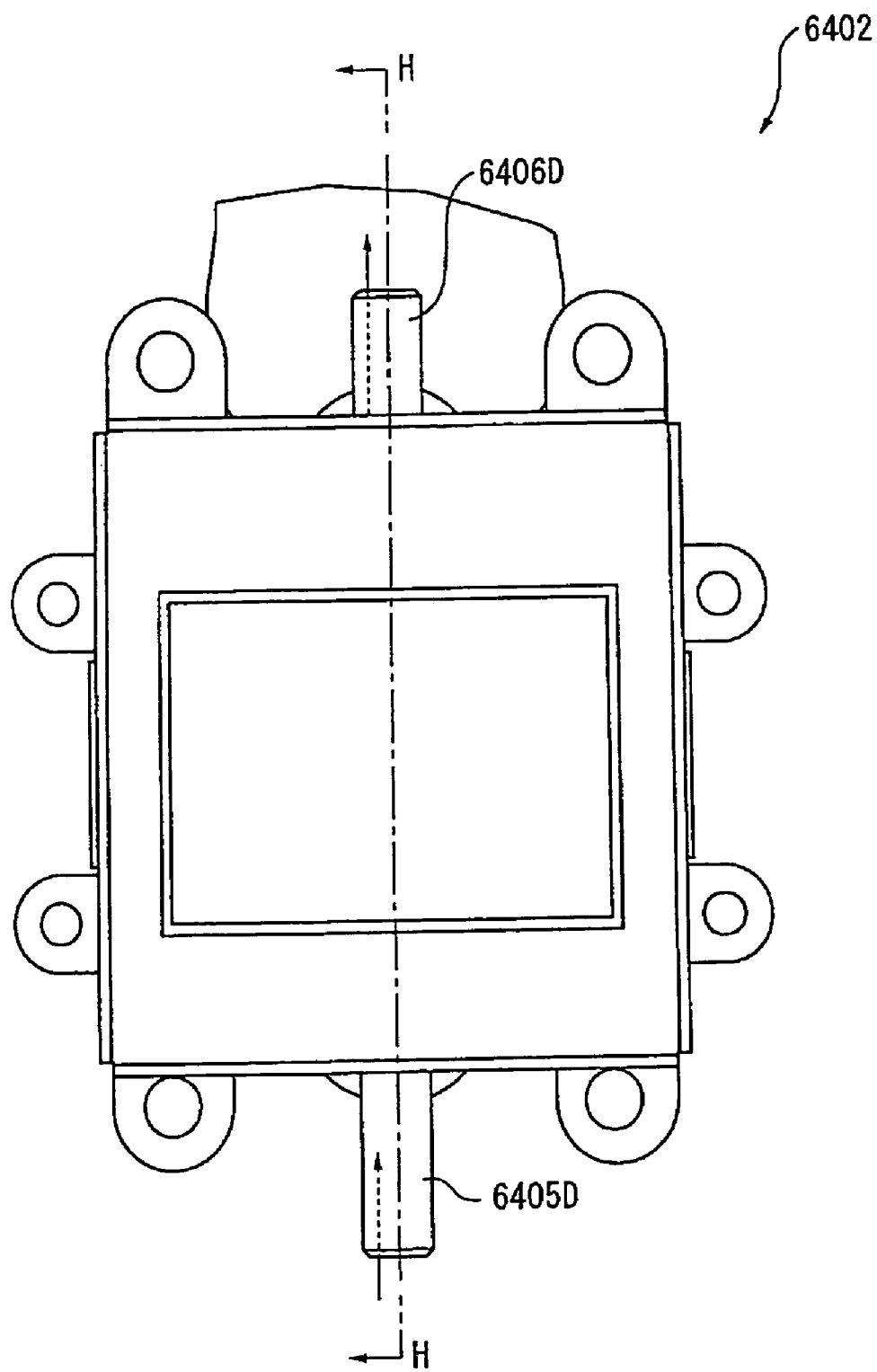
FIG. 27 is a view illustrating a cooling construction of the liquid crystal panel, an incident-side polarization plate, and an irradiation-side polarization plate according to the fourth embodiment.

FIG. 27 and FIG. 28 are views for illustrating the cooling mechanisms for the liquid crystal panel 441, incident-side polarization plate 442, and irradiation-side polarization plate 443. More specifically, FIG. 27 is a view showing the optical modulator holder 6402 viewed from the light beam incident side. FIG. 28 is a cross-sectional view taken along he line H—H in FIG. 27.

When the fluid press-feeding section 446 runs, the cooling fluid inside the main tank 445 is press-fed via the fluid press-feeding section 446 to the fluid branching section 4401 and is branched by the fluid branching section 4401, and then flows via the inlet ports 6405D of the optical modulator holders 6402 to inside of the optical modulator holders 6402.

The cooling fluid flowing into inside of the optical modulator holder 6402 is branched by the projection 6405E2 of the cylindrical portion 6405E as shown in FIG. 28, and flows into the buffer section Bf2 of the cooling chamber R4 as well as into the buffer section Bf2 of the cooling chamber R5. Namely the cooling fluid flows, when flowing into each buffer section Bf2, from the face opposing to each of the frame members 6405, 6406 in the direction perpendicular to the optical modulation face of the liquid crystal panel 441 toward the incident-side polarization plate 442 or toward the irradiation-side polarization plate 443.

The cooling fluid flowing into each buffer section Bf2 is once accumulated in each buffer section Bf2, and then is rectified by the rectifying sections 6405G, 6406G to a direction parallel to the optical modulation face of the liquid crystal panel 441, and then by the slant surface 6400A1 formed in the lower side edge portion of the cooling chamber dividing section 6400 to the light beam incident side as well as to the light beam irradiation side, and circulates along the edge face of the cooling chamber dividing section 6400 in the light beam incident side and the edge face thereof in the light beam irradiation side.

The heat generated by the light beam irradiated from the light source 411 in the liquid crystal panel 441, incident-side polarization plate 442, and irradiation-size polarization plate 443 is delivered to the cooling fluid in the cooling chambers R4, R5.

The heat delivered to the cooling fluid in the cooling chamber R5 moves upward in FIG. 28 in association with a flow of the cooling fluid as shown in FIG. 28, and is guided by the side wall of the recess 6406F (Refer to FIG. 24A) in the upper side in the frame member 6406 and the rectifying section 6406G in the upper side to the substantially central portion in the horizontal direction, and then moves via the outlet port 6406D to outside of the cooling chamber R5.

On the other hand, the heat delivered to the cooling fluid in the cooling chamber R4 moves upward in FIG. 28 in association with a flow of the cooling fluid as shown in FIG. 28. Further the heat having moved upward is guided to the substantially central portion in the horizontal direction by the side wall of the upper side recess 6405F in the frame member 6405 (Refer to FIG. 23B) and the rectifying section 6405G in the upper side. The heat having been guided to the substantially central portion in the horizontal direction moves, in association with a flow of the cooling fluid as shown in FIG. 28, into inside of the cooling chamber R5 via the insert hole 6405H and the hole 6406E1 of the cylindrical section 6406E, and then to outside of the cooling chamber R5 via the outlet port 6406D.

The heat having moved from the cooling chambers R4, R5 via the outlet port 6406D to outside of the optical modulator holder 6402 moves, in association with a flow of the cooling fluid, to the relay tank 6404 and then to the radiator 447, and is radiated by the radiator 447 like in the first embodiment.

The cooling fluid cooled by the radiator 447 moves from the radiator 447 to the main tank 445, and then to the fluid press-feeding section 446 and to the fluid branching section 4401, and again moves to the cooling chambers R4 and R5.

Cooling air flows being drive by the sirocco fan 31 of the cooling unit 3 flows over an external face of the optical modulator holder 6402 as well as into a space between the optical modulator holder 6402 and the supporting members 4403 like in the first embodiment, and flows from the bottom to the top. During this step, the cooling air flows cooling the edge face of the liquid crystal panel 441 in the light beam incident side and the edge face of the irradiation-side polarization plate 443 in the light beam irradiation side.

In the fourth embodiment described above, different from the first embodiment, the cooling chambers R4 and R5 are directly communicated to each other with the hole 6405E1 and insert hole 6406H of the cylindrical section 6405E as well as with the hole 6406E1 and the insert hole 6405H of the cylindrical section 6406E, so that the cooling fluid in the cooling chambers R4 and R5 can be maintained at a substantially unformed temperature, namely a temperature of the liquid crystal panel 441 in the light beam incident side and that in the light beam irradiation side can be uniformed.

In the state where the cooling chambers R4 and R5 are directly communicated to each other as described above, when the cooling fluid flows into each buffer section Bf2 of the optical modulator holder 6402, the cooling fluid flows from the faces perpendicular to the optical modulation face of the liquid crystal panel 441 and opposing to the frame members 6405, 6406 toward the incident-side polarization plate 442 or toward the irradiation-side polarization plate 443. With the configuration as described above, a flow rate of the cooling fluid once flowing into each buffer section Bf2 and branched in the cooling chamber dividing section 6400 and flowing toward the incident-side polarization plate 442 as well as toward the irradiation-size polarization plate 443 increases. Therefore, a flow rate of the cooling fluid flowing toward the liquid crystal panel 441 decreases, and as a result, the convention speed of the cooling fluid contacting the liquid crystal panel 441 becomes slower, so that a temperature different between the liquid crystal panel 441 and the cooling fluid can hardly be maintained.

In this embodiment, as the taper section 6400A in the cooling chamber dividing section 6400 has the slant surface 6400A1 in the side of the liquid crystal panel 441, it is possible to guide a larger quantity of cooling fluid once accumulated in each buffer section Bf2 by the slant surface 6400A1 of the cooling chamber dividing section 6400 toward the liquid crystal panel 441. Because of this configuration, a flow rate of the cooling fluid flowing toward the liquid crystal panel 441 can be maintained at a prespecified level, so that a temperature difference between the liquid crystal panel 441 and the cooling fluid can be maintained for efficiently cooling the liquid crystal panel 441 with the cooling fluid.

Further in the state where the cooling chamber dividing sections 6400 are arranged in the cooling, chambers R4, R5 respectively, the distance L2 between the liquid crystal panel 441 and each cooling chamber dividing section 6400 is lager as compared to the distance L1 between the incident-side polarization plates 442 and the cooling chamber dividing section 6400 set in the cooling chamber R4 as well as to the distance L1 between the irradiation-size polarization plate 443 and the cooling chamber dividing sections 6400 set in the cooling chamber R5. Because of this configuration, it is possible to once accumulate a cooling fluid in each buffer section Bf2 and then rectify a larger quantity of cooling fluid toward the liquid crystal panel 441. Because of this feature, a flow rate of the cooling fluid flowing toward the liquid crystal panel 441 can easily be maintained at a prespecified level, so that a temperature difference between the liquid crystal panel 441 and the cooling fluid can be maintained in good conditions with he liquid crystal panel 441 cooled with the cooling fluid more efficiently.

Further the respective distances L1 between the incident-side polarization plate 442 and irradiation-side polarization plate 443 emitting heat more against the liquid crystal panel 441 and each cooling chamber dividing section 6400 is smaller than the distance L2 described above, so that a volume of each cooling fluid layer contacting the incident-side polarization plate 442 or the irradiation-size polarization plate 443 can be made smaller as compared to that contacting the liquid crystal panel 441. Because of this feature, a quantity of each cooling fluid layer with the volume expanding by absorbing heat from the incident-side polarization plate 442 or from the irradiation-side polarization plate 443 decreases, so that fluctuation of an optical image due to volume expansion of the cooling fluid can be suppressed, and the optical image formed with the liquid crystal panel 441 can be maintained in good conditions.

Further by making smaller each distance L1 described above, the circulation speed of each cooling fluid layer contacting the incident-side polarization plate 442 or irradiation-size polarization plate 443 can be raised, so that the incident-side polarization plates 442 and the irradiation-size polarization plates 443 can efficiently be cooled. Because of this feature, generation of optical distortion due to heat can be suppressed in the incident-side polarization plate 442 as well as in the irradiation-side polarization plate 443, so that generation of color heterogeneity in an optical image due to the optical distortion can effectively be suppressed.

Further the respective distances L3 between rectifying sections 6405G, 6406G and the incident-side polarization plates 442 or the irradiation-side polarization plates 443 are smaller than the distance L1 described above. Because of this feature, it is possible to temporarily stop flow of the cooling fluid flowing into each buffer Bf2 with the rectifying sections 6405G and 6406G provided at nearer positions to the holes 6405E1 and the insert holes 6406H of the cylindrical section 6405E of the cylindrical section 6405E than to the lower edge sections of the cooling chamber dividing sections 6400. Because of this feature, the flow velocity of the cooling fluid at various positions in the cooling chambers R4, R5 can more effectively be unformed by the cooling chamber dividing sections 6400 and the rectifying sections 6405G, 6406G.

In this embodiment, the distance L1 described above is set to 0.7 mm and the distance L2 to 1.4 mm and the distance L3 to 0.4 mm respectively, and therefore as described hereinafter, an image quality of an optical image can effectively improved with temperatures of the liquid crystal panel 441 and irradiation-side polarization plate 443 lowered also effectively.

More specifically, a 0.7-inch liquid crystal panel was used as the liquid crystal panel 441, and the distance L1 and distance L2 were set to specific values for visually checking the state of the stripe-like images included in and color heterogeneity of an optical image. Further a temperature of the liquid crystal panel 441 and that of the irradiation-side polarization plates 443 were measured.

In Example 1, the distance L1 was set to 0.9 mm and the distance L2 to 1.2 mm.

In Example 2, the distance L1 was set to 0.7 mm, and the distance L2 was set to 1.4 mm.

A result of the experiment is as shown in Table 1 below. In Table 1, Δ indicates a good image quality, or the state in which the temperature could be lowered. # indicates a better image quality, or the state in which the temperature could further be lowered.

TABLE 1

|  | Distance L1 (mm) | Distance L2 (mm) | Stripe-like image | Color heterogeneity | Tem. of LCP* | Tem. of IRSPP** |
|---|---|---|---|---|---|---|
| Example 1 | 0.9 | 1.2 | Δ | Δ | Δ | Δ |
| Example 2 | 0.7 | 1.4 | # | # | Δ | # |

*Liquid crystal panel
*Irradiation-side polarization plate

In Example 1, as shown in Table 1, generation of a stripe-like image included in an optical image could be suppressed, and further color heterogeneity could be suppressed. Further temperature of the liquid crystal panel 441 and that of the irradiation-size polarization plate 443 could be lowered.

In Example 2, as shown in Table 1, generation of stripe-like images included in an optical image could further be suppressed as compared to Example 1, and color heterogeneity of an optical image could further be suppressed. The temperature of the liquid crystal panel 441 was the same as that in Example 1, but the temperature of the irradiation-side polarization plate 443 was lower as compared to that in Example 1.

As described above, it could be ascertained that, by setting the distance L1 to 0.7 mm and the distance L2 to 1.4 mm, a quality of an optical image could be improved and a temperature of the irradiation-size polarization plates 443 could effectively be lowered.

Further each of the frame members 6405, 6406 comprises a molded product prepared by molding a resin material, and the rectifying sections 6405G, 6406G are integrated with the recesses 6405F, 6406F respectively. Because of this feature, different from the configuration in which he rectifying sections 6405G, 6406G are separated from the frame members 6405, 6406 respectively, the work for setting the rectifying sections 6405G, 6405G can be eliminated, and the work for assembling the optical modulator holder 6402 can easily be carried out.

Fifth Embodiment

Next, a fifth embodiment of the present invention is described with reference to the related drawings.

In the following descriptions, the same reference numerals are assigned to the same structures and components as those in the fourth embodiment described above, and the detailed description thereof is omitted herefrom.

Figure 29A:
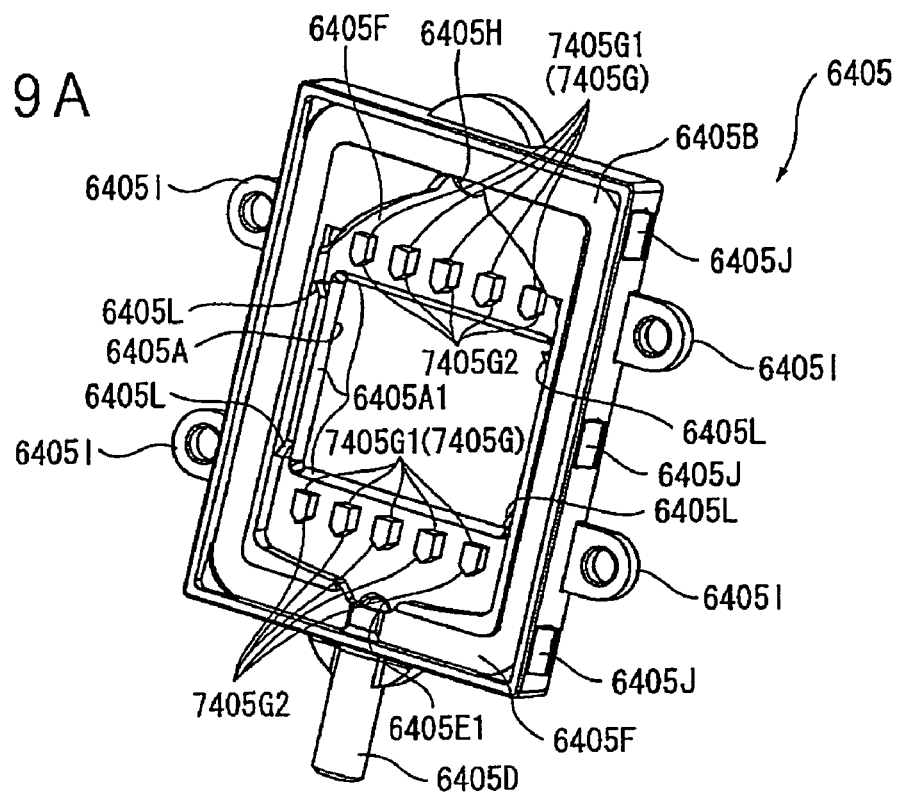
FIG. 29A and FIG. 29B are views each showing a form of rectifying sections according to a fifth embodiment.
Figure 29B:
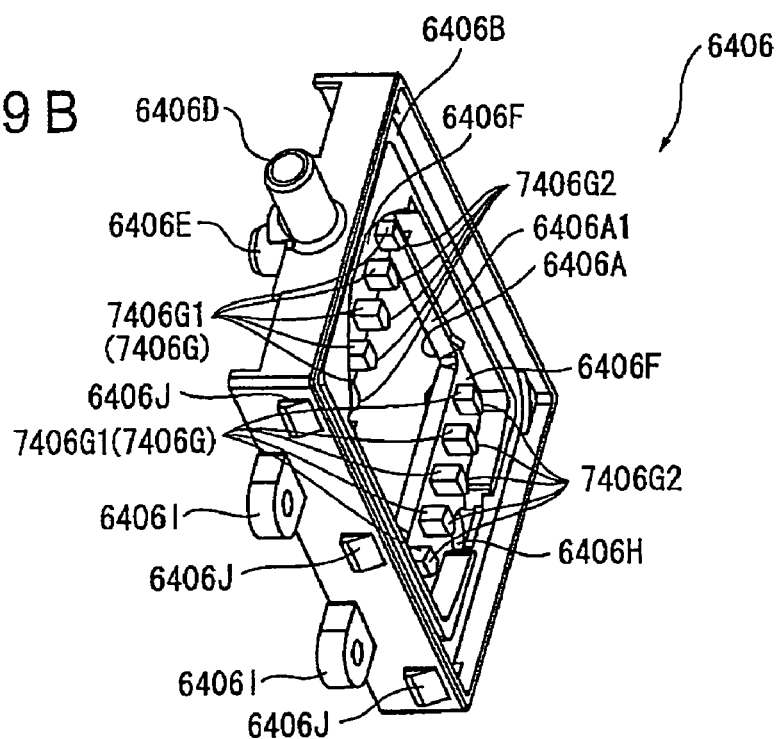
Figure 30:
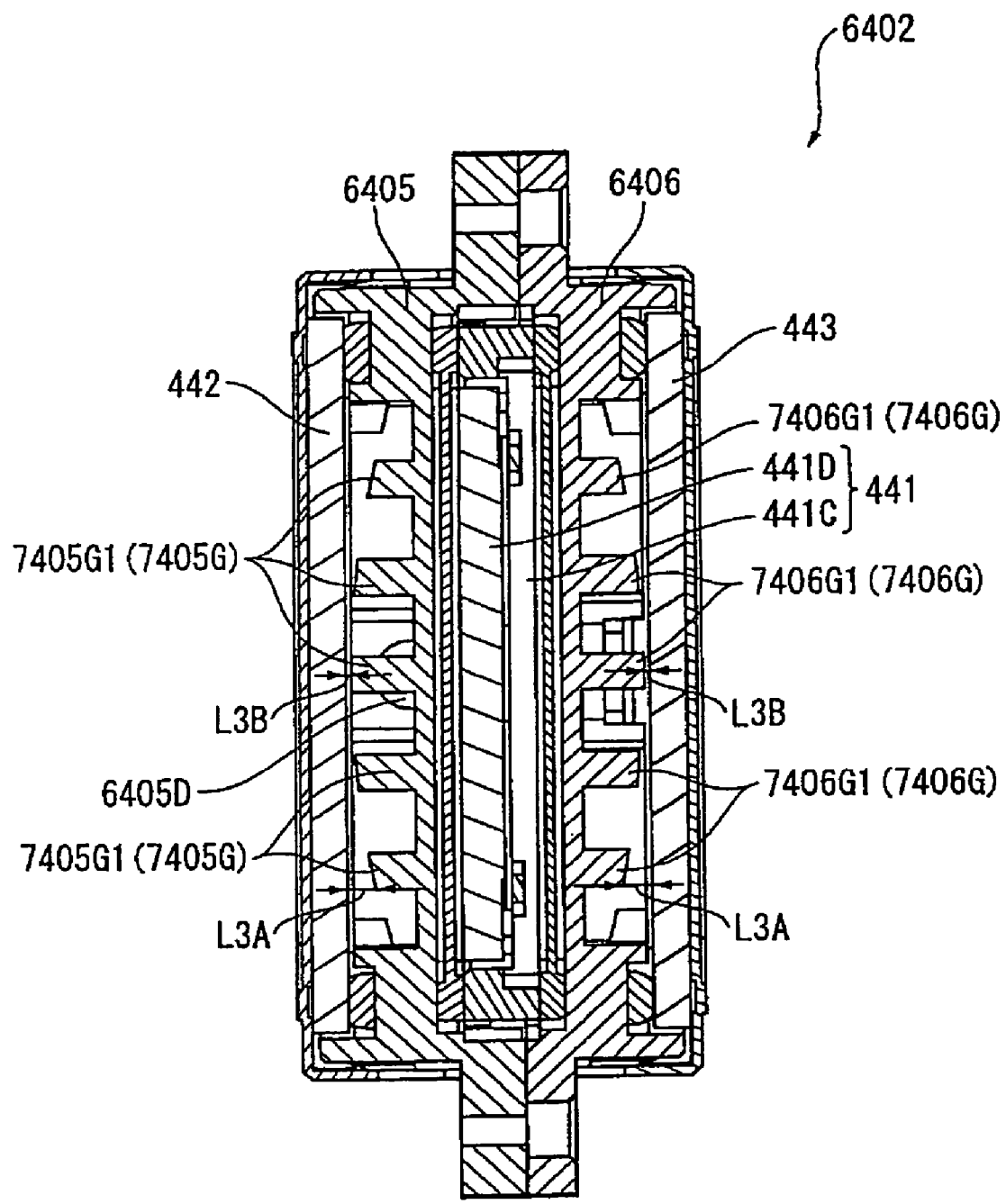
FIG. 30 is a view showing a form of the rectifying sections in the fifth embodiment.

FIG. 29A, FIG. 29B and FIG. 30 are views each showing a form of rectifying sections 7405G, 7406G according to the fifth embodiment. Specifically, FIG. 29A is a perspective view of a frame member 6405 viewed from the light beam incident side according to the fifth embodiment. FIG. 29B is a perspective view of a frame member 6406 viewed from the light beam irradiation side according to the fifth embodiment. FIG. 30 is a longitudinal sectional view illustrating an optical modulator holder 6402 in the position of the rectifying sections 7405G, 7406G according to the fifth embodiment.

The present embodiment differs from the fourth embodiment described above, as shown in FIG. 29A, FIG. 29B and FIG. 30, only in the forms of the rectifying sections 7405G, 7406G in the frame members 6405, 6406. The construction in the present embodiment other than that of the reciting sections 7405G, 7406G is the same as that in the fourth embodiment.

The rectifying sections 7405G, 7406G are, as shown in FIGS. 29A and 29B, provided to stand out respectively from the bottom of each recess 6405F located on the upper side and the lower side, and from the bottom of each recess 6406F located on the upper side and the lower side to rectify a cooling fluid flowing therein via an inlet port 6405D in a direction parallel to an optical modulation face of a liquid crystal panel 441.

Each rectifying section 7405G comprises, as shown in FIG. 29A, five columns 7405G1 each having a plan-viewed substantially square pole-like shape. The five columns 7405G1 are, as shown in FIG. 29A, arranged in parallel so that facing side faces thereof are along the flow-in direction of cooling fluid flowing therein via the inlet port 6405D, namely, the direction from the lower end toward the upper end of the frame member 6405 as well as in the direction perpendicular to the flow-in direction with a prespecified distance.

In the five columns 7405G1, the side face of the inlet port 6405D side (the lower end side in the frame member 6405) protrudes, as shown in FIG. 29A, toward the lower end side in the frame member 6405, and has a rectifying face 7405G2 for rectifying the cooling liquid flowing therein via the inlet port 6405D in the direction parallel to the optical modulation face of the liquid crystal panel 441.

Further, in the five columns 7405G1, the height dimension in the direction standing out from the recess 6405F is provided, as shown in FIG. 30, in a position facing to the inlet port 6405D, namely, it is formed to have the highest dimension at the column 7405G1 located in the center among the five columns 7405G1. In addition, the height dimension in the light axis direction in each column 7405G1 is formed to gradually become smaller as farther away from the column 7405G1 located in the center among the five columns 7405G1 described above. Namely, the five columns 7405G1 are formed, as shown in FIG. 30, to have a substantially arc-like trajectory when connecting the edge face of an incident-side polarization plate 442.

Also, the rectifying section 7406G has, as shown in FIGS. 29B and 30, the similar arrangement and form to that of the rectifying section 7405G described above, and has a column 7406G1 and a rectifying face 7406G2, similar to the column 7405G1 and the rectifying face 7405G2 in the rectifying section 7405G, respectively.

In this embodiment, the rectifying sections 7405G, 7406G are formed, like the rectifying sections 6405G, 6406G described in the fourth embodiment, to have the distance L3 (In FIG. 30) between each column 7405G1, 7406G1, and the incident-side polarization plate 442 and the irradiation-side polarization plate 443, smaller than the distance L1 (In FIG. 28) between each cooling chamber dividing section 6400, and the incident-side polarization plate 442 and the irradiation-side polarization plate 443. Namely, the rectifying sections 7405G, 7406G are formed to have the distance L3A (In FIG. 30) between the columns 7405G1, 7406G1 located in the right and left edge side and having the smallest height dimension among the five columns 7405G1, 740601, and the incident-side polarization plate 442 and the irradiation-side polarization plate 443, smaller than the distance L1.

It is to be noted that the height dimension in the direction standing out from each recess 6405F, 6406F in the rectifying sections 7405G, 7406G is not limited to the dimension described above, so long as the distance L3B (In FIG. 30) between the columns 7405G1, 7406G1 located in the center and having the largest height dimension among the five columns 7405G1, 7406G1, and the incident-side polarization plate 442 and the irradiation-side polarization plate 443 is smaller than the distance L1.

In the fifth embodiment described above, compared to the fourth embodiment, each rectifying section 7405G, 7406G has an arrangement and form as described above, so that, after the cooling fluid is temporally accumulated in each buffer section Bf2, the cooling fluid can be guided toward the side of the right and left edges in the rectifying sections 7405G, 7406G, which makes it possible to effectively rectify the flow direction in a direction parallel to the optical modulation face of the liquid crystal panel 441 with a simple construction. Because of this feature, a flow velocity of the cooling fluid can be uniformed further effectively in each position inside the cooling chambers R4, R5.

Additionally, each rectifying section 7405G, 7406G has a construction having rectifying faces 7405G2, 7406G2 respectively, so that the flow direction can be rectified effectively and the flow velocity of the cooling fluid can be uniformed further effectively owing to the setting of each height dimension of the five columns 7405G1, 7406G1 as well as the direction parallel to the optical modulation face of the liquid crystal panel 441.

Sixth Embodiment

Next, a sixth embodiment of the present invention is described with reference to the related drawings.

In the following descriptions, the same reference numerals are assigned to the same structures and components as those in the fourth embodiment described above, and the detailed description thereof is omitted herefrom.

Figure 31A:
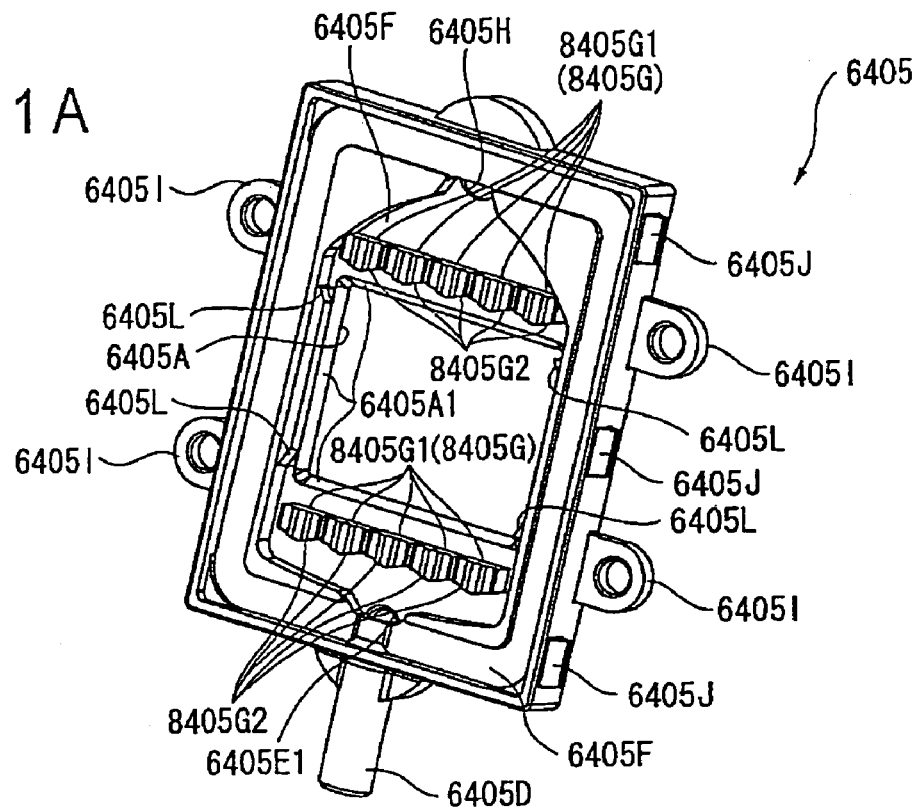
FIG. 31A and FIG. 31B are views each showing a form of rectifying sections according to a sixth embodiment.
Figure 31B:
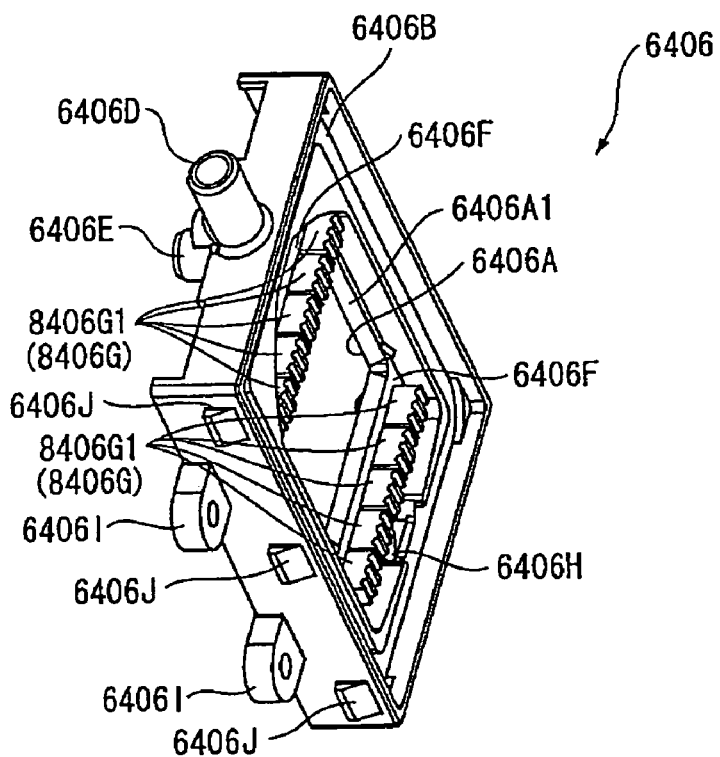
Figure 32:
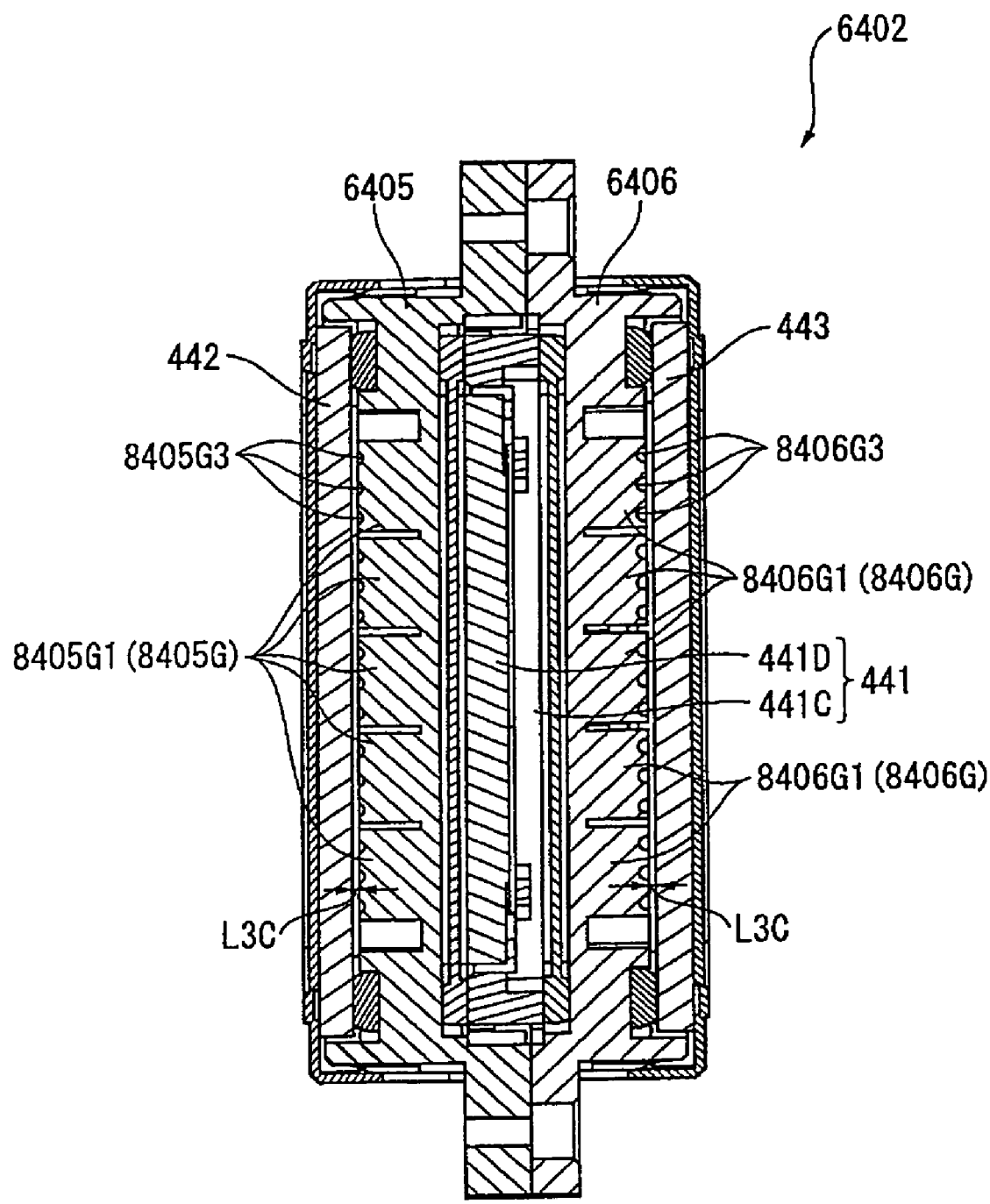
FIG. 32 is a view showing a form of the rectifying sections according to the sixth embodiment.

FIG. 31A, FIG. 31B and FIG. 32 are views each showing a form of rectifying sections 8405G, 8406G according to the sixth embodiment. Specifically, FIG. 31A is a perspective view of a frame member 6405 viewed from the light beam incident side according to the sixth embodiment. FIG. 31B is a perspective view of a frame member 6406 viewed from the light beam irradiation side according to the sixth embodiment. FIG. 32 is a longitudinal sectional view illustrating an optical modulator holder 6402 in the position of the rectifying sections 8405G, 8406G according to the sixth embodiment.

The present embodiment, like the fifth embodiment, differs from the fourth embodiment described above, as shown in FIG. 31A, FIG. 31B and FIG. 32, only in the forms of the rectifying sections 8405G, 8406G in the frame members 6405, 6406. The construction in the present embodiment other than that of the rectifying sections 8405G, 8406G is the same as that in the fourth embodiment.

The rectifying sections 8405G, 8406G are, as shown in FIG. 31, provided to stand out from the bottom of each recess 6405F located on the upper side and the lower side, and from the bottom of each recess 6406F located on the upper side and the lower side to rectify a cooling fluid flowing therein via an inlet port 6405D in a direction parallel to an optical modulation face of a liquid crystal panel 441.

Each rectifying section 8405G comprises, as shown in FIG. 31A, five columns 8405G1 each having a plan-viewed substantially square pole-like shape. The five columns 8405G1 are, as shown in FIG. 31A or 32A, are arranged in parallel so that each column is in close vicinity to each other in the flow-in direction of the cooling fluid flowing therein via the inlet port 6405D, namely, the direction from the lower end toward the upper end of the frame member 6405.

In the five columns 8405G1, the side face of the inlet port 6405D side (the lower end side in the frame member 6405) protrudes, as shown in FIG. 31A, like the column 7405G1 described in the fifth embodiment, toward the lower end side in the frame member 6405, and has a rectifying face 8405G2 for rectifying the cooling liquid flowing therein via the inlet port 6405D in the direction parallel to the optical modulation face of the liquid crystal panel 441.

Further, in the five columns 8405G1, each height dimension in the direction standing out from the recess 6405F is, as shown in FIG. 32, formed to be the same.

Moreover, in the five columns 8405G1, as shown in FIG. 32, a plurality of grooves 8405G3 (three grooves 8405G3 in the present embodiment) are formed on an edge face of the incident-side polarization plate 442 along the flow-in direction. It is to be noted that in FIG. 32, the reference numeral is assigned only to the grooves 8405G3 of one column 8405G1.

Also, the rectifying section 8406G has, as shown in FIGS. 31B and 32, a similar arrangement and form to that of the rectifying section 8405G described above, and has a column 8406G1, a rectifying face (not shown), and grooves 8406G3, similar to the column 8405G1, the rectifying face 8405G2, and grooves 8405G3 in the rectifying section 8405G, respectively.

In this embodiment, the rectifying sections 8405G, 8406G are formed, like the rectifying sections 6405G, 6406G described in the fourth embodiment, to have the distance L3C (in FIG. 32) between the rectifying sections 8405G, 8406G, and the incident-side polarization plate 442 and the irradiation-side polarization plate 443, smaller than the distance L1 (in FIG. 28) between each cooling chamber dividing section 6400, and the incident-side polarization plate 442 and the irradiation-side polarization plate 443. In the present embodiment, the distance L3C is, like that in the fourth embodiment, set to be 0.4 mm.

In the sixth embodiment described above, compared to the fourth embodiment, each rectifying section 8405G, 8406G has an arrangement and form as described above, so that a cooling fluid flowing into the buffer section Bf2 can temporally be blocked by each rectifying section 8405G, 8406G positioned nearer to a hole 6405E1 and a insert hole 6406H of a tubular section 6405 as compared to the lower end section of each cooling chamber dividing section 6400. Further, the grooves 8405G3, 8406G3 are formed on each edge face on the side of the incident-side polarization plate 442 and of the irradiation-side polarization plate 443 of each rectifying section 8405G, 8406G, so that the cooling fluid temporally blocked can be circulated via each groove 8405G3, 8406G3, which makes it possible to effectively carry out a uniformed flow velocity in the direction parallel to the optical modulation face of the liquid crystal panel 441.

Seventh Embodiment

Next, a seventh embodiment of the present invention is described with reference to the related drawings.

In the following descriptions, the same reference numerals are assigned to the same structures and components as those in the fourth embodiment described above, and the detailed description thereof is omitted or simplified herein.

FIG. 33 is an exploded perspective view showing a general configuration of an optical modulator holder 7402 according to the seventh embodiment.

The present embodiment modifies, as compared to the fourth embodiment, as shown in FIG. 33, each form of the two cooling chamber dividing sections 7400. In addition, along with the modification of these cooling chambers dividing sections 7400, the form of frame members 7405, 7406 are also modified. The construction of the optical modulator holder 7402 other than that of the two cooling chamber dividing sections 7400 and the frame members 7405, 7406, and the construction of other components other than that of the optical modulator holder 7402 are the same as those in the fourth embodiment.

Figure 34A:
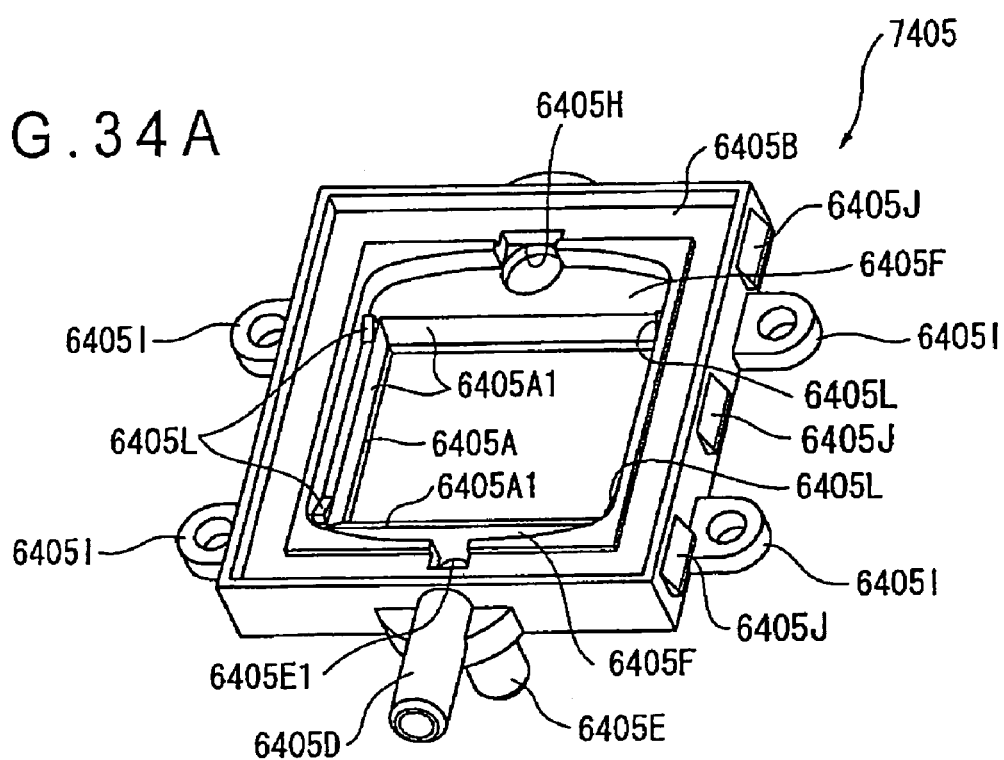
FIG. 34A and FIG. 34B are views each showing a construction of a frame member according to the seventh embodiment.
Figure 34B:
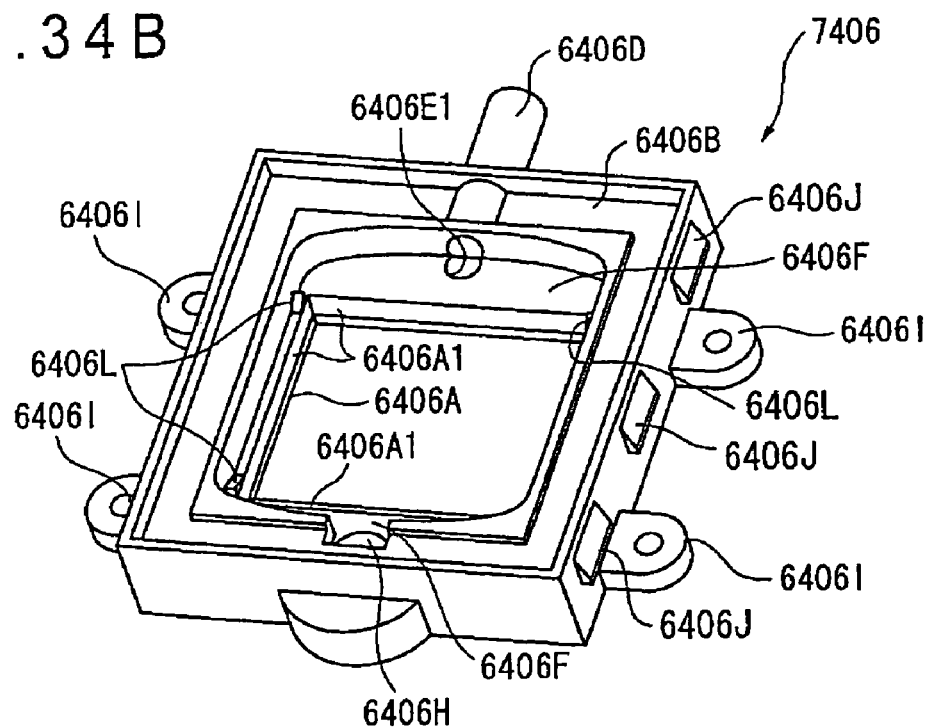

FIGS. 34A and 34B are views each showing a construction of frame members 7405, 7406. FIG. 34A is a perspective view of the frame member 7405 viewed from the light beam incident side. FIG. 34B is a perspective view of the frame member 7406 viewed from the light beam irradiation side.

The frame members 7405, 7406 have, as shown in FIG. 34A and FIG. 34B, a construction similar to that of the frame members 6405, 6406 described in the fourth embodiment respectively, and differs from the latter only in that the rectifying sections 6405G, 6406G are omitted. The construction except this one is similar to that of the frame members 6405, 6406 described in the fourth embodiment.

Figure 35A:
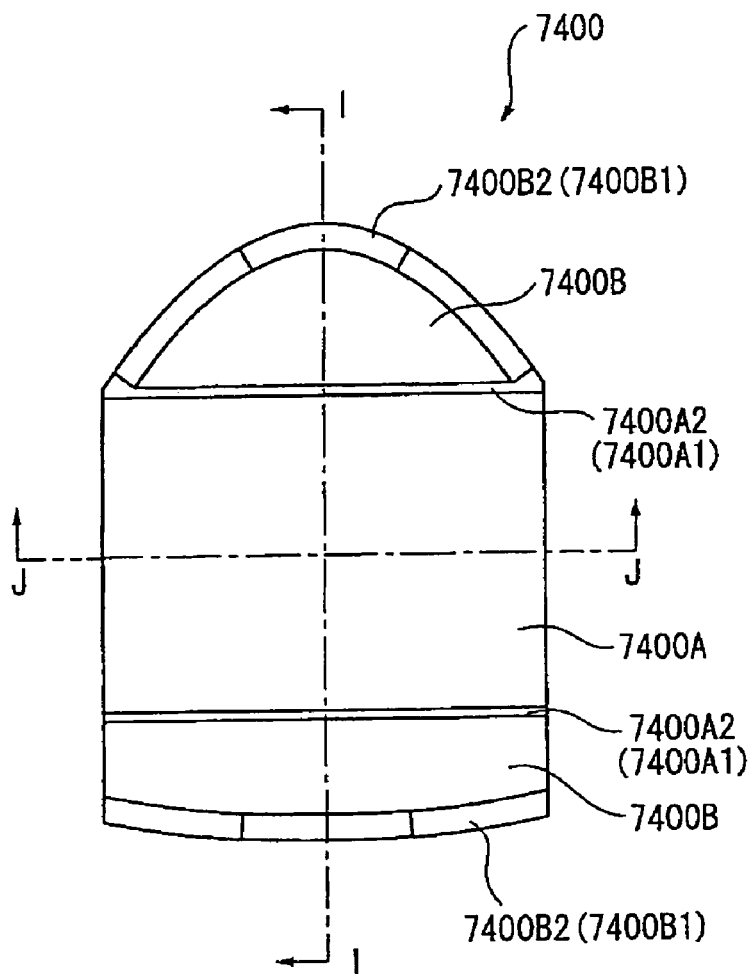
FIGS. 35A, 35B and 35C are views each showing a construction of a cooling chamber dividing section according to the seventh embodiment.
Figure 35B:
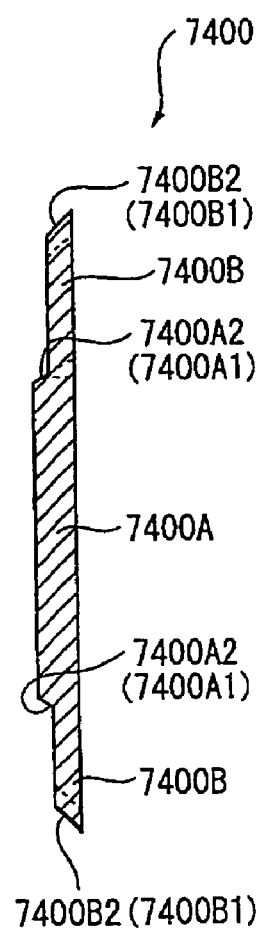
Figure 35C:
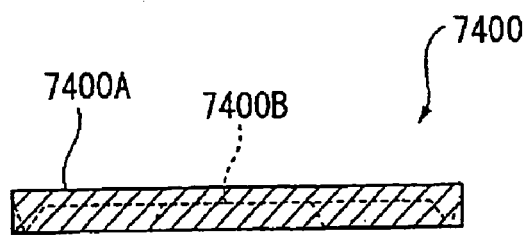

FIGS. 35A, 35B and 35C are views each showing a construction of a cooling chamber dividing section 7400. Specifically, FIG. 35A is a view showing the cooling chamber dividing section 7400 provided in the light beam incident side of the liquid crystal panel 441 and viewed from the light beam irradiation side. FIG. 35B is a cross-sectional view of FIG. 35A taken along the line I—I. FIG. 35C is a cross-sectional view of FIG. 35A taken along the line J—J.

It is to be noted that the two cooling chamber dividing sections 7400 have a similar form to each other, and only the cooling chamber dividing section 7400 provided in the light beam incident side of the liquid crystal panel 441 is described hereinafter.

The cooling chamber dividing section 7400 comprises, as shown in FIG. 35A, FIG. 35B and FIG. 35C, a molded product monolithically formed therein a dividing section body 7400A and an extending section 7400B. It is to be noted that the cooling chamber dividing section 7400 may employ the material similar to that of the cooling chamber dividing sections 4400, 6400 described in the third embodiment and the fourth embodiment, respectively.

The dividing section body 7400A has a form substantially similar to that of the cooling chamber dividing section 6400 described in the fourth embodiment, and is a portion facing against the liquid crystal pane 441 when placed inside a cooling chamber R4. The dividing section body 7400A is, as shown in FIG. 35A, FIG. 35B and FIG. 35C, provided with a taper portion 7400A1 having a slant surface 7400A2 at the vertical-side edge sections thereof with only a corner section in the edge face side facing against the liquid crystal pane 441 chamfered. Namely, the vertical-side edge sections have a form in which a cross-sectional area thereof becomes reduced by the taper portion 7400A1 as getting closer to upward and downward.

The extending sections 7400B extend, as shown in FIG. 35A, FIG. 35B and FIG. 35C, from the slant surface 7400A2 of the dividing section body 7400A in the perpendicular direction, and are portions facing against a recess 6405F of the frame member 7405 when placed inside the cooling chamber R4.

In this extending section 7400B, each extending direction edge section is, as shown in FIG. 35A, FIG. 35B and FIG. 35C, like the dividing section body 7400A, provided with a taper portion 7400B1 having a slant surface 7400B2 with only a corner section in the edge face side facing against the liquid crystal pane 441 chamfered. Namely, the extending section 7400B also have, like the dividing section body 7400A, a form in which a cross-sectional area thereof becomes reduced by the taper portion. 7400B1 as getting closer to upward and downward.

Further, in the extending section 7400B, each extending direction edge section has, as shown in FIG. 35A, FIG. 35B and FIG. 35C, a convex-curved form vertically protruding a substantially center portion in a perpendicular direction (a portion facing against the outlet port 6406D or the inlet port 6405D). It is to be noted that, in this embodiment, the form of the recess 6405F on the upper side is different from that of the recess 6405F on the lower side, so that the form of the extending section 7400B on the upper side is formed to be different from that of the extending section 7400B on the lower side, however, the form of the extending sections is not limited to this configuration, and any problem will not occur when the extending sections have the same form.

The cooling chamber dividing section 7400 has, as shown in FIG. 35B, the light beam incident side edge face of the dividing section body 7400A is substantially on the same plane with the light beam incident side edge face of the extending section 7400B, and the light beam incident side edge face has a planar form. Additionally, the cooling chamber dividing section 7400 has, as shown in FIG. 35B, the thickness of the dividing section body 7400A larger than that of the extending section 7400B, and has a form in which a portion thereof facing against the liquid crystal panel 441 bulges on the side of the liquid crystal panel 441.

Figure 36:
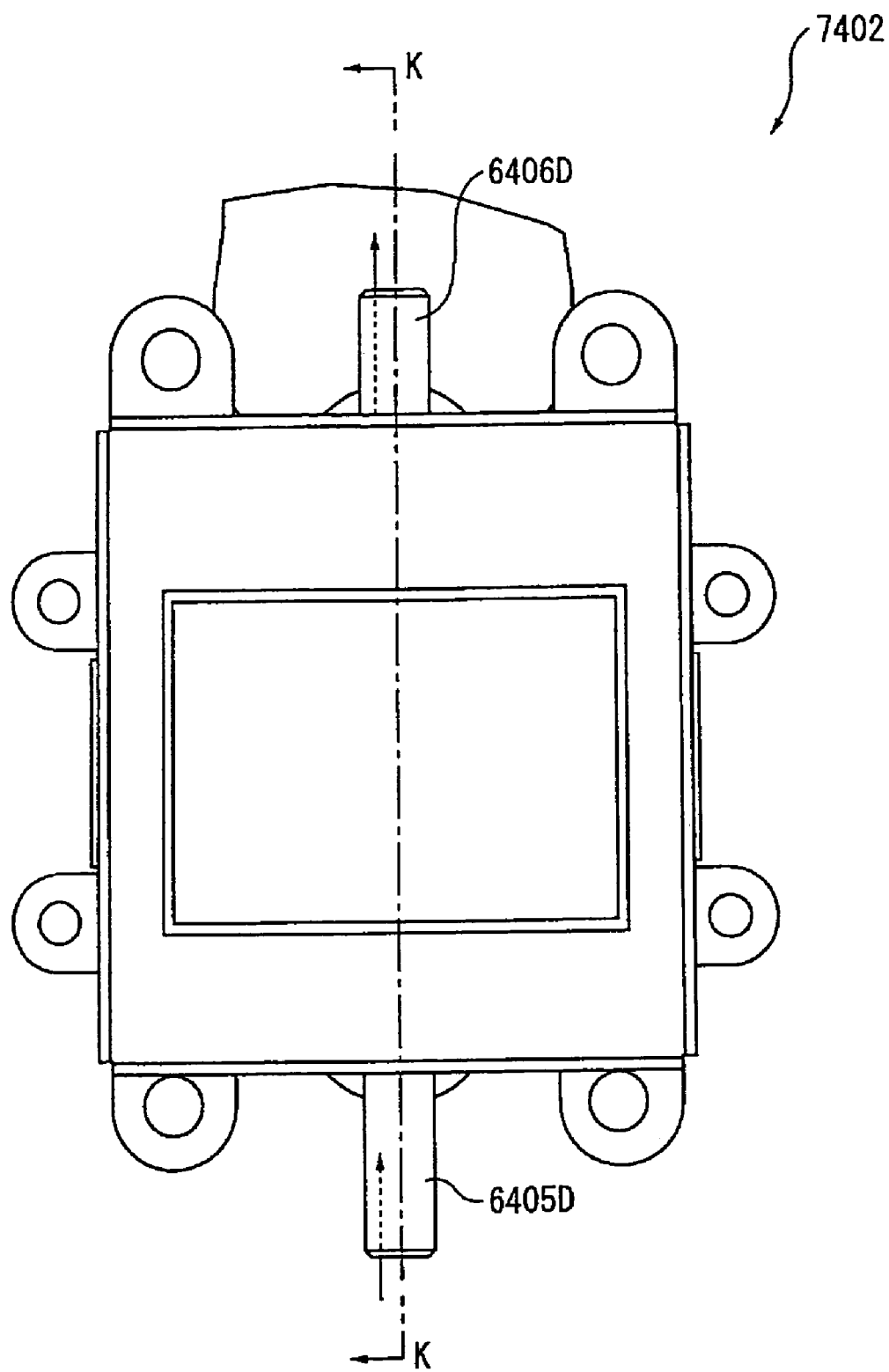
FIG. 36 is a view illustrating a state of the cooling chamber dividing sections arranged inside cooling chambers respectively according to the seventh embodiment.
Figure 37:
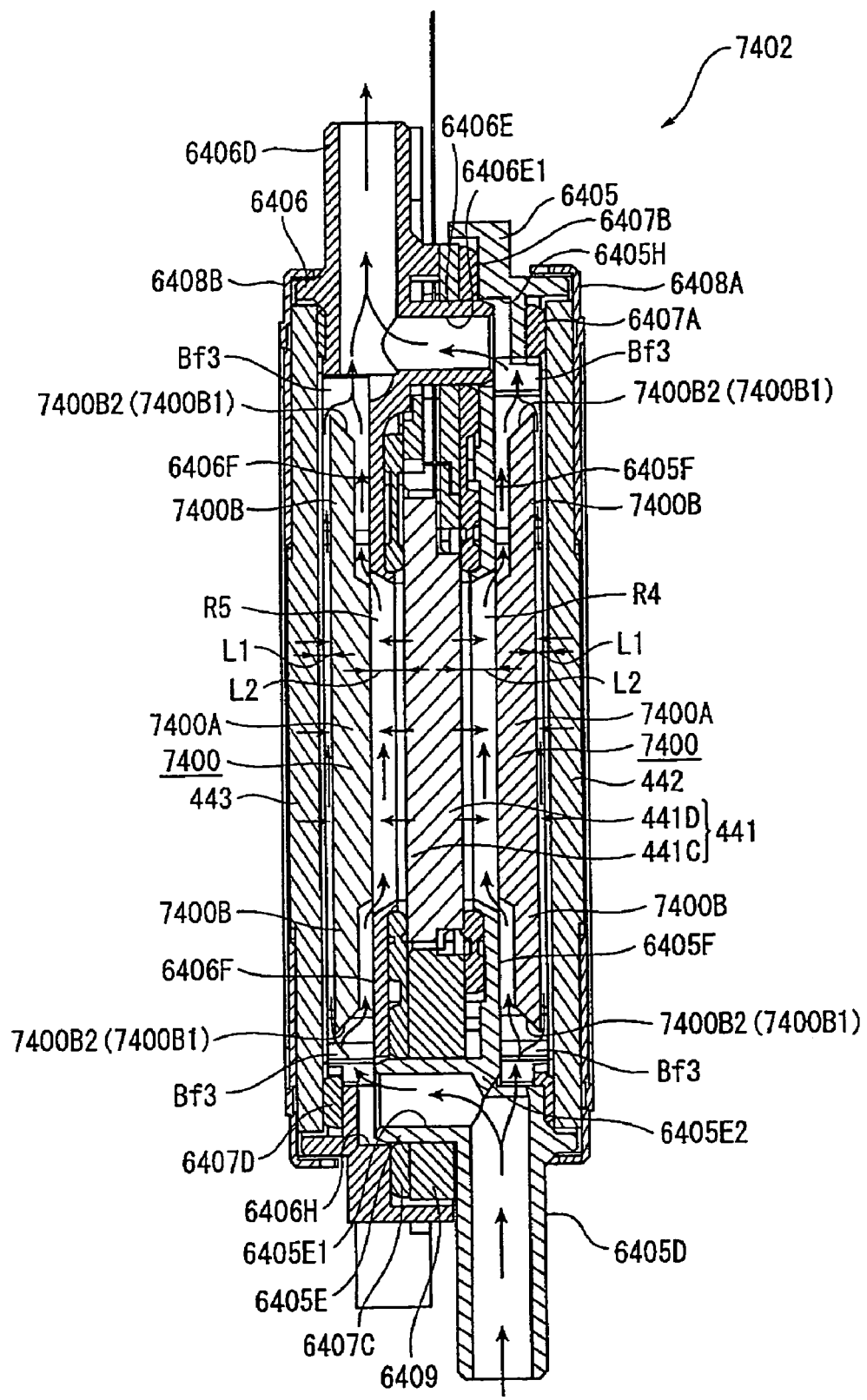
FIG. 37 is a view illustrating a state of the cooling chamber dividing sections arranged inside the cooling chambers respectively according to the seventh embodiment.

FIG. 36 and FIG. 37 are views showing a state of the cooling chamber dividing sections 7400 arranged inside the cooling chambers R4, R5, respectively. Specifically, FIG. 36 is an illustration of the optical modulator holder 7402 viewed from the light beam irradiation side. FIG. 37 is a cross-sectional view of FIG. 36 taken along the line K—K.

When the cooling chamber dividing sections 7400 are placed in the cooling chambers R4, R5, like the fourth embodiment, slant surfaces 7400A2 in the vertical-side edge sections of the dividing section body 7400A is contacted with positioning projections 6405L, 6406L of the frame members 7405, 7406 respectively, so that each cooling chamber dividing section 7400 is positioned onto the frame members 7405, 7406 respectively, and each cooling chamber dividing section 7400 is fixed onto the frame members 7405, 7406 with, for instance, an adhesive or the like.

In the state where the cooling chamber dividing section 7400 is placed in the cooling chamber R4, as shown in FIG. 37, a buffer section Bf3 capable of temporarily accumulating a cooling fluid is formed by a light beam irradiation side edge face of an incident-side polarization plate 442, a recess 6405F, and the taper section 7400B1 of the extending section 7400B in the cooling chamber dividing section 7400, in a position where buffer section Bf3 does not interfere with an optical modulation face of the liquid crystal panel 441 two-dimensionally. Similarly, within the cooling chamber R5, a buffer section Bf3 capable of temporarily accumulating a cooling fluid is formed by a light beam irradiation side edge face of the incident-side polarization plate 443, a recess 6406F, and the taper section 7400B1 of the extending section 7400B in the cooling chamber dividing section 7400, in a position where buffer section Bf3 does not interfere with an optical modulation face of the liquid crystal panel 441 two-dimensionally.

It is to be noted that, in the present embodiment, like the fourth embodiment, in a state where the cooling chamber dividing section 7400 is placed in the cooling chamber R4, the distance L2 (In FIG. 37) between the liquid crystal panel 441 and the dividing section body 7400A in the cooling chamber dividing section 7400 is set to be larger than the distance L1 (In FIG. 37) between the cooling chamber dividing sections 7400, and the incident-side polarization plate 442 and the irradiation-side polarization plate 443. Herein the distance L1 is preferably 0.3 mm–1.0 mm, and in this embodiment, like the fourth embodiment, it is set be 0.7 mm. In the meantime, the distance L2 is preferably 1.0 mm–2.0 mm, and in this embodiment, like the fourth embodiment, it is set to be 1.4 mm.

In the seventh embodiment described above, as compared to the fourth embodiment, the rectifying sections 6405G, 6406G are omitted and each cooling chamber dividing section 7400 is formed to extend so that it interferes with recesses 6405F, 6406F two-dimensionally. A buffer section Bf3 is formed by the incident-side polarization plate 442 (the irradiation-side polarization plate 443), the recess 6405F (the recess 6406F), and the taper section 7400B1 of the cooling chamber dividing section 7400. The extending section 7400B comprising the cooling chamber dividing section 7400 has a convex-curved form vertically protruding a substantially center portion in a perpendicular direction of the extending direction edge section having the taper section 7400B1. Because of this feature, after a cooling fluid flowing therein via an inlet port 6405D is temporally accumulated in the buffer section Bf3, the cooling fluid can be rectified, thanks to the convex-curved form of the extending direction edge section in the extending section 7400B, in the direction parallel (lateral) to the optical modulation face of the liquid crystal panel 441. Because of this feature, the cooling fluid can be rectified in the directions both parallel and orthogonal to the liquid crystal panel 441 with the taper section 7400B1 of the extending section 7400B and the convex-curved form. Thus, even in a configuration in which the rectifying sections 6405G, 6406G are omitted, the cooling chamber dividing section 7400 enables a uniformed flow velocity of the cooling fluid in each position inside the cooling chambers R4, R5, allowing an optical image formed in the liquid crystal panel 441 to be maintained in good condition. Additionally, by enabling the uniformed flow velocity of the cooling fluid in each position inside the cooling rooms R4, R5, the in-plane temperature of the liquid crystal panel 441 can also be uniformed, preventing local overheat thereof to form a clear optical image in the liquid crystal panel 441. Further, the rectifying sections 6405G, 6406G can be omitted so that the construction of the frame members 7405, 7406 can be simplified, thereby facilitating a manufacture of the frame members 7405, 7406.

Meanwhile, in a case where the cooling chamber dividing section 7400 has the extending section 7400B, when the cooling chamber dividing section 7400 is placed inside the cooling rooms R4, R5, the distance L2 between the dividing section body 7400A in the cooling chamber dividing section 7400 and the liquid crystal panel 441 is likely to be needlessly larger than the distance L1 between the cooling chamber dividing section 7400, and the incident-side polarization plate 442 and the irradiation-side polarization plate 443. When the distance L2 is needlessly large as just described, after the cooling fluid is temporarily accumulated in the buffer section Bf3, it is difficult to control a circulation velocity of the cooling fluid flowing toward the liquid crystal panel 441 at a desired rate, and to maintain a temperature difference between the liquid crystal panel 441 and the cooling fluid.

In the present embodiment, the dividing section body 7400A has a thickness larger than that of the extending section 7400B, and has a form in which the dividing section body 7400A bulges toward the liquid crystal panel 441, so that the distance L2 between the dividing section body 7400A and the liquid crystal panel 441, and the distance L1 between the cooling chamber dividing section 7400 and, incident-side polarization plate 442 and the irradiation-side polarization plate 443 can be set to a prespecified dimension. Because of this feature, a circulation velocity of the cooling fluid flowing toward the side of the liquid crystal panel 441 can be controlled at a desired rate, and a temperature difference between the liquid crystal panel 441 and the cooling fluid can be maintained in good condition.

Eighth Embodiment

An eighth embodiment of the present invention is described below with reference to the related drawings.

In the following descriptions, the same reference numerals are assigned to the same structures and components as those in the seventh embodiment, and detailed description thereof is omitted or simplified herein.

Figure 38A:
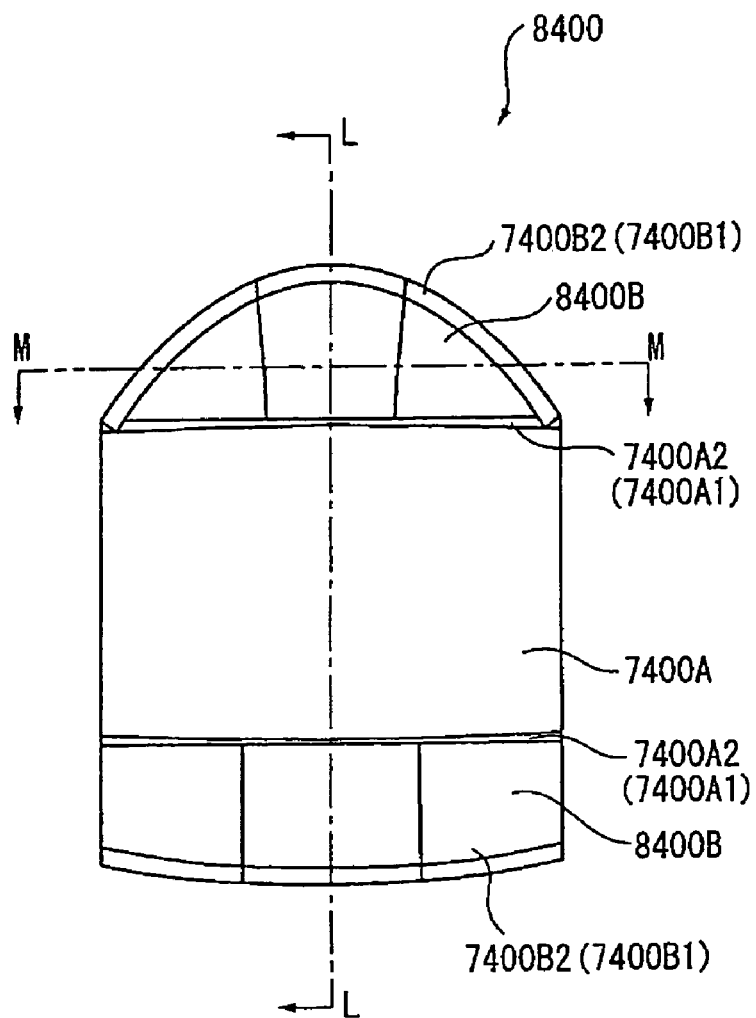
FIGS. 38A, 38B and 38C are views each showing a construction of the cooling chamber dividing section according to the seventh embodiment (a cooling chamber dividing section according to an eighth embodiment では?)
Figure 38B:
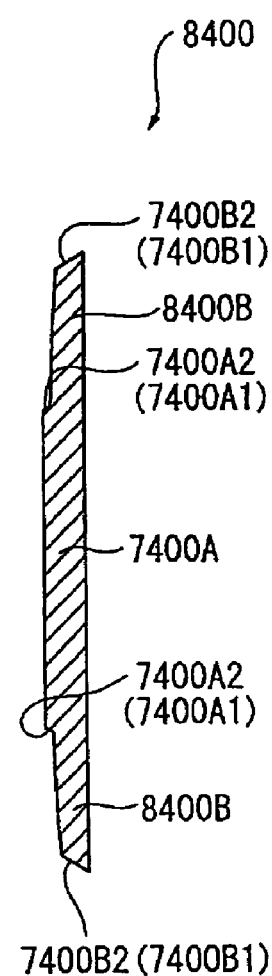
Figure 38C:
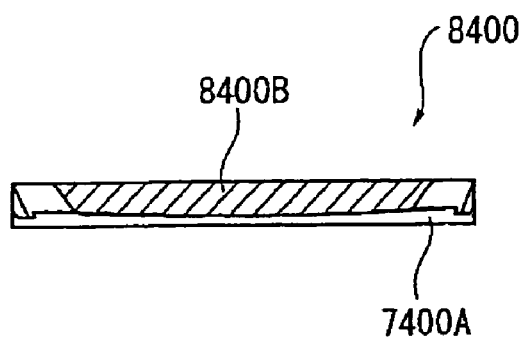

FIG. 38A, FIG. 38B, and FIG. 38C are views each showing a structure of a cooling chamber dividing section 8400. More specifically, FIG. 38A is a view showing the cooling chamber dividing section 8400 arranged in the light beam incident side of the liquid crystal panel 441 viewed from the light beam irradiation side. FIG. 38B is a cross-sectional view taken along the line L—L in FIG. 38A. FIG. 38C is a cross-sectional view taken along the line M—M in FIG. 38A.

In this embodiment, forms of the two cooling chamber dividing sections 8400 are changed as shown in FIG. 38A, FIG. 38B, and FIG. 38C. The configuration is the same as that in the seventh embodiment described above excluding the two cooling chamber dividing sections 8400.

The two cooling chamber dividing sections 8400 each have the substantially same form, and only the cooling chamber dividing section 8400 provided in the light beam incident side of the liquid crystal panel 441 is described below.

The cooling chamber dividing section 8400 comprises, in addition to the dividing section body 7400A described in the seventh embodiment, an extending section 8400B as shown in FIG. 38A, FIG. 38B, and FIG. 38C. The dividing section body 7400A and the extending section 8400B are monolithically formed like in the seventh embodiment. The same material for the cooling chamber dividing sections 4400, 6400, 7400 described in the third, fourth, and seventh embodiments may be employed as a material for the cooling chamber dividing section 8400.

The extending section 8400B has the substantially same form as that of the extending section 7400B described in the seventh embodiment, and is different from the extending section 7400B in the following points as shown in FIG. 38A, FIG. 38B, and FIG. 38C.

Namely the extending section 8400B has a convex curved form expanding toward the liquid crystal panel 441 formed at the substantially central portion of an edge face opposing to the liquid crystal panel 441 (a portion opposing to the outlet port 6406D or the inlet port 6405D) as shown in FIG. 38A, FIG. 38B, and FIG. 38C.

Further the extending section 8400B has a form with the thickness becoming gradually larger toward the dividing section body 7400A as shown in FIG. 38A, FIG. 38B, and FIG. 38C. An edge face of the extending section 8400B opposing to the liquid crystal panel 441 gets gradually closer to an edge face of the dividing section body 7400A opposing to the liquid crystal panel 441.

In the eighth embodiment described above, different from the seventh embodiment, as the convex curved form expanding toward the liquid crystal panel 441 is provided at the substantially central portion in the horizontal direction of the edge face of the extending section 8400B opposing to the liquid crystal panel 441, it is possible to temporarily accumulate a cooling fluid flowing therein via the inlet port 6405D and then rectify the flow direction of the cooling fluid to the direction parallel to the optical modulation face of the liquid crystal panel 441 (horizontal direction) with the convex curved form of the edge portion of the extending section 8400B in the extending direction and the convex curved form of the edge face of the extending section 8400B opposing to the liquid crystal panel 441. Because of this feature, a flow direction of the cooling fluid can smoothly be rectified to a direction parallel to the optical modulation face as well as to a direction perpendicular to that with the taper section 7400B1 of the extending section 8400B, the convex curved form of the edge portion of the cooling chamber dividing section 8400B in the extending direction, and the convex curved form of the edge of the extending section 8400B opposing to the liquid crystal panel 441. Because of this feature, the flow velocity of the cooling fluid at various positions inside the cooling chambers R4, R5 can further be uniformed by the cooling chamber dividing section 8400, and an optical image formed by the liquid crystal panel 441 can be maintained in better conditions. As the flow velocity of the cooling fluid at various portions inside the cooling chambers R4, R5 can further be uniformed, the surface temperature of the liquid crystal panel 441 can further be uniformed, so that local overheating can be prevented and a clearer optical image can be formed with the liquid crystal panel 441.

As the extending section 8400B has the thickness becoming gradually larger toward the dividing section body 7400A, even when the dividing section body 7400A has a form expanding toward the liquid crystal panel 441 with the thickness becoming gradually larger toward the extending section 8400B, a step portion caused by different thicknesses of the extending section 8400B and the dividing section body 7400A is not formed, so that the cooling fluid flowing toward the liquid crystal panel 441 can smoothly be circulated without colliding any step portion. Because of this feature, the convention speed of the cooling fluid flowing toward the liquid crystal panel 441 can easily be controlled to a desired value, so that the temperature difference between the liquid crystal panel 441 and the cooling fluid can be maintained in better conditions.

Ninth Embodiment

A ninth embodiment of the present invention is described below with reference to the related drawings.

In the following descriptions, the same reference numerals are assigned the same structures and components as those in the third embodiment, and detailed description thereof is omitted or simplified.

This embodiment is different from the third embodiment only in the point that two cooling chamber dividing sections 9400 are provided in each cooling chamber and the incident-side polarization plates 442 and irradiation-size polarization plates 443 each as an optical modulator are provided between the two cooling chamber dividing sections 9400 respectively. Other portions of the configuration are the same as those in the third embodiment.

Figure 39A:
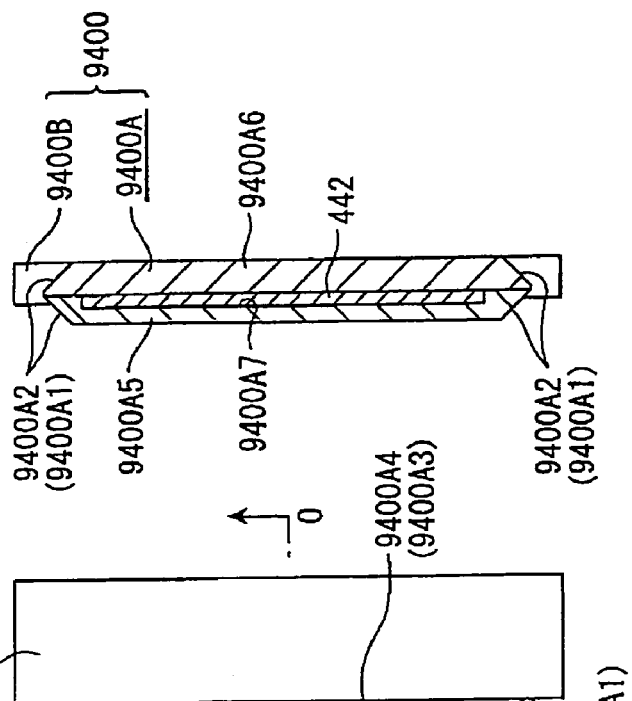
FIGS. 39A, 39B and 39C are views each showing a construction of a cooling chamber dividing section according to a ninth embodiment.
Figure 39B:
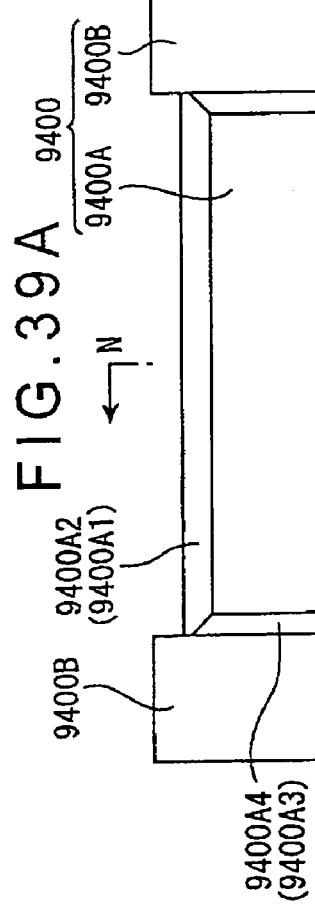
Figure 39C:
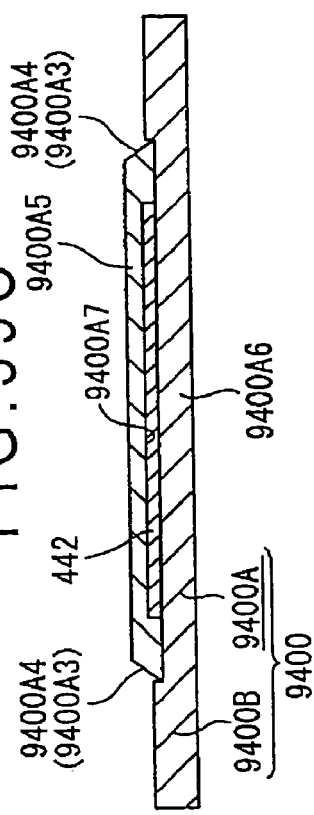

FIG. 39A, FIG. 39B, and FIG. 39C are views each showing a structure of the cooling chamber dividing section 9400 in the ninth embodiment. More specifically, FIG. 39A is a view showing the cooling chamber dividing section 9400 provided in the light beam incident side of the liquid crystal panel 441 viewed from the light beam irradiation side. FIG. 39B is a cross-sectional view taken along the line N—N in FIG. 39A. FIG. 39C is a cross-sectional view taken along the line O—O in FIG. 39A.

The two cooling chamber dividing sections 9400 have the external form similar to that of the cooling chamber dividing section 4400 described in the third embodiment as shown in FIG. 39A, FIG. 39B, and FIG. 39C. Namely the cooling chamber dividing section 9400 comprises a dividing section body 9400A (including the taper section 9400A1, slant surface 9400A2, taper section 9400A3, and slant surface 9400A4) and a contact section 9400B like the dividing section body 4400A (including the taper section 4400A1, slant surface 4400A2, taper section 4400A3, and slant surface 4400A4) in the cooling chamber dividing section 4400 described in the fourth embodiment.

Herein, the dividing section body 9400A is divided to a first dividing section 9400A5 set in the light beam irradiation side and a second dividing section 9400A6 set in the light beam irradiation side with a position where a slant surface 9400A2 formed in the light beam incident side and a slant surface 9400A2 formed in the light beam irradiation side crosses each other as the center.

Of these, a recess 9400A7 corresponding to an external form of the incident-side polarization plates 442 is formed on an edge face of the first dividing section 9400A5 in the light beam incident side. With the recess 9400A7, when the first dividing section 9400A5 and the second dividing section 9400A6 are assembled therein, a space is formed between the first dividing section 9400A5 and the second dividing section 9400A6, and the incident-side polarization plate 442 is set in this space. When the incident-side polarization plates 442 is set in the space, at first an adhesive, water glass or the like is applied on an edge face to which the first dividing section 9400A5 and the second dividing section 9400A6 contact to prevent a cooling fluid from flowing into the space.

Also the cooling chamber dividing section 9400 set in the light beam irradiation side of the liquid crystal panel 441 has the same configuration, and in a space formed with the first dividing section 9400A5 and the second dividing section 9400A6 each constituting the cooling chamber dividing section 9400, the irradiation-size polarization plates 443 is set. Further the cooling chamber dividing section 9400 set in the light beam irradiation side of the liquid crystal panel 441 is set, like in the third embodiment described above, so that the two edge faces of the cooling chamber dividing section 9400 set in the light beam incident side of the liquid crystal panel 441 in the light-axial direction are reversed.

Figure 40:
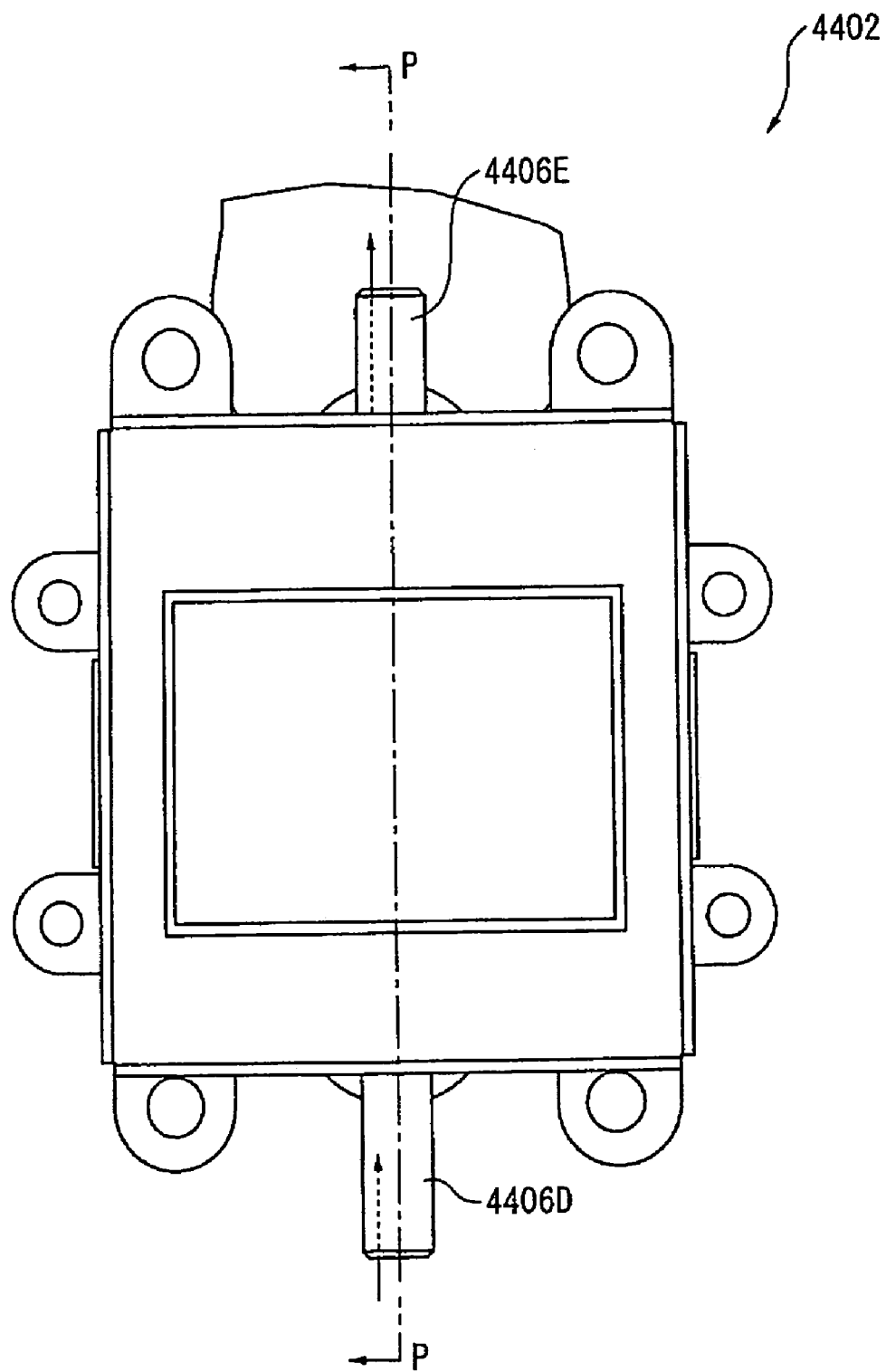
FIG. 40 is a view illustrating a state of the cooling chamber dividing sections arranged inside cooling chambers respectively according to the ninth embodiment.
Figure 41:
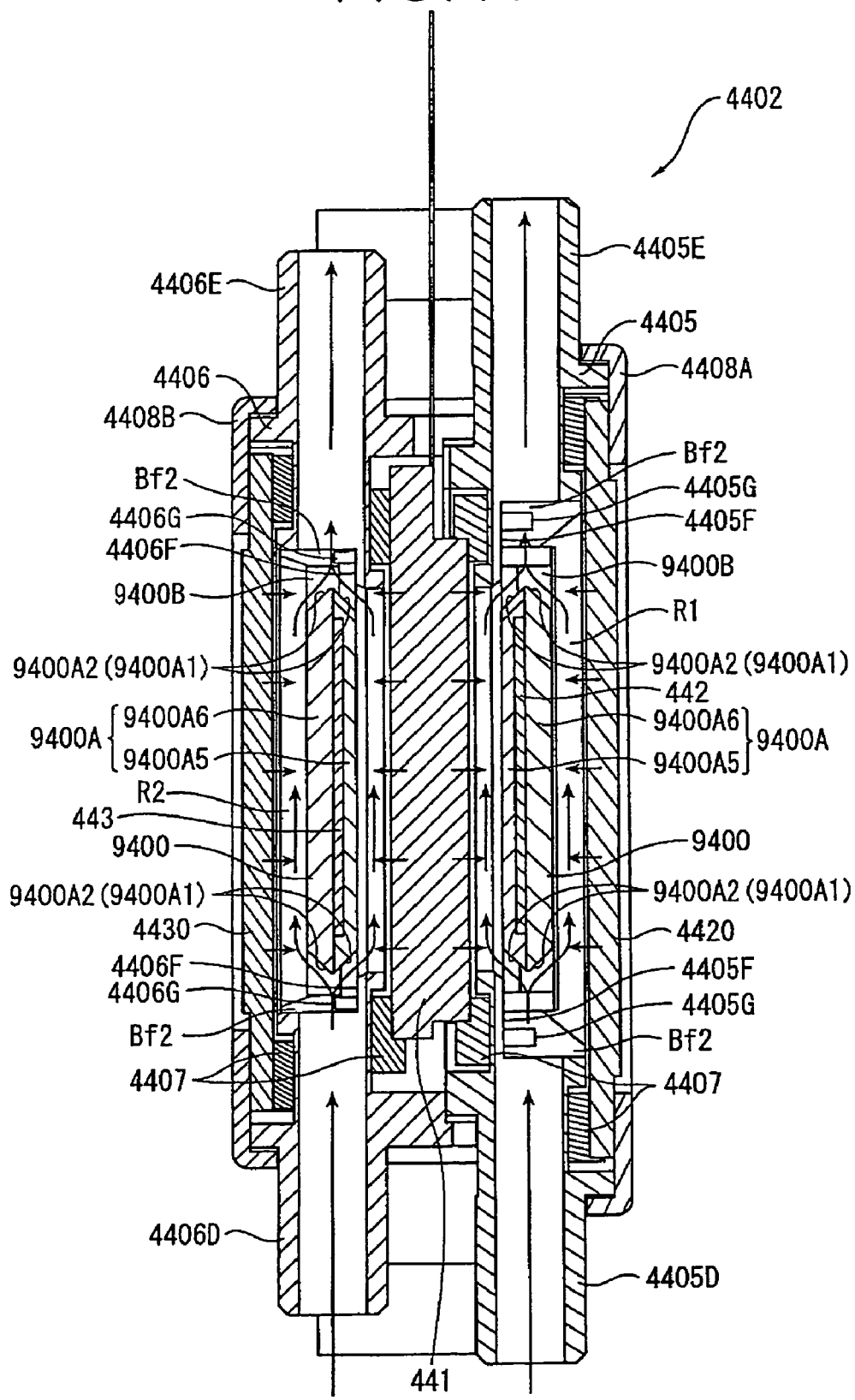
FIG. 41 is a view illustrating a state of the cooling chamber dividing sections arranged inside the cooling chambers respectively according to the ninth embodiment.

FIG. 40 and FIG. 41 are views each for illustrating the state where the cooling chamber dividing sections 9400 are set in the cooling chambers R1 and R2 respectively. More specifically, FIG. 40 is a view showing the optical modulator holder 4402 viewed from the light beam irradiation side. FIG. 41 is a cross-sectional view taken along the line P—P in FIG. 40.

As shown in FIG. 40 and FIG. 41, the arrangement of the two cooling chamber dividing sections 9400 are the same as that of the two cooling chamber dividing section 4400 described in the third embodiment above, and detailed description thereof is omitted herefrom.

Further as the incident-side polarization plate 442 and the irradiation-size polarization plate 443 are set in each of the two cooling chamber dividing sections 9400 respectively, the light-transmissible boards 4420, 4430 are provided in the light beam incident side of the frame member 4405 and in the light beam irradiation side of the frame member 4406 respectively as shown in FIG. 40 and FIG. 41.

In the ninth embodiment of the present invention described above, different from the third embodiment, as the cooling chamber dividing section body 9400A constituting each of the cooling chamber dividing sections 9400 is divided to the first dividing section 9400A5 and the second dividing section 9400A6, and also as the incident-side polarization plate 442 and the irradiation-size polarization plate 443 are set in each of the recesses 9400A7 of the first dividing section 9400A5 respectively, both the light beam incident side and light beam irradiation side of the incident-side polarization plate 442 and irradiation-side polarization plate 443 can be cooled by the cooling fluid via the cooling chamber dividing sections 9400, so that the incident-side polarization plate 442 and the irradiation-side polarization plate 443 can be cooled down more efficiently.

Tenth Embodiment

A tenth embodiment of the present invention is described below.

In the following descriptions, the same reference numerals are assigned to the same structures and components as those in the seventh embodiment described above, and the detailed description thereof is omitted or simplified.

In this embodiment, like in the ninth embodiment described above, each of cooling chamber dividing sections 10400 is divided to two dividing sections, and the tenth embodiment is different from the seventh embodiment only in the point that the incident-side polarization plate 442 and irradiation-side polarization plate 443 each as an optical modulator are provided between the two dividing sections. Other portions of the configuration are the same as those in the seventh embodiment.

FIG. 42A, FIG. 42B, and FIG. 42C are views each showing a structure f the cooling chamber dividing section 10400 according to the tenth embodiment. More specifically, FIG. 42A is a view showing the cooling chamber dividing section 10400 set in the light beam incident side of the liquid crystal panel 441 viewed from the light beam irradiation side. FIG. 42B is a cross-sectional view taken along the line Q—Q in FIG. 42A. FIG. 42C is a cross-sectional view taken along the line R—R in FIG. 42A.

The two cooling chamber dividing sections 10400 have the same external form as that of the cooling chamber dividing section 7400 described in the seventh embodiment as shown in FIG. 42A, FIG. 42B, and FIG. 42C. Namely this cooling chamber dividing section 10400 comprises a dividing section body 10400A (including a taper sections 10400A1 and a slant surface 10400A2) and an extending sections 10400B (including a taper section 10400B1 and a slant surface 10400B2) substantially similar to the dividing section body 7400A (including the taper section 7400A1 and the slant surface 7400As) and the slant surfaces 7400B2) in the cooling chamber dividing section 7400 described in the seventh embodiment.

The dividing section body 10400A is divided to a first dividing section 10400A3 set in the light beam irradiation side and a second dividing section 10400A4 set in the light beam incident side with a border position between the slant surface 10400A2 and the extending section 10400B as the center as shown in FIG. 42A, FIG. 42B, and FIG. 42C.

Of these, formed on an edge face of the second dividing section 10400A4 in the light beam irradiation side is a recess 100400A5 corresponding to an external form of the incident-side polarization plate 442 as shown in FIG. 42A, FIG. 42B, and FIG. 42C.

Further formed on an edge face of the first dividing section 10400A3 in the light beam incident side is a step section 10400A6 allowing engagement in the recess 10400A5 of the second dividing section 10400A4 as shown in FIG. 42B and FIG. 42C.

In the state where the step section 10400A6 is engaged in the recess 10400A5 to assembly the first dividing section 10400A3 and the second dividing section 10400A4 with each other, a space is formed between the first dividing section 10400A3 and the second dividing section 10400A4, and the incident-side polarization plate 442 is set in the space. When the incident-side polarization plate 442 is set in the space, such a material as an adhesive or water glass is applied onto an edge face contacted by the first dividing section 10400A3 and the second dividing section 10400A4 to prevent a cooling fluid from flowing into the space from the outside.

Also the cooling chamber dividing section 10400 set in the light beam irradiation side of the liquid crystal panel 441 has the same configuration, and the irradiation-side polarization plate 443 is set in a space formed with the first dividing section 10400A3 and the second dividing section 10400A4 each constituting the cooling chamber dividing section 10400.

Although not shown in the figures specifically, the incident-side polarization plate 442 and the irradiation-size polarization plate 443 are set in each of the two cooling chamber dividing sections 10400 respectively, the light-transmissible boards 4420, 4430 are set in the light beam incident side of the frame member 6405 and in the light beam irradiation side of the frame member 6406 respectively like in the ninth embodiment described above.

In the tenth embodiment described above, different from the seventh embodiment, both the light beam incident side and light beam irradiation side of the incident-side polarization plate 442 and irradiation-size polarization plate 443 can be cooled with a cooling fluid via the cooling chamber dividing sections 10400 like in the ninth embodiment, so that the incident-side polarization plate 42 and irradiation-size polarization plate 443 can be cooled more efficiently.

Eleventh Embodiment

An eleventh embodiment of the present invention is described below with reference to the related drawings.

In the following descriptions, the same reference numerals are assigned to the same structures and components as those in the tenth embodiment described above, and detailed description thereof is omitted or simplified herein.

Figure 43A:
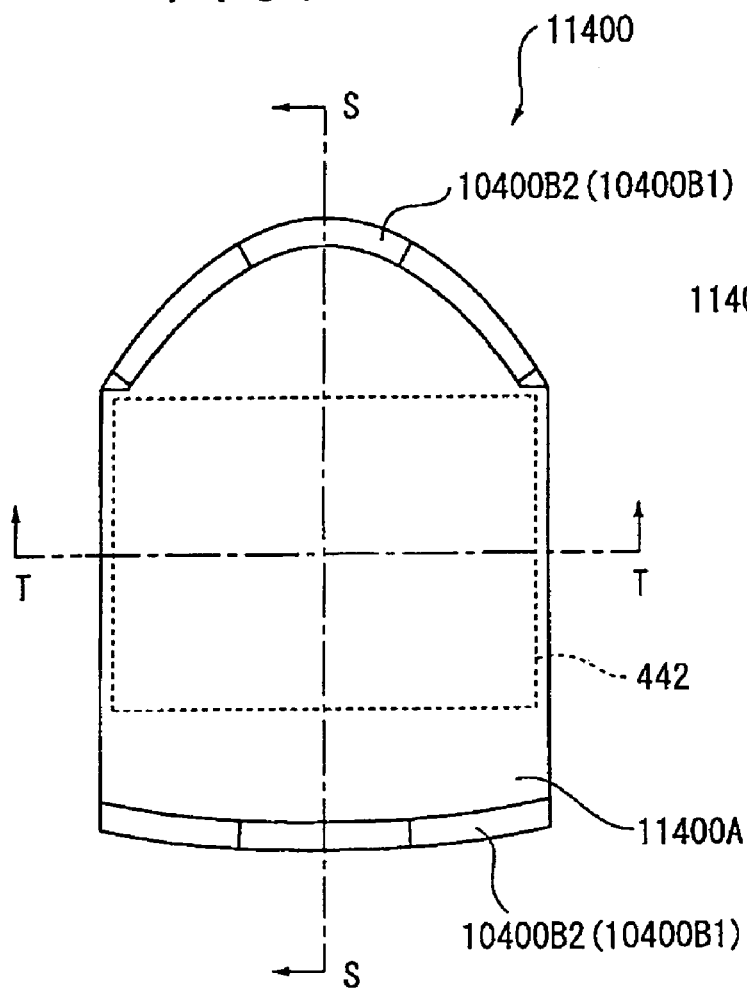
FIGS. 43A, 43B and 43C are views each showing a construction of a cooling chamber dividing section according to a eleventh embodiment.
Figure 43B:
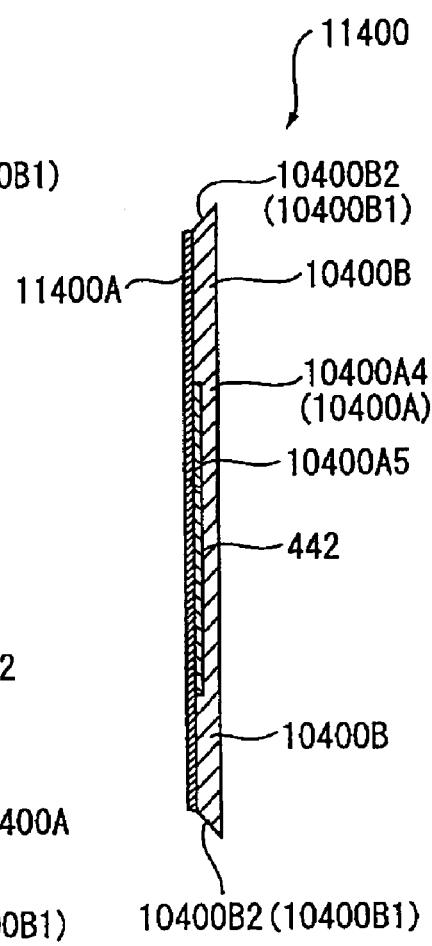
Figure 43C:
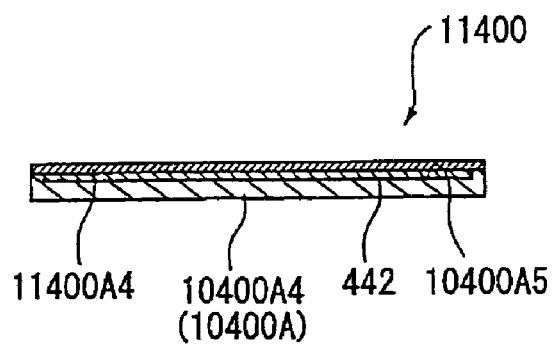

FIG. 43A, FIG. 43B, and FIG. 43C are views each showing a structure of a cooling chamber dividing section 11400 according to the eleventh embodiment of the present invention. More specifically, FIG. 43A is a view showing the cooling chamber dividing section 11400 set in the light beam incident side of the liquid crystal panel 441 viewed from the light beam irradiation side. FIG. 43B is a cross-sectional view showing the lien S—S in FIG. 43A. FIG. 43C is a cross-sectional view taken along the line T—T in FIG. 43A.

This embodiment is different from the tenth embodiment in the point that the two cooling chamber dividing sections 11400 have the different configuration as shown in FIG. 43A, FIG. 43B, and FIG. 43C. The configuration is the same as that in the tenth embodiment excluding the cooling chamber dividing section 11400.

The two cooling chamber dividing sections 11400 have the same form, so that only the cooling chamber dividing section 11400 set in the light beam incident side of the liquid crystal panel 441 is described below.

This cooling chamber dividing section 11400 has the configuration in which the first dividing section 10400A3 is eliminated from the cooling chamber dividing section 10400 described in the tenth embodiment as shown in FIG. 43A, FIG. 43B, and FIG. 43C, and comprises, in addition to the second dividing section 10400A4 and the extending section 10400B, a water-repelling film 11400A.

This water-repelling film 11400A has, as shown in FIG. 43A, the same form as that of the edge faces of the second dividing section 10400A4 and the extending section 10400B in the light beam irradiation side (excluding the slant surface 10400A2 and the slant surface 10400B2) when viewed from the top.

As a material for the water-repelling film 11400A, for instance, materials such as fluorohydrocarbon, silicon resin may be employed.

In the state where the incident-side polarization plate 442 is set in the recess 10400A5 of the second dividing section 10400A4, when the water-repelling film 11400A is applied to the second dividing section 10400A4, extending section 10400B, and an light beam irradiation side edge face of the incident-side polarization plate 442, for instance, with an adhesive, a cooling fluid is prevented from flowing into the recess 10400A5 from the outside.

Also the cooling chamber dividing section 11400 set in the light beam irradiation side of the liquid crystal panel 441 has the same configuration, and the irradiation-side polarizaton plate 443 is set in the recess 10400A5 of the second dividing section 10400A4 constituting the cooling chamber dividing section 11400 and is covered with the water-repelling film 11400A.

In the eleventh embodiment described above, different from the tenth embodiment, the incident-side polarization plate 442 or the irradiation-side polarization plate 443 is set in the recess 10400A5 of the cooling chamber dividing section 11400, and the incident-side polarization plate 442 or irradiation-side polarization plate 443 is covered with the water-repelling film 11400A, so that heat is easily released to a cooling fluid via the water-repelling film 11400A, and therefore the incident-side polarization plate 442 or the irradiation-side polarization plate 443 can be cooled more efficiently.

As the cooling chamber dividing section 11400 comprises the water-repelling film 11400A, it is possible to enlarge a contact angle between the cooling chamber dividing section 11400 and the cooling fluid, so that the cooling chamber dividing section 11400 is hardly wet by the cooling fluid. Because of this feature, even when bubbles or dusts are included in a cooling fluid, the bubbles or dusts are hardly deposited on the cooling chamber dividing section 11400, so that unnecessary images generated due to deposition of bubbles, dusts or the like can be prevented from being included in an optical image formed by the liquid crystal panel 441, and therefore an optical image formed by the liquid crystal panel 441 can be maintained in good conditions.

The present invention was described above with reference to the preferred embodiments above, but the present invention is not limited to these embodiments, and various improvements and design changes are possible within a scope not departing from the gist of the present invention.

In the embodiments above, the configuration in which the radiator 447 is employed as a heat radiator, but the present invention is not limited to this configuration, and the Peltier module making use of the Peltier effect connected in the heat transferable state to a cooling fluid flowing through a plurality of fluid circulating members 448 may be employed as a radiator.

In the embodiments described above, the positions for setting the radiator 447 and fluid press-feeding section 446 are not limited to those described in the embodiments, and the components may be positioned in the right or left side from or above or under the projector lens 5.

In the embodiments described above, the axial flow fan 32 cools the radiator 447 and discharges cooling air to the heat-radiating fin 4473, but the present invention is not limited to this configuration, and also the configuration is allowable in which air warmed up near the heat-radiating fin 4473 is sucked and discharged to outside of the projector 1.

In the first embodiment, the incident-side polarization plate 442 and irradiation-side polarization plate 443 are provided in the light beam incident side and in the light beam irradiation side of a pair of frame members 4405, 4406 constituting the optical modulator holder 4402, but the present invention is not limited to this configuration. For instance, the configuration is allowable in which the light-transmissible boards 4420, 4430 such as glass sheets are provided in the light beam incident side and in the light beam irradiation side of a pair of frame members 4405, 4406 for sealing one of the edge faces of the openings 4405A, 4406A. In this configuration the incident-side polarization plate 442 and irradiation-size polarization plate 443 may be reflection type of polarization elements like the incident-side polarization plate 442 described in the incident-side polarization plates 442 in the second embodiment. The same is true to the third to eighth embodiments described above.

In the second embodiment, the configuration may be employed in which the light beam incident side of the frame member 5405 is sealed with a light-transmissible member and a cooling chamber is formed in each of the pair of frame members 5405, 5406 respectively substantially like in the first embodiment. With the configuration as described above, cooling chambers are provided in the light beam incident side and in the light beam irradiation side of the liquid crystal panel 441 respectively, so that the efficiency in cooling the liquid crystal panel 441 is further improved.

In the embodiments described above, the main tank 445, fluid branching section 4401, and the relay tanks 4404, 5404 have the cooling fluid inflow sections cooling fluid inflow section 445A, 4401A, 4404A and the cooling fluid outflow sections 445B, 4401C, and 4404B respectively, and an edge of each of the relay tanks 4404, 5404 have the cooling fluid inflow sections cooling fluid inflow section 445A, 4401A, 4403A and cooling fluid outflow sections 445B, 4401C, 4404B protrudes inward, but the present invention is not limited to this configuration. For instance, also the configuration is allowable in which the cooling fluid circulating member 448 is directly communicated to each of the main tank 445, fluid branching section 4401, and the relay tanks 4404, 5404 and also an edge of the cooling fluid circulating member 448 protrudes into inside of the main tank 445, fluid branching section 4401, and the relay tanks 4404, 5404.

In the fifth and six embodiments, the rectifying section 6405G, 6406G in the fourth embodiments are changed to the rectifying sections 7405G, 7406G, 8405G, and 8406G, but also the configuration is allowable in which the rectifying sections 4405G, 4406G, and 5406G in the first to third embodiments are changed to the rectifying sections 740G, 7406G, 8405G, and 8406G. A form of the rectifying section is not limited to that of the rectifying sections 4405G, 4406G, 5406G, 6405G, 6406G, 7405G, 7406G, 8405G, and 8406G described in the first to six embodiments and in the ninth embodiment so long as the form is designed to rectify the cooling fluid flow in a direction parallel to the optical modulation face of the liquid crystal panels 441. For instance the rectifying sections as described below may be employed.

FIG. 44A, FIG. 44B, FIG. 45A, and FIG. 45B are views each showing a variant of the rectifying section. FIG. 44A, FIG. 44B, FIG. 45A, and FIG. 45B show the cases in which the form of the rectifying sections of the frame members 6405, 6406 described in the fourth to sixth embodiments are changed respectively, the rectifying sections shown in FIG. 44A, FIG. 44B, FIG. 45A, and FIG. 45B may be employed in the frame members 4405, 4406, 5406 described in the first to third embodiments and in the ninth embodiment.

Figure 44A:
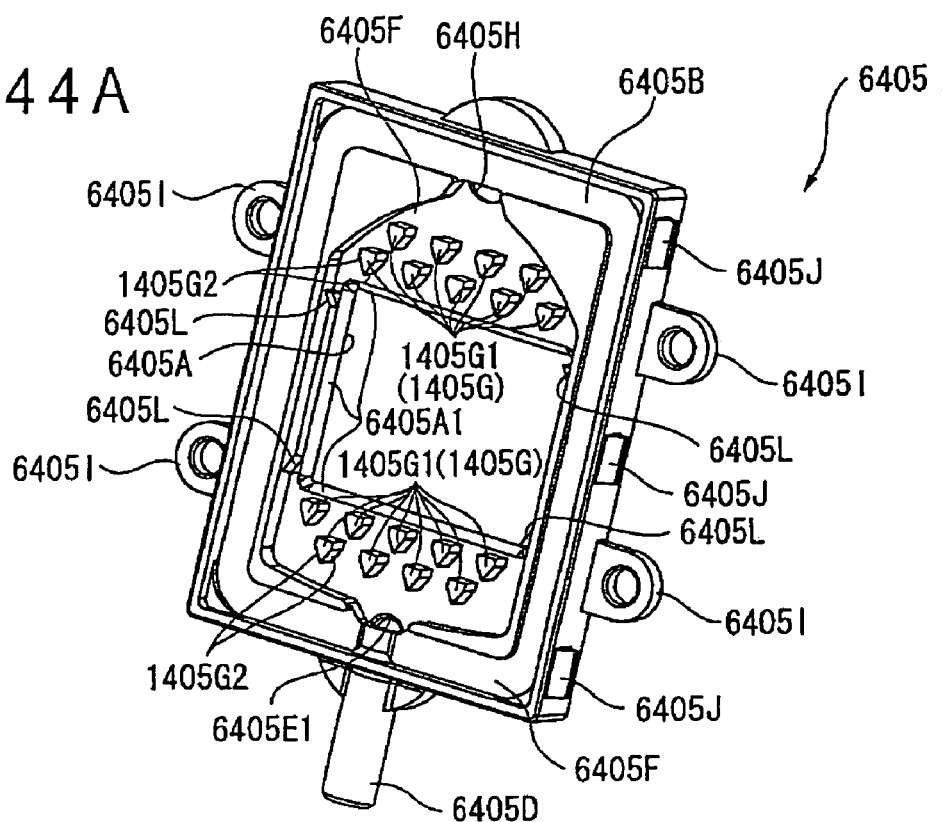
FIG. 44A and FIG. 44B are views each showing a variant of a rectifying section.
Figure 44B:
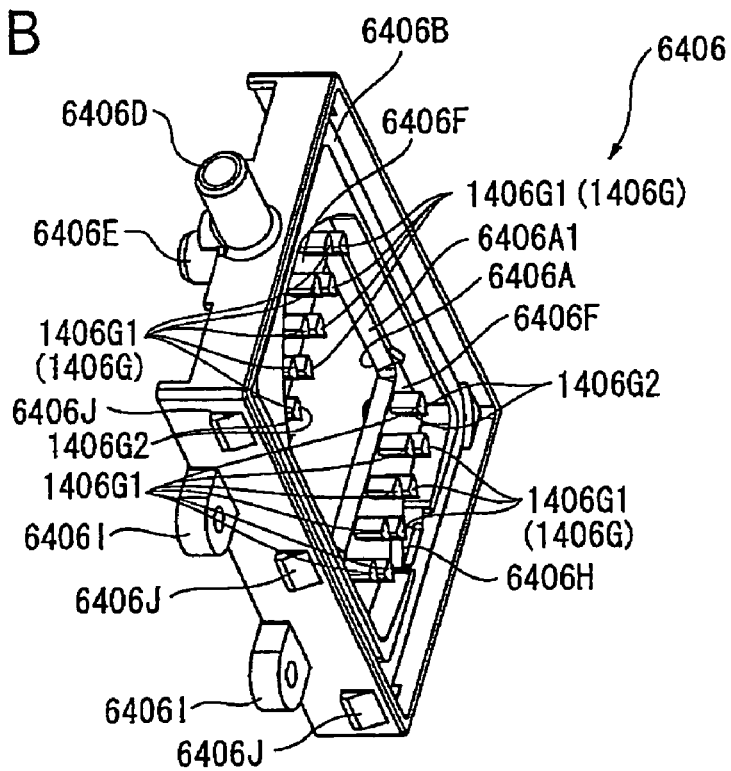

For instance, the rectifying sections 1405G, 1406G shown in FIG. 44A and FIG. 44B has the substantially same forms as those of the rectifying sections 7405G, 7406G described in the fifth embodiment. Namely the rectifying section 1405G has the column 1405G1 (including the rectifying face 1405G2) similar to the column 7405G1 (including the rectifying face 7405G2) in the rectifying section 7405G as shown in FIG. 44A and FIG. 44B. Each of the rectifying sections 1405G provided in the erecting state in the upper recess 6405F and in the lower recess 6405F has two arrays comprising the 9 columns 1405G1 extending in the flow-in direction of the cooling fluid flowing therein via the inlet port 6405, namely in the direction from the lower edge of the frame member 6405 toward the upper edge thereof and the direction perpendicular to the former direction, and the columns are arranged so that the two-dimensional interference between them will not occur. The height of each of the columns 1405G1 from the recess 6406F is identical.

Further the rectifying section 1406G has the same positional arrangement and form as those of the rectifying section 1405G as shown in FIG. 44D, and has the column 1406G1 and the rectifying face 1406G2 like the column 1405G1 and the rectifying face 1405G2 in the rectifying section 1405G.

In FIG. 44A and FIG. 44B, a reference numeral is shown only for one of the columns 1405G1, 1406G1 and also only for one of the rectifying faces 1405G2, 1406G2.

Figure 45A:
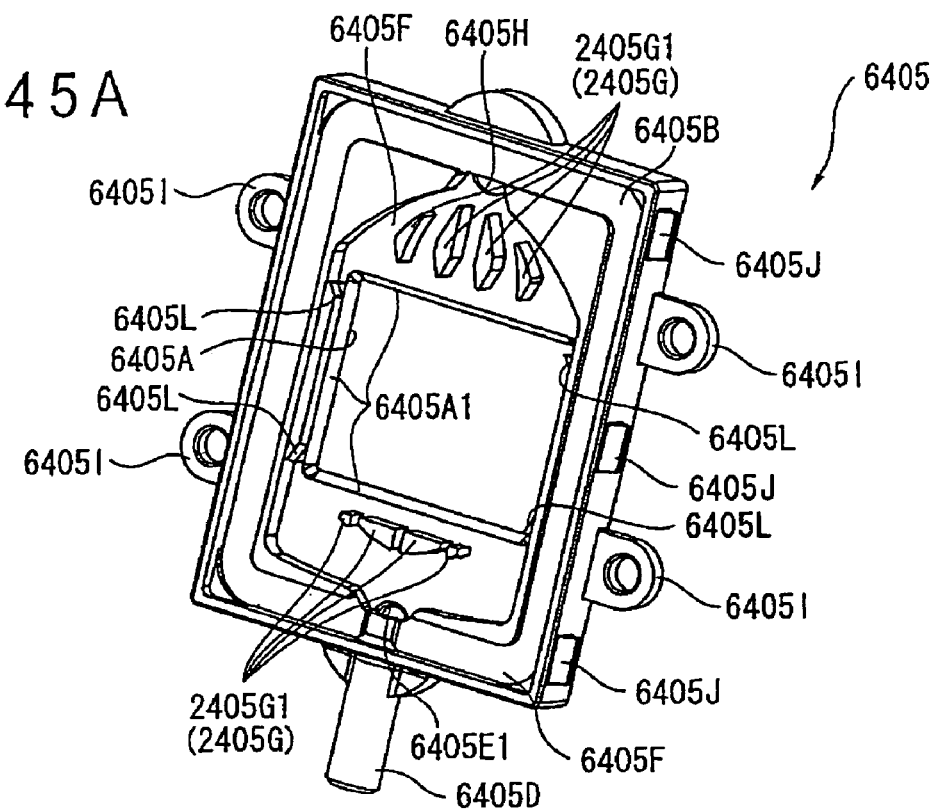
FIG. 45A and FIG. 45B are views each showing another variant of the rectifying section.
Figure 45B:
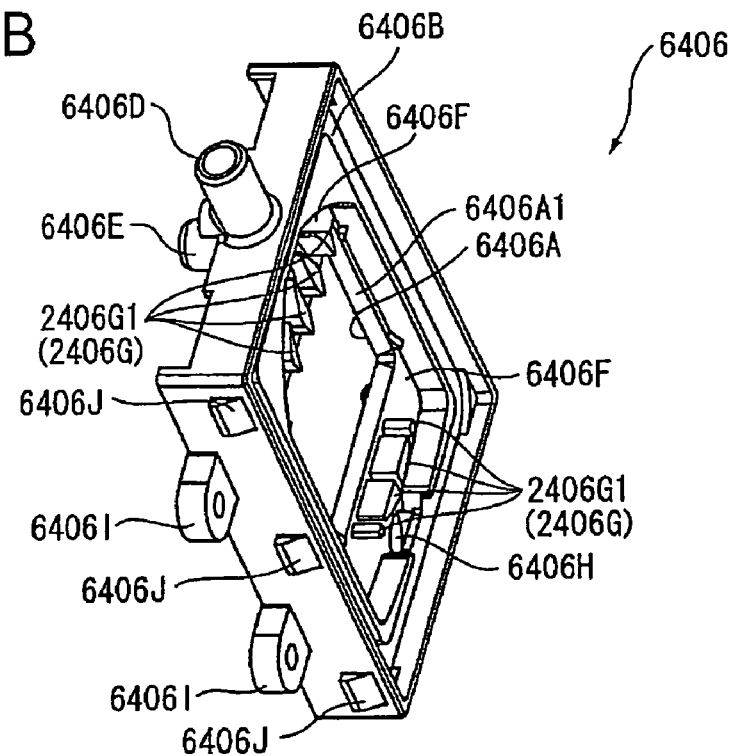

In addition, for instance, the rectifying sections 2405G, 2406G shown in FIG. 45A and FIG. 45B comprises polygonal columns 2405G1, 2406G1 each with the substantially entire side face functioning as a rectifying face. The rectifying sections 2405G provided in the upper recess 6405F and in the lower recess 6405F in the upright posture comprise four columns 2406G1 as shown in FIG. 45A.

The rectifying section 2406G has the same positional arrangement and form as those of the rectifying section 2405G described above as shown in FIG. 45B, and also has the column 240G1 like the column 2405G1 in the rectifying section 2405G.

In the first to sixth embodiments, ninth embodiment, and also in the variants shown in FIG. 44A, FIG. 44B, FIG. 45A, and FIG. 45B, each of the rectifying sections 4405G, 4406G, 5406G, 6405G, 6406G, 7405G, 7406G, 8405G, 8406G1405G, 1406G, 2405G, 2406G is integrated with each of the frame members 4405, 4406, 5406, 6405, 6406 respectively, but the present invention is not limited to this configuration. The configuration is allowable in which each of the rectifying sections is formed as an independent body separated from a frame member and the rectifying section can freely be load on or off from a frame member. With the configuration as described above, various forms are allowable for the rectifying section, so that a freedom degree in designing the optical modulator holder is improved.

In the first to sixth embodiments and ninth embodiment, and also in the variants shown in FIG. 44A, FIG. 44B, FIG. 45A, and FIG. 45B, a plurality of holes each allowing passage of a cooling fluid therethrough may be provided in each of the rectifying sections 4405G, 4406G, 5406G, 6405G, 6406G, 7405G, 7406G, 8405G, 8406G1405G, 1406G, 2405G, 2406G. For instance, each of the rectifying sections may be formed with a porous material. With the configuration as described above, it is possible to capture bubbles, dusts, and the like included in the cooling fluid with the plurality of holes when the cooling fluid flows through the plurality of holes. Because of this feature, it is possible to prevent images formed when a light beam is introduced into bubbles, dusts and the like included in the cooling fluid from being included in an optical image formed by the liquid crystal panel 441, so tat the optical image formed by the liquid crystal panel 441 can be maintained in good conditions.

In the fifth embodiment and in the six embodiment, the columns 7405G1, 740601, 8405G1, 8406G1 constituting each of the rectifying sections 7405G, 7406G, 8405G, and 8406G are provided with a space between the columns, but the present invention is not limited to this configuration, and also the configuration may be employed in which the columns are provided without a space therebetween, namely in which the columns 7405G1, 7406G1, 8405G1, 8406G1 are integrated with each other.

In the embodiments described above, the cooling fluid circulating member 448, main tank 445, fluid press-feeding section 446, tubular member 4472 of the radiator 447, frame members 4405, 4406, 5406, and relay tanks 4404, 5404 are the components contacting the cooling fluid and are made from aluminum, but the present invention is not limited to this configuration. The material for the components is not limited to aluminum, and any other material may be used so long as the material has the anti-corrosion property, and the components may be formed, for instance, with oxygen free high conductivity copper or duralumin. Further as a material for the cooling fluid circulating member 448, such material as butyl rubber or fluorine rubber with low hardness having a counter force against the optical modulator holders 4402, 5402, 6402, and 7402 and capable of suppressing displacement of pixels may be used.

In the fourth embodiments through eighth embodiments, ninth embodiment, and eleventh embodiment described above, each of the frame members 6405, 6406, 7405, 7406 comprises a molded products prepared by molding a resin material such as PC (polycarbonate) with PPS (polyphenylene sulfide) or GF (glass fiber) added therein, but the present invention is not limited to this configuration, and the frame member may be made from such a material as aluminum, no oxygen high conductivity copper or duralumin.

In the embodiments described above, the positions at which the inlet ports 4405D, 4406D, 5406D, 6405D and outlet ports 4405E, 4406E, 5406E, 6406D are formed in the optical modulator holders 4402, 5402, 6402, 7402 and a flowing direction of a cooling fluid are not limited to those described in each of the embodiments described above. For instance, also the configuration is allowable in which the inlet ports 4405D, 4406D, 5406D, 6406D and the outlet ports 4405E, 4406E, 5406E, 6406D function as outlet ports and inlet ports respectively and the cooling fluid flows in the reverse direction.

In the fifth embodiment, when the portions each for forming the inlet port 6405D are changed, the position change should be performed that, of the five columns 7405G1 in the rectifying section 7405G, the one formed at a position corresponding to the column 7405G1 provided at the changed position has the largest heights in the optical axis and the heights of other columns 7405G1 become gradually smaller in the direction further away from the column 7405G1 provided at a position opposing to the inlet port. Also when a position for forming the outlet port 6406D is changed, the rectifying section 7406G should have the form as described above.

In the seventh embodiment, eighth embodiment, tenth embodiment, and eleventh embodiment, when the positions for forming the inlet ports 6405D and outlet ports 6406D are changed, edges of the extending sections 7400B, 8400B, 10400B in the extending direction of the cooling chamber dividing section 7400, 8400, 10400, 11400 should preferably protrude at the positions corresponding to the inlet ports and output lets formed at the changed positions in the vertical direction.

Further in the eighth embodiment, the edge face opposing to the liquid crystal panels 441 of the extending section 8400B in the cooling chamber dividing section 8400 is required that a portion thereof opposing to an inlet port or an outlet portion at the changed position expands toward the liquid crystal panel 441.

The cooling chamber dividing sections 4400, 9400 in the third embodiment and in the ninth embodiment are not limited to the configuration employed in the first embodiment, and the configuration in the second embodiment may be employed.

Similarly, the cooling chamber dividing sections 6400, 7400, 8400, 10400, 11400 employed in the fourth embodiment through eighth embodiment, tenth embodiment and eleventh embodiment may be employed in the second embodiment. When any of the cooling chamber dividing sections 6400, 7400, 8400, 10400, 11400 is employed in the second embodiment, the rectifying section 5406G in the frame member 5406 is omitted.

In the third embodiment and the ninth embodiment, the cooling chamber dividing sections 4400, 9400 have the contact sections 440B, 9400B respectively, but the present invention is not limited to this configuration. It is possible to stabilize the cooling chamber dividing sections 4400, 9400 are respective specified positions inside the cooling chambers R1, R2 by a force of the cooling fluid flowing in from the inlet ports 4405D, 4405D according to oblique angles of the slant surfaces 4400A2, 9400A2 respectively, and therefore also the configuration is allowable in which the contact sections 4400B, 9400B are omitted. Further the contact sections 4400B, 9400B are formed on peripheries of the right and left edge sections of the dividing section bodies 4400A, 9400A respectively, but so long at least one pair of contact sections is formed in the right and left edge sections thereof, there is no specific restrictions over the positions and the vertical length thereof.

In the third embodiment and the ninth embodiment, the dividing section bodies 4400A, 9400A and the contact sections 4400B, 9400B are not limited to the configuration in which the components are monolithically formed respectively, and also the configuration is allowable in which the components are prepared separately and then are assembled with each other.

In the third embodiment through the eleventh embodiment, the cooling chamber dividing sections 4400, 6400, 7400, 8400, 9400, 10400, 11400 have the slant surfaces 4400A2, 6400A1, 7400A2, 7400B2, 9400A2, 10400A2, 10400B2 formed thereon respectively, but the present invention is not limited to this configuration. The portions are required to have a tapered form with the cross section gradually becoming smaller toward the upper section and toward the lower section, and for instance, also the slant surfaces may be curved ones.

In the third embodiment and the ninth embodiment, the cooling chamber dividing sections 4400, 9400 are provided between the liquid crystal panels 441 and the frame member 4405 and between the liquid crystal panel 441 and the frame member 4406 respectively, but the present invention is not limited to this configuration, and the components may be between the incident-side polarization plate 442 or the light-transmissible board 4420 and the frame member 4405 and between the frame member 4406 and the irradiation-side polarization plate 443 or the light-transmissible board 4430.

In the embodiments described above, a flow rate of a cooling fluid flowing into each of the three optical modulator holders 4402, 5402, 6402, 7402 is set to a substantially constant level, but the present invention is not limited to this configuration, and the configuration may be employed in which flow rates of cooling fluids flowing in to the three optical modulator holders 4402, 5402, 6402, 7402 are different from each other.

For instance, the configuration may be employed in which a valve is provided in a flow path communicating to each of the three optical modulator holders 4402, 5402, 6402, 7402 so that the flow path can be widened or narrowed by changing a position of the valve.

Also the configuration may be employed in which the fluid circulating members 448 connecting the fluid branching section 4401 to the optical modulator holders 4402, 5402, 6402, 7402 have different diameters corresponding to heat values of the liquid crystal panels 441R, 441G, 441B.

In the embodiments described above, external faces of the optical modulator holders 4402, 5402, 6402, 7402 and bottom face of the casing 45 for optical components are cooled by sending air with the sirocco fan 31, but also the configuration not using the sirocco fan 31 may be employed. In this configuration, generation of noises can be suppressed.

In the embodiments described above, the configuration is employed in which the incident-side polarization plate 442 and the irradiation-side polarization plate 443 are used as optical modulators respectively and the incident-side polarization plate 442 and/or the irradiation-side polarization plate 443 are cooled by a cooling fluid, but the present invention is not limited to this configuration, and also the configuration is allowable in which any of a wave plate, a view angle correction plate or the like is employed as the optical modulator and the optical modulators are cooled with a cooling fluid.

In the ninth embodiment and tenth embodiment, there are provided two dividing section bodies 9400A, 10400A, 11400A respectively, but the present invention is not limited to this configuration, and also the configuration is allowable in which three or more dividing section bodies are provided and such a component as a polarization plate, a wave plate, or a view angle correction plate are provided at least between any of the plurality of components.

Further in the eleventh embodiment, in each cooling chamber dividing section 11400, the incident-side polarization plate 442 and irradiation-side polarization plate 443 are provided in the recess 10400A5 of the second dividing section 10400A4, but the present invention is not limited to this configuration, and any of the components such as a polarization plate, a wave plate, a view angle and the lie is provided.

In description of the embodiments described above, the optical device 44 comprises the main tank 445 and the radiator 447, but the present invention is not limited to this configuration, and also the configuration is allowable in which at least one of the main tank 445 and the radiator 447 is omitted.

In the embodiments described above, the optical unit 4 has a substantially L-shaped form when viewed from the top, but the present invention is not limited to this configuration, and also the configuration is allowable in which the optical unit 4 has a substantially U-shaped form when viewed from the top.

In the embodiments described above, only the example of the projector 1 using the three liquid crystal panels 441 is described, but the present invention is also applicable to a projector using only one liquid crystal panel, a projector using only two liquid crystal panels, or that using four or more liquid crystal panels.

In the embodiments described above, a transmissible type of liquid crystal panel having a light incident face and a light irradiation face different from each other is used, but also a reflection type of liquid crystal panel in which the light incident face and the light irradiation face are identical may be employed.

In the embodiments described above, a liquid crystal panel is used as an optical modulator, but an optical modulator other than a liquid crystal panel such as a device using a micro mirror may be employed. In this case the polarization plates in the light beam incident side and in the light beam irradiation side may be omitted.

In the embodiments above, only the front type of projector which projects images from the front side of a screen, but this invention is also applicable to the rear type of projector which projects image from the rear side of a screen.

The optimal configurations for carrying out the present invention are described above, but the present invention is not limited to the configurations described above. Namely, although the present description is described and illustrated above in relation to specific embodiments, but those skilled in the art can add various modifications to the forms, materials, quantities, and other details described in the embodiments above without departing from the technological idea and objects of the present invention.

For the reasons described above, the forms and materials described above are only examples provided for facilitating understanding of the present invention, and do not limit the present invention, and descriptions of members not using a portion or all of restrictions over the forms and materials are included within a scope of the present invention.

The priority application Number JP2004-314519 upon which this patent application is based is hereby incorporated by reference.

What is claimed is:

1. An optical modulator holder which holds an optical modulator for forming an optical image by modulating a light beam irradiated from a light source according to image information, and has a cooling chamber with a cooling fluid sealed therein to cool said optical modulator with the cooling fluid sealed in said cooling chamber, said optical modulator holder comprising;

a pair of frame members each having an opening corresponding to an optical modulation face of said optical modulator for holding said optical modulator therebetween; and a light-transmissible substrate provided at least on either one of the sides of said openings opposite to the sides where said pair of frame members are opposed to each other, wherein said cooling chamber is formed within at least one of said pair of frame members by closing the sides of said opening where said pair of frame members are opposed to each other and at least either one of the sides of said openings opposite to the sides where said pair of frame members are opposed to each other respectively with said optical modulator and said light-transmissible substrate, wherein at least one of said pair of frame members comprises, at positions not causing two-dimensional interference with said optical modulation face of said optical modulator, an inlet port for introducing therethrough said cooling fluid into said cooling chamber, an outlet port for discharging therethrough said cooling fluid inside said cooling chamber to the outside, and a buffer section for temporally accumulating said cooling fluid flowing therein via said inlet port, and for rectifying the flow direction of said cooling fluid to a direction parallel to said optical modulation face and/or perpendicular to said optical modulation face, wherein said optical modulator holder has a cooling chamber dividing section that is constituted by a light-transmittable plate-shaped member having a shape corresponding to said optical modulation face of said optical modulator, the cooling chamber dividing section being placed inside said cooling chamber and dividing said cooling chamber into a light beam incident side region and a light beam irradiation side region for rectifying the flow direction of said cooling fluid flowing therein via said inlet port to a direction perpendicular to said optical modulation face, and wherein said cooling chamber dividing section has, when placed inside said cooling chamber, a taper portion formed in a side edge section of said inlet port, the cross-sectional area becoming gradually smaller when extends toward said inlet port side, and wherein said buffer section includes a recess positioned on a periphery of said opening in said frame member with said cooling chamber formed therein and recessing in a direction perpendicular to said optical modulation face, said light-transmissible substrate, and said cooling chamber dividing section.

2. The optical modulator holder according to claim 1, wherein said taper portion has a slant surface at least on said opposing face side.

3. The optical modulator holder according to claim 1, wherein said cooling chamber dividing section is placed inside said cooling chamber so that the distance to said optical modulator is larger than that to said light-transmissible substrate.

4. The optical modulator holder according to claim 1, wherein said cooling chamber dividing section comprises, when placed inside said cooling chamber, a dividing section body facing said optical modulator and an extending section having said taper portion and extending from said dividing section body toward said recess so that the extending section interferes the recess two-dimensionally, and wherein said extending section, in the side edge section thereof having said taper portion, has a convex-curved shape protruding toward said in let port side on a portion facing said inlet port.

5. The optical modulator holder according to claim 4, wherein said dividing section body has a shape with the thickness larger as compared to that of said extending section and expanding toward said opposing face.

6. The optical modulator holder according to claim 5, wherein said extending section has a shape with the thickness gradually becoming larger toward said dividing section body.

7. The optical modulator holder according to claim 4,
wherein said extending section has, when placed inside said cooling chamber, a shape in which a portion facing against said inlet port on an edge face of said opposing face has a convex-curved form protruding toward said opposing face.

8. The optical modulator holder according to claim 1, wherein said cooling chamber dividing section is formed by laminating a plurality of plate-formed members, and at least one optical converter for converting optical characteristics of an incident light beam is provided at a space between at least a pair of said plate-formed members laminated among said plurality of plate-shaped members.

9. The optical modulator holder according to claim 1, wherein said cooling chamber dividing section has a recess in which at least one optical converter for converting optical characteristics of an incident light beam can be engaged, and said recess is covered with a water-repelling film so that said at least one optical converter engaged in said recess is covered with the film.

10. The optical modulator holder according to claim 1, wherein said buffer section comprises, in addition to said recess, said light-transmissible substrate, and said cooling chamber dividing section, a rectifying section provided in said recess for rectifying a flow direction of said cooling fluid flowing therein via said inlet port so that said cooling fluid extends inside said cooling chamber keeping the flow direction parallel to said optical modulation face, and wherein said cooling chamber dividing section and said rectifying section are arranged so that the two-dimensional interference will not occur.

11. The optical modulator holder according to claim 10,
wherein said cooling chamber dividing section and said rectifying section are formed so that the distance between said cooling chamber dividing section and said light-transmissible substrate is larger than that between said rectifying section and said light-transmissible substrate.

12. An optical modulator holder which holds an optical modulator for forming an optical image by modulating a light beam irradiated from a light source according to image information, and has a cooling chamber with a cooling fluid sealed therein to cool said optical modulator with the cooling fluid sealed in said cooling chamber, said optical modulator holder comprising;
a pair of frame members each having an opening corresponding to an optical modulation face of said optical modulator for holding said optical modulator therebetween; and
a light-transmissible substrate provided at least on either one of the sides of said openings opposite to the sides where said pair of frame members are opposed to each other,
wherein said cooling chamber is formed within at least one of said pair of frame members by closing the sides of said opening where said pair of frame members are opposed to each other and at least either one of the sides of said openings opposite to the sides where said pair of frame members are opposed to each other respectively with said optical modulator and said light-transmissible substrate,
wherein at least one of said pair of frame members comprises, at positions not causing two-dimensional interference with said optical modulation face of said optical modulator, an inlet port for introducing therethrough said cooling fluid into said cooling chamber, an outlet port for discharging therethrough said cooling fluid inside said cooling chamber to the outside, and a buffer section for temporally accumulating said cooling fluid flowing therein via said inlet port, and for rectifying the flow direction of said cooling fluid to a direction parallel to said optical modulation face and/or perpendicular to said optical modulation face,
wherein a recess positioned on a periphery of said opening and recessing in a direction perpendicular to said optical modulation face is formed in the frame member in which said cooling chamber formed, and
wherein said buffer section comprises said recess, said light-transmissible substrate, and said rectifying section provided between said recess and said light-transmissible substrate for rectifying a flow direction of said cooling fluid flowing therein via said inlet port so that said cooling fluid extends into said cooling chamber keeping the flow direction parallel to said optical modulation face.

13. The optical modulator holder according to claim 12,
wherein said rectifying section comprises a plurality of columns each having a rectifying face capable of rectifying said cooling fluid flowing therein via said inlet port so that said cooling fluid extends into said cooling chamber keeping the flow direction parallel to said optical modulation face.

14. The optical modulator holder according to claim 12,
wherein said rectifying section has a plurality of grooves each extending in a direction perpendicular to the flow-in direction of said cooling fluid flowing therein via said inlet port and provided on an edge face of said light-transmissible substrate side along the flow-in direction of said cooling fluid.

15. The optical modulator holder according to claim 12,
wherein said rectifying section extends in a direction perpendicular to the flow-in direction of said cooling fluid flowing therein via said inlet port and has a height dimension in the direction perpendicular to said optical modulation face gradually becoming smaller farther away from a portion facing against said inlet port.

16. The optical modulator holder according to claim 12, wherein said rectifying section can be loaded on and off from said recess.

17. The optical modulator holder according to claim 12,
wherein the frame member in which said cooling chamber is formed is a molded product formed by molding, and said rectifying section is monolithically formed in said recess.

18. The optical modulator holder according to claim 12, wherein said rectifying section has a plurality of holes each enabling passage of said cooling fluid.

19. The optical modulator holder according to claim 1, wherein said buffer section is formed both on said inlet port side and said outlet port side.

20. An optical device including an optical modulator forming an optical image by modulating a light beam irradiated from a light source according to image information, said optical device comprising:
   an optical modulator holder;
   a plurality of fluid circulating members each connected to an inlet port and an outlet port of said optical modulator holder for guiding said cooling fluid to outside of said cooling chamber and again to inside of said cooling chamber; and
   a fluid press-feeding section provided in a flow pass for said cooling fluid in each of said plurality of fluid circulating members for pressurizing and sending said cooling fluid via said plurality of fluid circulating members to force the circulation of said cooling fluid, wherein
   said optical modulator holder holds an optical modulator for forming an optical image by modulating a light beam irradiated from a light source according to image information, and has a cooling chamber with a cooling fluid sealed therein to cool said optical modulator with the cooling fluid sealed in said cooling chamber, the optical modulator holder further comprising;
   a pair of frame members each having an opening corresponding to an optical modulation face of said optical modulator for holding said optical modulator therebetween; and
   a light-transmissible substrate provided at least on either one of the sides of said openings opposite to the sides where said pair of frame members are opposed to each other,
   wherein said cooling chamber is formed within at least one of said pair of frame members by closing the sides of said opening where said pair of frame members are opposed to each other and at least either one of the sides of said openings opposite to the sides where said pair of frame members are opposed to each other respectively with said optical modulator and said light-transmissible substrate, and
   wherein at least one of said pair of frame members comprises, at positions not causing two-dimensional interference with said optical modulation face of said optical modulator, an inlet port for introducing therethrough said cooling +—fluid into said cooling chamber, an outlet port for discharging therethrough said cooling fluid inside said cooling chamber to the outside, and a buffer section for temporally accumulating said cooling fluid flowing therein via said inlet port, and for rectifying the flow direction of said cooling fluid to a direction parallel to said optical modulation face and/or perpendicular to said optical modulation face.

21. The optical device according to claim 20,
wherein said optical device comprises at least one optical converter for converting optical characteristics of an incident light beam, said optical converter comprising a light-transmissible substrate and an optical conversion film formed on said light-transmissible substrate for converting optical characteristics of an incident light beam,
   wherein said light-transmissible substrate constituting said optical modulator holder is a light-transmissible substrate constituting said optical converter.

22. A projector comprising an optical device and a projecting optical device for projecting an optical image formed by said optical device in an enlarged manner, wherein
   said optical device including an optical modulator forming an optical image by modulating a light beam irradiated from a light source according to image information, the optical device comprising:
   an optical modulator holder;
   a plurality of fluid circulating members each connected to an inlet port and an outlet port of said optical modulator holder for guiding said cooling fluid to outside of said cooling chamber and again to inside of said cooling chamber; and
   a fluid press-feeding section provided in a flow pass for said cooling fluid in each of said plurality of fluid circulating members for pressurizing and sending said cooling fluid via said plurality of fluid circulating members to force the circulation of said cooling fluid, wherein
   said optical modulator holder holds an optical modulator for forming an optical image by modulating a light beam irradiated from a light source according to image information, and has a cooling chamber with a cooling fluid sealed therein to cool said optical modulator with the cooling fluid sealed in said cooling chamber, the optical modulator holder further comprising;
   a pair of frame members each having an opening corresponding to an optical modulation face of said optical modulator for holding said optical modulator therebetween; and
   a light-transmissible substrate provided at least on either one of the sides of said openings opposite to the sides where said pair of frame members are opposed to each other,
   wherein said cooling chamber is formed within at least one of said pair of frame members by closing the sides of said opening where said pair of frame members are opposed to each other and at least either one of the sides of said openings opposite to the sides where said pair of frame members are opposed to each other respectively with said optical modulator and said light-transmissible substrate, and
   wherein at least one of said pair of frame members comprises, at positions not causing two-dimensional interference with said optical modulation face of said optical modulator, an inlet port for introducing therethrough said cooling fluid into said cooling chamber, an outlet port for discharging therethrough said cooling fluid inside said cooling chamber to the outside, and a buffer section for temporally accumulating said cooling fluid flowing therein via said inlet port, and for rectifying the flow direction of said cooling fluid to a direction parallel to said optical modulation face and/or perpendicular to said optical modulation face.

23. The projector according to claim 22
wherein said optical modulator holder has a cooling chamber dividing section that is constituted by a light-transmittable plate-shaped member having a shape corresponding to said optical modulation face of said optical modulator, the cooling chamber dividing section being placed inside said cooling chamber and dividing said cooling chamber into a light beam incident side region and a light beam irradiation side region for rectifying the flow direction of said cooling fluid flowing therein via said inlet port to a direction perpendicular to said optical modulation face,
   wherein said cooling chamber dividing section has, when placed inside said cooling chamber, a taper portion formed in a side edge section of said inlet port, the cross-sectional area becoming gradually smaller when extends toward said inlet port side, and
   wherein said buffer section includes a recess positioned on a periphery of said opening in said frame member with said cooling chamber formed therein and recessing in a direction perpendicular to said optical modulation face, said light-transmissible substrate, and said cooling chamber dividing section.

24. The projector according to claim 23 wherein said taper portion has a slant surface at least on said opposing face side.

25. The projector according to claim 23 wherein said cooling chamber dividing section is placed inside said cooling chamber so that the distance to said optical modulator is larger than that to said light-transmissible substrate.

26. The projector according to claim 23 wherein said cooling chamber dividing section comprises, when placed inside said cooling chamber, a dividing section body facing said optical modulator and an extending section having said taper portion and extending from said dividing section body toward said recess so that the extending section interferes the recess two-dimensionally, and
wherein said extending section, in the side edge section thereof having said taper portion, has a convex-curved shape protruding toward said inlet port side on a portion facing said inlet port.

27. The projector according to claim 26 wherein said dividing section body has a shape with the thickness larger as compared to that of said extending section and expanding toward said opposing face.

28. The projector according to claim 22 wherein said buffer section is formed both on said inlet port side and said outlet port side.

29. The projector according to claim 22 wherein said optical device comprises at least one optical converter for converting optical characteristics of an incident light beam, said optical converter comprising a light-transmissible substrate and an optical conversion film formed on said light-transmissible substrate for converting optical characteristics of an incident light beam, wherein said light-transmissible substrate constituting said optical modulator holder is a light-transmissible substrate constituting said optical converter.

* * * * *